US012635045B1

(12) United States Patent
Reynard

(10) Patent No.: US 12,635,045 B1
(45) Date of Patent: May 19, 2026

(54) SYSTEMS AND METHODS FOR AI-GATING PHOTONIC EMISSION CONTROL FOR MULTIMODAL APPLICATIONS

(71) Applicant: Michael Reynard, Santa Monica, CA (US)

(72) Inventor: Michael Reynard, Santa Monica, CA (US)

( * ) Notice: Subject to any disclaimer, the term of this patent is extended or adjusted under 35 U.S.C. 154(b) by 0 days.

(21) Appl. No.: 19/389,445

(22) Filed: Nov. 14, 2025

(51) Int. Cl.
| | |
|---|---|
| *H05B 45/12* | (2020.01) |
| *G05B 13/02* | (2006.01) |
| *H05B 45/22* | (2020.01) |
| *H05B 45/56* | (2020.01) |

(52) U.S. Cl.
CPC ......... *H05B 45/12* (2020.01); *G05B 13/0265* (2013.01); *H05B 45/22* (2020.01); *H05B 45/56* (2020.01)

(58) Field of Classification Search
CPC ........ H05B 45/12; H05B 45/22; H05B 45/56; G05B 13/0265
See application file for complete search history.

(56) References Cited

U.S. PATENT DOCUMENTS

| | | |
|---|---|---|
| 1,475,024 A | 11/1923 | Morgan |
| 6,441,558 B1 | 8/2002 | Muthu et al. |
| 7,508,524 B2 | 3/2009 | Mahadevan-Jansen et al. |
| 8,070,332 B2 | 12/2011 | Higgins-Luthman et al. |
| 8,553,219 B2 | 10/2013 | Patil et al. |

(Continued)

FOREIGN PATENT DOCUMENTS

| | | | |
|---|---|---|---|
| AU | 2017229088 B2 * | 5/2021 | ............. G01N 1/30 |
| CN | 101813272 A | 8/2010 | |

(Continued)

OTHER PUBLICATIONS

Anand, Diya and Mavromatis, Ioannis and Carnelli, Pietro and Khan, Aftab, "A Federated Learning-enabled Smart Street Light Monitoring Application: Benefits and Future Challenges", 2023}, isbn 9781450395229}, Association for Computing Machinery, New York, NY, USA, doi :10.1145/3556558.3558580.

(Continued)

*Primary Examiner* — Abdullah A Riyami
*Assistant Examiner* — Syed M Kaiser
(74) *Attorney, Agent, or Firm* — Richard A Baker, Jr.

(57) ABSTRACT

An AI-Gating illumination system provides artificial intelligence-based regulation of photon emission for incoherent light sources. The system integrates real-time sensor feedback with embedded AI inference to dynamically modulate intensity, spectral composition, spatial distribution, and temporal emission of light-emitting diodes, enabling continuous ANSI-compliant fluence control, energy efficiency, and adaptive illumination. The system is an AI-Gating Photonic Emission Control architecture that predicts instantaneous fluence and determines optimal emission parameters. This architecture operates in a continuous feedback loop with optical, thermal, and environmental sensors, ensuring that photon output remains within defined safety and performance thresholds. The closed-loop framework allows each luminaire or LED array to maintain autonomous regulation, adjusting in real time to variations in reflectance, occupancy, ambient lighting, or biological context.

30 Claims, 32 Drawing Sheets

(56) References Cited

U.S. PATENT DOCUMENTS

| | | | |
|---|---|---|---|
| 8,553,732 | B2 | 10/2013 | Maier et al. |
| 8,983,580 | B2 | 3/2015 | Boppart et al. |
| 9,289,130 | B2 | 3/2016 | Mahadevan-Jansen et al. |
| 9,498,114 | B2 | 11/2016 | Friedman et al. |
| 9,629,220 | B2 | 4/2017 | Panopoulos et al. |
| 9,851,303 | B2 | 12/2017 | Huber et al. |
| 10,222,011 | B2 | 3/2019 | Oostdyk et al. |
| 10,656,012 | B2 | 5/2020 | Atabaki et al. |
| 10,739,189 | B2 | 8/2020 | Pacala et al. |
| 10,798,798 | B2 | 10/2020 | Phillips |
| 10,894,503 | B2 | 1/2021 | Spero |
| 10,906,463 | B2 | 2/2021 | Pflug et al. |
| 11,240,898 | B2 | 2/2022 | Florac et al. |
| 11,779,219 | B2 | 10/2023 | Boppart et al. |
| 11,849,519 | B2 | 12/2023 | Florac et al. |
| 12,028,776 | B2 * | 7/2024 | Eckert .................. H04W 4/029 |
| 12,203,862 | B1 | 1/2025 | Lachapelle et al. |
| 12,343,110 | B2 | 7/2025 | Yue et al. |
| 12,440,172 | B2 | 10/2025 | Harper et al. |
| 12,441,238 | B2 | 10/2025 | Sipolins et al. |
| 12,450,764 | B2 | 10/2025 | Barbour et al. |
| 12,453,469 | B2 | 10/2025 | Sarver et al. |
| 12,455,052 | B2 | 10/2025 | Bretschneider et al. |
| 12,456,307 | B1 | 10/2025 | Das et al. |
| 12,456,369 | B1 | 10/2025 | Brown |
| 2011/0010019 | A1 | 1/2011 | Shloush et al. |
| 2019/0313517 | A1 | 10/2019 | Subramaniam et al. |
| 2021/0007023 | A1 * | 1/2021 | Umapathy ........ H04W 36/0061 |
| 2024/0069500 | A1 * | 2/2024 | Sung ........................ E03D 9/00 |
| 2024/0371184 | A1 | 11/2024 | Comiter et al. |
| 2025/0014731 | A1 * | 1/2025 | Soori-Arachi ....... G06Q 20/065 |
| 2025/0037579 | A1 | 1/2025 | Moyer |
| 2025/0319810 | A1 | 10/2025 | Kreipe et al. |
| 2025/0322660 | A1 | 10/2025 | Bloebaum et al. |
| 2025/0331080 | A1 | 10/2025 | Davis et al. |
| 2025/0331087 | A1 | 10/2025 | Massa |
| 2025/0341447 | A1 | 11/2025 | Mitra et al. |

FOREIGN PATENT DOCUMENTS

| | | | |
|---|---|---|---|
| CN | 202258257 U | * | 5/2012 |
| CN | 210120688 U | | 2/2020 |
| CN | 111119089 A | | 5/2020 |
| EP | 0726554 A1 | | 8/1996 |
| EP | 3716207 A1 | | 9/2020 |
| WO | 2013121342 A2 | | 8/2013 |
| WO | 2016127173 A1 | | 8/2016 |
| WO | 2021141921 A1 | | 7/2021 |

OTHER PUBLICATIONS

Ankitkumar Sanjaykumar Varshney, Debanjali Bhattacharjee, Advancements in artificial intelligence for ocular oncology: Enhancing diagnostic accuracy and prognostic capabilities in eye tumors, May 2025, IP International Journal of Ocular Oncology and Oculoplasty, 11(1):22-29, DOI:10.18231j.ijooo.2025.005.

Balas, Michael , Vethushan Ramalingam, Bhadra Pandya, Ahmed Abdelaal, Runjie Bill Shi, Adaptive optics imaging in ophthalmology: Redefining vision research and clinical practice, JFO Open Ophthalmology, vol. 7,2024, 100116, ISSN 2949-8899, https:doi.org10.1016j.jfop.2024.100116. (https:www.sciencedirect.comsciencearticlepiiS2949889924000400).

Bingyan Liu, Nuoyan Lv, Yuanchun Guo, Yawen Li, Recent advances on federated learning: A systematic survey, Neurocomputing, vol. 597, 2024, 128019, ISSN 0925-2312, https://doi.org/10.1016/j.neucom.2024.128019. (https://www.sciencedirect.com/science/article/pii/S0925231224007902).

Blake, N., Gaifulina, R., Griffin, L. D., Bell, I. M., & Thomas, G. M. H. (2022). Machine Learning of Raman Spectroscopy Data for Classifying Cancers: A Review of the Recent Literature. Diagnostics, 12(6), 1491. https:doi.org10.3390diagnostics12061491.

Blilie, A., Mulliqi, N., Ji, X. et al. Artificial intelligence-assisted prostate cancer diagnosis for reduced use of immunohistochemistry. Commun Med 5, 425 (2025). https:doi.org10.1038s43856-025-01185-y.

Campanella G, Hanna MG, Geneslaw L, et al. Clinical-grade computational pathology using weakly supervised deep learning on whole-slide images. Nature Medicine. 2019;25:1301-1309. doi:10.1038s41591-019-0508-1.

Chiuri A, Angelini F. Fast Gating for Raman Spectroscopy. Sensors (Basel). Apr. 7, 2021;21(8):2579. doi: 10.3390s21082579. PMID: 33916972; PMCID: PMC8067580.

Dadzie AK, Iddir SP, Ganesh S, Ebrahimi B, Rahimi M, Abtahi M, Son T, Heiferman MJ and Yao X (2025) Artificial intelligence in the diagnosis of uveal melanoma: advances and applications. Exp. Biol. Med. 250:10444. doi: 10.3389ebm.2025.10444.

Dritsas E, Trigka M. Federated Learning for IoT: A Survey of Techniques, Challenges, and Applications. Journal of Sensor and Actuator Networks. 2025; 14(1):9. https://doi.org/10.3390/jsan14010009.

Erckens RJ, Hosseini K, March WF, Jongsma FH, Wicksted JP, Li HK, Hendrikse F. Raman spectroscopy: noninvasive determination of silicone oil in the eye: potential applications for intraocular determination of biomaterials. Retina. Dec. 2002;22(6):796-9. doi: 10.109700006982-200212000-00019. PMID: 12476110.

Fang P, Wang M, Li J, Zhao Q, Zheng X, Gao H. A Distributed Intelligent Lighting Control System Based on Deep Reinforcement Learning. Applied Sciences. 2023; 13(16):9057. https://doi.org/10.3390/app13169057.

Fitzgerald S, Akhtar J, Schartner E, Ebendorff-Heidepriem H, Mahadevan-Jansen A, Li J. Multimodal Raman spectroscopy and optical coherence tomography for biomedical analysis. J Biophotonics. Mar. 2023;16(3):e202200231.doi: 10.1002jbio.202200231. Epub Nov. 20, 2022. PMID: 36308009; PMCID: PMC10082563.

Han M, Dang Y, Han J. Denoising and Baseline Correction Methods for Raman Spectroscopy Based on Convolutional Autoencoder: A Unified Solution. Sensors (Basel). May 16, 2024;24(10):3161. doi: 10.3390s24103161. PMID: 38794016; PMCID: PMC11125329.

Hsu, C. K., et al. "Machine learning for Raman spectroscopy in biomedical diagnostics." Biosensors and Bioelectronics, 2022; 204: 114059.

Koseoglu, N.D., Correa, Z.M., Liu, T.Y. Artificial Intelligence for ocular oncology. Curr. Opin Ophthalmol. 2023;34:437-440. doi: 10.1097ICU.0000000000000982.

"Lalonde, R., et al. "U-Net and Vision Transformer architectures for digital slide analysis." Computerized Medical Imaging and Graphics, 2023."

Lazzini, G., Massi, D., Moroni, D., Salvetti, O., Viacava, P., Laurino, M., & D'Acunto, M. (2025). Raman Spectroscopy Diagnosis of Melanoma. Proceedings, 129(1), 10. https:doi.org10.3390proceedings2025129010.

Li, Y, N. Haas and S. Pankanti, "Intelligent headlight control using learning-based approaches," 2011 IEEE Intelligent Vehicles Symposium (IV), Baden-Baden, Germany, 2011, pp. 722-727, doi: 10.1109/IVS.2011.5940541.

"Liang, J., et al. "Hybrid Raman and OCT system for multimodal imaging." Optics Letters, 2018; 43(6): 1223-1226".

Lin, Chi-Chang & Kuo, Ming-Tse & Chang, Hsien-Chang. (2010). Review: Raman Spectroscopy—A Novel Tool for Noninvasive Analysis of Ocular Surface Fluid. Journal of Medical and Biological Engineering. 30. 10.5405jmbe.846.

Luo, R., Popp, J., & Bocklitz, T. (2022). Deep Learning for Raman Spectroscopy: A Review. Analytica, 3(3), 287-301. https:doi.org10.3390analytica3030020.

Mahmond, H.H.H., Khafga, D.S., Alharbi, A.H., "Computerized Detection of Limbal Stem Cell Deficiency from Digital Cornea Images", Computer Systems Science & Engineering, DOI:10.32604/csse.2022.019633, https://www.techscience.com/csse/v40n2/44489/html.

Markus, B., et al. "AI in Digital Pathology and Ophthalmic Imaging: Integration Challenges." IEEE Reviews in Biomedical Engineering, 2021; PMID: 33309898.

(56) References Cited

OTHER PUBLICATIONS

Niazi MKK, Parwani AV, Gurcan MN. Digital pathology and artificial intelligence. Lancet Oncol. May 2019;20(5):e253-e261. doi: 10.1016S1470-2045(19)30154-8. PMID: 31044723; PMCID: PMC8711251.

Nkrumah JK, Cai Y, Jafaripournimchahi A, Wang H, Atindana VA. Highway Safety with an Intelligent Headlight System for Improved Nighttime Driving. Sensors (Basel). Nov. 14, 2024;24(22):7283. doi: 10.3390/s24227283. PMID: 39599059; PMCID: PMC11598802.

Obuchowska I, Konopińska J. Importance of Optical Coherence Tomography and Optical Coherence Tomography Angiography in the Imaging and Differentiation of Choroidal Melanoma: A Review. Cancers (Basel). Jul. 10, 2022;14(14):3354. doi: 10.3390cancers14143354. PMID: 35884415; PMCID: PMC9316780.

Ochiai, Y., et al. "Noninvasive Raman spectroscopic analysis of ocular tissues." Applied Spectroscopy, 2002; 56(9):1209-1214.

Patil CA, Bosschaart N, Keller MD, van Leeuwen TG, Mahadevan-Jansen A. Combined Raman spectroscopy and optical coherence tomography device for tissue characterization. Opt Lett. May 15, 2008;33(10):1135-7. doi: 10.1364ol.33.001135. PMID: 18483537; PMCID: PMC2713918.

Pinkard, H., Baghdassarian, H., Mujal, A. et al. Learned adaptive multiphoton illumination microscopy for large-scale immune response imaging. Nat Commun 12, 1916 (2021). https://doi.org/10.1038/s41467-021-22246-5.

Rahman, M. H.-U., Sikder, R., Tripathi, M., Zahan, M., Ye, T., Gnimpieba Z., E., Jasthi, B. K., Dalton, A. B., & Gadhamshetty, V. (2024). Machine Learning-Assisted Raman Spectroscopy and SERS for Bacterial Pathogen Detection: Clinical, Food Safety, and Environmental Applications. Chemosensors, 12(7), 140. https:doi.org10.3390chemosensors12070140.

Rehman MHU, Hugo Lopez Pinaya W, Nachev P, Teo JT, Ourselin S, Cardoso MJ. Federated learning for medical imaging radiology. Br J Radiol. Oct. 2023;96(1150):20220890. doi: 10.1259/bjr.20220890. PMID: 38011227; PMCID: PMC10546441.

Reynard M, Font RL. Two cases of uveal metastasis from breast carcinoma in men. Am J Ophthalmol. Feb. 1983;95(2):208-15. doi: 10.10160002-9394(83)90015-6. PMID: 6297304.

Rieke, N., Hancox, J., Li, W. et al. The future of digital health with federated learning. npj Digit. Med. 3, 119 (2020). https://doi.org/10.1038/s41746-020-00323-1.

Shutova, Mariia, Alexander M. Sinyukov, Blake Birmingham, Zhenrong Zhang, and Alexei V. Sokolov, "Adaptive optics approach to surface-enhanced Raman scattering," Opt. Lett. 45, 3709-3712 (2020).

Somasiri, Nalinda, Ganesan, Swathi, and Wicramasinghe, Shammika (2022) Deep Learning Model Regression Based Object Detection for Adaptive Driving Beam Headlights. In: 2023 8th International Conference on Machine Learning Technologies (ICMLT 2023), Mar. 10, 2023, Sweden. (Submitted) Downloaded from: https://ray.yorksj.ac.uk/id/eprint/7425/.

Varshney AS, Bhattacharjee D, "Advancements in artificial intelligence for ocular oncology: Enhancing diagnostic accuracy and prognostic capabilities in eye tumors", IP Int J Ocular Oncol Oculoplasty, May 1, 2025, 22-29, DOI:10.18231/j.ijooo.2025.005.

Ward EN, Hecker L, Christensen CN, Lamb JR, Lu M, Mascheroni L, Chung CW, Wang A, Rowlands CJ, Schierle GSK, Kaminski CF. Machine learning assisted interferometric structured illumination microscopy for dynamic biological imaging. Nat Commun. Dec. 21, 2022;13(1):7836. doi: 10.1038/s41467-022-35307-0. PMID: 36543776; PMCID: PMC9772218.

* cited by examiner

SENSOR
INPUTS

FEATURE EXTRACTION
1002

INFERENCE
1004

GATING
COMMANDS

GATING DECISION
1006

REINFORCEMENT
FEEDBACK

LEARNING
1008

LED STROBE

SYNC

CAMERA EXPOSURE

AI-GATING

SYSTEMS AND METHODS FOR AI-GATING PHOTONIC EMISSION CONTROL FOR MULTIMODAL APPLICATIONS

CROSS-REFERENCE TO RELATED APPLICATIONS

This is a priority application.

FIELD OF THE INVENTIONS

The present document relates to the field of photonics and illumination control, and more particularly to systems, devices, and methods for AI-Gating regulation of LED emission.

BACKGROUND

Existing photonic devices rely on static calibration or fixed limits. In ophthalmic surgery, intraocular illumination is preset to nominal safe levels but cannot respond to instantaneous changes in tissue reflectance or geometry. Industrial and laboratory LED arrays operate under constant-power conditions and lack predictive adaptation. No known system provides autonomous, real-time ANSI-compliant fluence verification or embedded AI inference without network dependence. The disclosed AI-Gating system addresses these deficiencies. As used herein, 'AI-Gating' refers to an inference-driven illumination control framework employing sensor feedback, predictive modeling, and adaptive gating at micro- to millisecond scales.

BRIEF SUMMARY

In one aspect, an AI-Gating illumination system, includes a sensor network configured to acquire multimodal input data, an AI kernel coupled to the sensor network, the AI kernel including an input-processing module, an inference module implementing trained machine-learning models, and a command-encoding module, a driver interface operatively connected to the AI kernel for receiving digital gating commands and generating corresponding electrical control signals, a plurality of LEDs driven by the driver interface to emit light according to the corresponding electrical control signals, and a feedback module configured to monitor emitted light characteristics and transmit feedback data to the AI kernel.

The AI kernel may adaptively adjust the digital gating commands based on the multimodal input data and the feedback data to maintain a predetermined illuminance, spectral distribution, and temporal stability. The AI kernel may modify LED intensity. The AI kernel may modulate color rendering and perform spectral blending across multiple LED channels. The AI kernel may execute temporal modulation by varying pulse width and duty cycle. The AI kernel may execute predictive control algorithms. The AI kernel may perform feature extraction from multimodal sensor data. The AI kernel may compute an emission confidence score reflecting a statistical reliability of predicted output parameters and uses the emission confidence score to regulate gating decisions. The AI kernel may engage in federated learning, receiving aggregated model updates from multiple distributed systems without sharing raw sensor data.

The feedback module may measure photon-lux density and transmit differential error signals to the AI kernel. The driver interface may apply pulse-width modulation to individual LED drivers based on encoded gating commands. The plurality of LEDs may be arranged in individually addressable arrays, each responsive to separate control lines to enable localized gating. The multimodal input data may include environmental data.

The AI kernel may maintain a closed-loop control in which real-time feedback continuously refines model weights governing emission parameters. The AI kernel may include a predictive interface layer configured to integrate external environmental forecasts. The AI kernel may incorporate physics-informed priors constraining output modulation within safe current and voltage limits. The AI kernel may automatically calibrate LED spectral profiles through self-referenced spectral normalization routines.

The feedback module may detect glare and reflectance and communicate compensation data to reduce specular artifacts. The AI kernel may employ reinforcement learning to iteratively optimize illumination efficiency. The AI kernel may be implemented on an embedded processing unit that includes a neural processing engine, local memory, and real-time clock synchronization. The AI kernel may communicate with the driver interface via a digital control bus employing low-latency data exchange.

The feedback module may integrate optical and thermal sensors to maintain the temperature stability of the plurality of LEDs under variable load. The AI kernel may dynamically establish upper and lower emission thresholds based on contextual safety parameters and user-defined profiles. The AI kernel may synchronize LED gating with external camera shutters. The AI kernel may perform contextual interpretation of multimodal inputs, including spectral, visual, and environmental data, for situationally aware emission control. The AI kernel may execute adaptive power management, distributing electrical load among LEDs. The AI kernel may maintain a self-diagnostic log recording operational parameters, predicted deviations, and applied correction coefficients. The AI kernel may predict component degradation through trend analysis and compensate the output to maintain calibrated intensity. The AI kernel may support cloud-synchronized updates of model parameters. The AI-Gating illumination system may operate in federated coordination with other illumination units to achieve synchronized multi-zone lighting control in networked environments. The AI kernel may output digital control packets that include encoded parameters for intensity, spectral weighting, phase modulation, and feedback coefficients, thereby maintaining perceptually uniform illumination and optimized photometric efficiency across the plurality of LEDs. Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
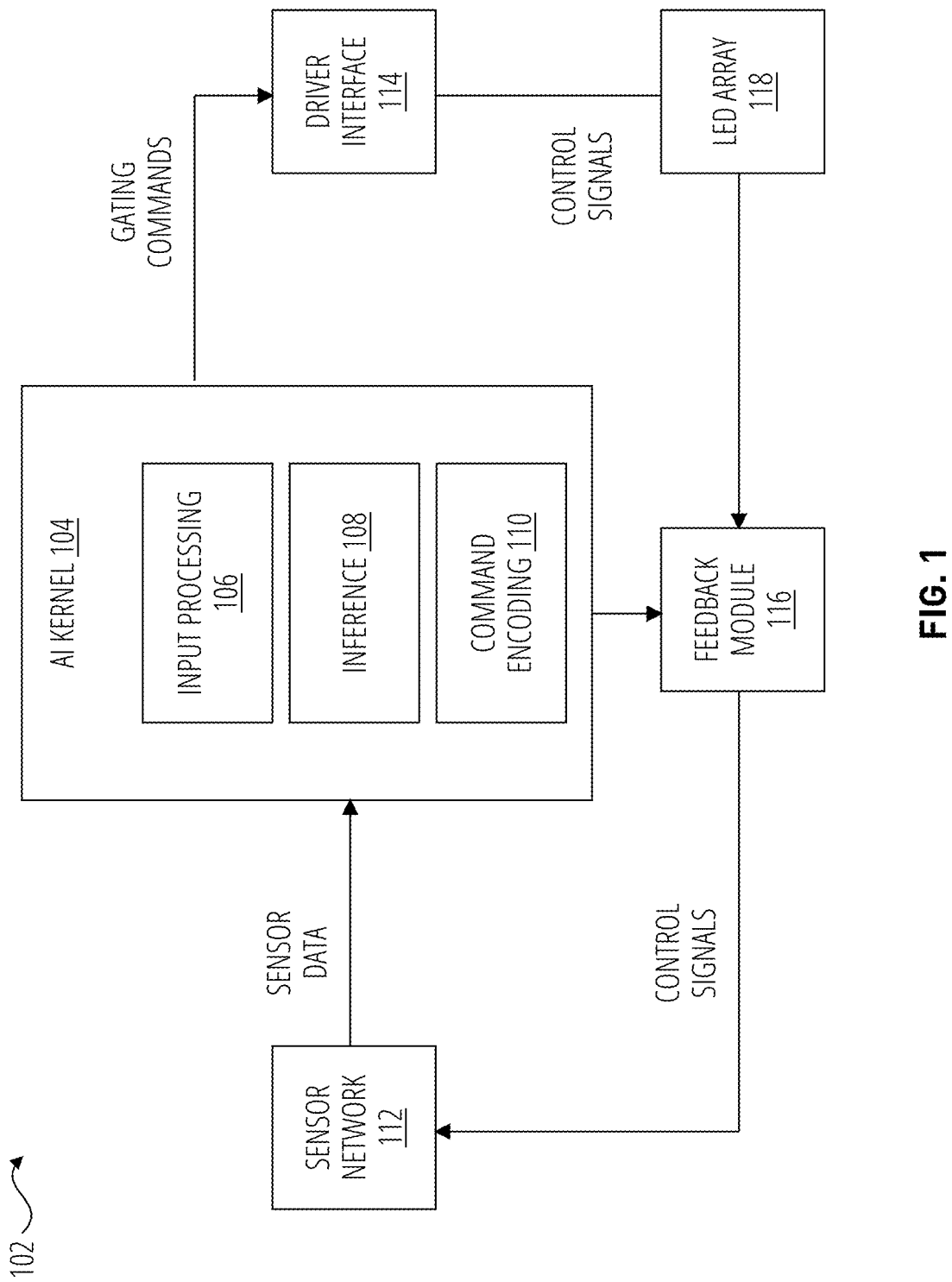
FIG. 1 illustrates the system architecture of the AI-Gating LED Illumination System, showing principal modules including the AI Kernel, Sensor Network, Driver Interface, and LED array in functional communication.

The present document provides an AI-Gating illumination system 102 that introduces artificial intelligence-based regulation of photon emission for incoherent light sources. The system integrates real-time sensor feedback with embedded AI inference to dynamically modulate intensity, spectral composition, spatial distribution, and temporal emission of light-emitting diodes. By coupling predictive modeling with closed-loop feedback, the AI-Gating illumination system 102 enables continuous ANSI-compliant fluence control, energy efficiency, and adaptive illumination without reliance on external networks or cloud processing.

At the core of the AI-Gating illumination system 102 is an AI-Gating Photonic Emission Control architecture that replaces static, pre-programmed light regulation with self-optimizing inference. A locally embedded processor 410 executes a trained model that predicts instantaneous fluence and determines optimal emission parameters. This model operates in a continuous feedback loop with optical, thermal, and environmental sensors 308 to ensure that photon output remains within defined safety and performance thresholds. The closed-loop framework allows each luminaire or LED array to maintain autonomous regulation, adjusting in real time to variations in reflectance, occupancy, ambient lighting, or biological context.

The system employs a gating interface between the AI kernel 104 and the LED driver, enabling modulation at micro- to millisecond precision. Through this interface, the AI inference 108 layer can selectively alter duty cycle, drive current, wavelength balance, and beam geometry to achieve optimal illumination under changing conditions.

The AI-Gating illumination system 102 further enables in-situ adaptation across ophthalmic and industrial domains, extending predictive gating to both illumination and laser-based subsystems. In ophthalmic applications, the AI-Gating LED assembly dynamically adjusts intraocular illumination to preserve retinal safety while maintaining surgical visibility. In architectural or industrial settings, the same principles provide context-aware adaptation, reducing output during high reflectance periods or increasing spectral warmth in low-light environments, without user intervention.

A feedback learning 506 loop continuously refines gating thresholds based on measured power, surface reflectance, temperature, and perceptual response metrics. The architecture optionally supports federated learning, allowing distributed luminaires to share anonymized inference updates for global optimization while preserving local autonomy and privacy. This distributed intelligence permits coordinated illumination behavior across multiple fixtures, resulting in unified environmental adaptation and improved energy distribution efficiency.

By substituting coherent laser photon control with regulated LED emission, the document extends the AI-Gating illumination system 102 to incoherent light systems. The result is a predictive, self-regulating illumination platform capable of learning from its environment and optimizing light output in real time. This combination of embedded inference, feedback adaptation, and autonomous safety verification establishes a new class of AI-controlled photonic devices, intelligent LED systems that dynamically balance energy efficiency, visual quality, and human or biological safety through physics-grounded decision support.

FIG. 1 illustrates the functional architecture of the AI-Gating illumination system 102, emphasizing the flow of sensing, inference, control, and feedback signals that enable adaptive and autonomous light-emission control. The AI-Gating illumination system 102 operates as a closed-loop photometric intelligence circuit, in which real-time data from a distributed sensor network 112 are continuously processed by an embedded AI kernel 104 that governs an array of light-emitting elements 118 through a driver interface 114.

Sensor data, comprising illumination levels, spectral composition, temperature, and other environmental parameters, are transmitted to the AI kernel 104 for preprocessing and normalization. Within the AI kernel 104, an input processing 106 stage filters and scales the data, removing noise and aligning sensor inputs into a uniform computational frame. The processed data are then passed to the inference 108 module, which executes trained models and decision algorithms that determine the optimal gating parameters required to maintain target luminance and color balance while compensating for aging, fouling, or transient optical disturbances.

The inference output is formatted by the command encoding 110 stage, which converts digital control predictions into hardware-ready gating commands. These encoded commands are relayed to the driver interface 114, which modulates electrical current and pulse-width parameters applied to the LED array 118. Through this interface, the system achieves microsecond-scale control of emission intensity, temporal sequencing, and spectral blending across multiple diodes or light channels.

Simultaneously, the feedback module 116 receives continuous photometric and electrical performance data from the driver interface 114 and LED array 118, verifying that commanded output matches measured illumination. When discrepancies occur, corrective control signals are transmitted back to both the driver interface 114 and the sensor network 112, closing the feedback loop and ensuring consistent emission quality. The feedback module 116 also logs dynamic confidence values that represent the health and responsiveness of the system, which are used by the AI kernel 104 to refine inference accuracy over time.

Through this closed-loop interaction, sensor input, AI-based inference, command issuance, and feedback correction, the AI-Gating illumination system 102 maintains stable optical performance even under fluctuating ambient conditions or component variability. The fully integrated AI kernel 104 governs local decision-making, allowing the system to operate deterministically and autonomously without dependence on external network resources.

FIG. 1 presents a schematic representation of the AI-Gating illumination system 102, illustrating the continuous data and control flow between the sensor network 112, AI kernel 104, driver interface 114, and feedback module 116 that together establish a self-regulating and adaptive illumination platform. This configuration embodies the core operational principle of AI-Gating: real-time modulation of light output based on continuously evolving environmental inputs and learned system states.

At the left of the diagram, the sensor network 112 gathers multimodal environmental data such as ambient luminance, spectral content, motion, and temperature conditions. This real-time sensor data is transmitted to the AI kernel 104, the central computational unit responsible for interpreting contextual conditions and generating optimized control decisions. The AI kernel 104 is organized into three functional layers: input processing 106, inference 108, and command encoding 110.

In the input processing 106 stage, raw sensor data are filtered, normalized, and synchronized across multiple input channels. This ensures that transient noise, sensor drift, or asynchronous data acquisition do not affect subsequent AI-driven analysis. The processed data are then passed to the inference 108 layer, where trained neural models evaluate illumination requirements using probabilistic reasoning. The inference 108 engine computes optimal emission parameters such as brightness level, color temperature, and spectral balance to maintain consistent visibility and color fidelity despite environmental variation.

Following inference, the command encoding 110 layer converts the AI's decisions into precise digital gating commands. These commands are delivered to the driver interface 114, which translates them into electrical control signals that adjust the operating current, duty cycle, and voltage to the LED emitters 118. The driver interface 114 thus acts as a physical intermediary between AI computation and optical emission.

Once emitted, the light output is continuously monitored through the feedback module 116, which analyzes the photometric stability and compares actual LED emission characteristics against predicted outputs. If discrepancies are detected, such as deviations in luminous intensity or color rendering, the feedback signal is transmitted back to the AI kernel 104. The AI kernel 104, in turn, uses this data to recalibrate its internal weighting and inference parameters, forming a closed-loop adaptive control cycle.

This architecture enables the AI-Gating illumination system 102 to operate autonomously and maintain precise illumination performance without manual recalibration. It adapts to ambient conditions, component aging, and environmental fluctuations in real time. The result is a highly stable, energy-efficient, and durable illumination framework capable of meeting the stringent reliability and safety requirements of both commercial and industrial lighting environments.

Figure 2:
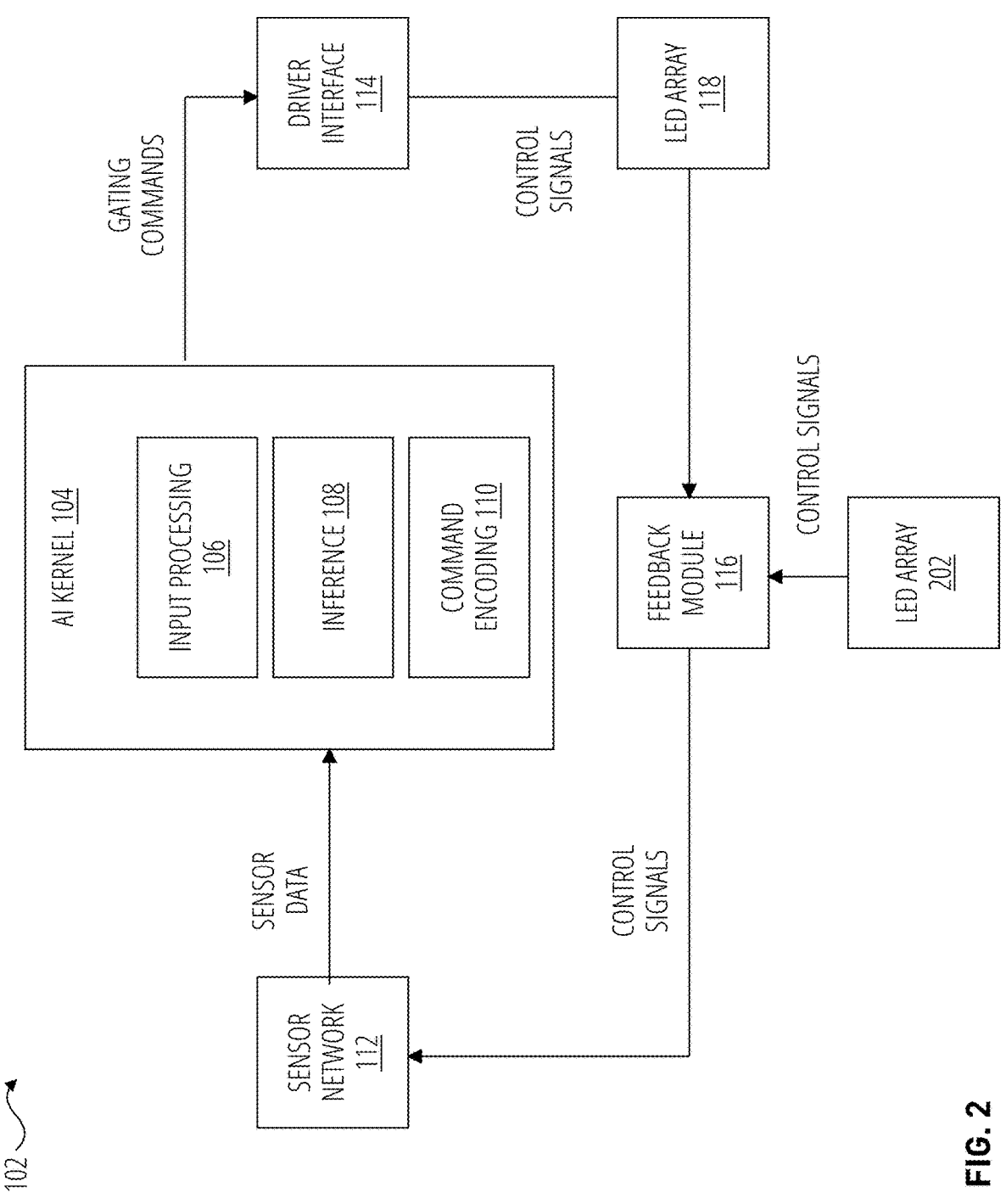
FIG. 2 presents an expanded system diagram showing dual-array feedback integration within the AI-Gating illumination architecture, emphasizing bidirectional sensor-to-kernel control and photonic data fusion.

FIG. 2 illustrates an expanded embodiment of the AI-Gating illumination system 102 incorporating a dual-array feedback configuration that enhances precision and redundancy in photometric control. The architecture builds upon the framework shown in FIG. 1 by demonstrating how the feedback module 116 simultaneously receives and regulates input from multiple LED arrays 118, 202, thereby increasing accuracy, responsiveness, and stability of the gating process under variable operating conditions.

As depicted, real-time Sensor Data from the sensor network 112 enter the AI kernel 104, where input processing 106, inference 108, and command encoding 110 occur sequentially. The AI kernel 104 interprets the incoming data stream, representing ambient luminance, color temperature, spectral balance, and environmental feedback, and produces Gating Commands that are transmitted to the driver interface 114. The driver interface 114 distributes modulated current and timing signals to both LED arrays 118, 202, which may represent physically distinct lighting zones, channels of different spectral composition, or arrays of differing luminous intensity.

The feedback module 116 functions as a multi-node calibration hub, acquiring Control Signals from each LED array 118, 202 to evaluate emitted light against the AI Kernel's predicted output. It continuously measures local deviations in flux, chromaticity, and temporal coherence, providing corrective feedback to both the driver interface 114 and the sensor network 112. The result is a dynamically self-correcting illumination loop capable of maintaining synchronized brightness and color across all active arrays.

This configuration enables the AI-Gating illumination system 102 to perform higher-order functions such as cross-array normalization, where emission from one LED array 118 or 202 is automatically adjusted in relation to another to maintain uniform field luminance. Additionally, redundant feedback from multiple arrays provides fault tolerance: if one photometric sensor or LED bank exhibits drift or degradation, the remaining array signals allow the system to recalibrate autonomously.

Through its dual-array structure and bidirectional feedback channels, the AI-Gating illumination system 102 of FIG. 2 exemplifies a modular, scalable design. It allows distributed lighting elements, whether in traffic infrastructure, industrial facilities, or precision optical instruments, to operate with coordinated intelligence, thereby ensuring continuous photometric stability, extended component life, and uncompromised reliability even in mission-critical environments.

Figure 3:
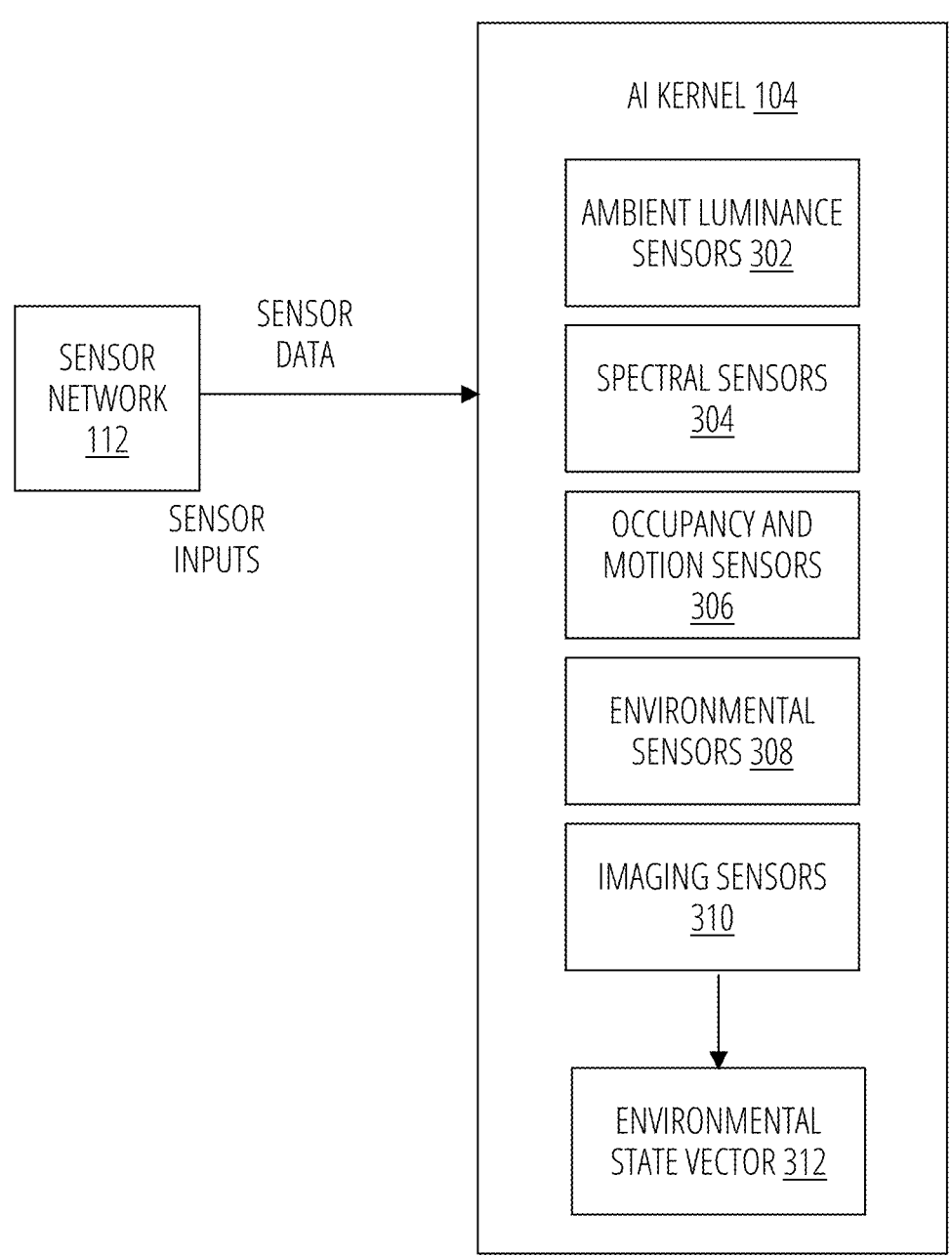
FIG. 3 depicts the Sensor Network integration and formation of the environmental state vector within the AI-Gating Kernel, demonstrating real-time normalization and context generation from multimodal inputs.

FIG. 3 illustrates the internal composition of the sensor network 112 and its data assimilation process within the AI kernel 104 of the AI-Gating illumination system 102. FIG. 1 highlights how multiple sensor modalities are combined, normalized, and transformed into an environmental state vector 312, a unified data construct that enables intelligent gating decisions based on real-world conditions.

In operation, the sensor network 112 continuously acquires multidimensional input data from a distributed array of sensing units. These inputs include readings from ambient luminance sensors 302, which measure surrounding light intensity and color temperature; spectral sensors 304, which analyze wavelength-specific reflectance and chromatic components to maintain accurate color rendering; occupancy and motion sensors 306, which detect human or vehicular presence to adjust illumination dynamically; environmental sensors 308, which register temperature, humidity, and particulate density to account for atmospheric variations; and imaging sensors 310, which capture spatial and geometric data for scene interpretation, shadow detection, and glare mitigation.

Upon reception, the AI kernel 104 performs input processing that aligns all sensor streams in temporal and spatial synchrony. Each data type is normalized, scaled, and filtered to reduce noise and cross-sensor interference. Through this fusion process, the AI kernel 104 constructs an environmental state vector 312, a real-time multidimensional representation of the illumination environment and its contextual variables. This vector provides a continuously updated quantitative model of ambient conditions, forming the foundation upon which the inference 108 engine of the AI kernel 104 bases its gating decisions.

By using the environmental state vector 312, the AI-Gating illumination system 102 can perform highly adaptive and predictive control functions such as localized dimming, chromatic balancing, or emission pattern optimization in response to occupant behavior or transient lighting fluctuations. The result is a dynamically stable, environmentally responsive illumination system capable of achieving precise optical regulation and energy efficiency while maintaining uniform visual comfort and safety across variable scenarios.

Figure 4:
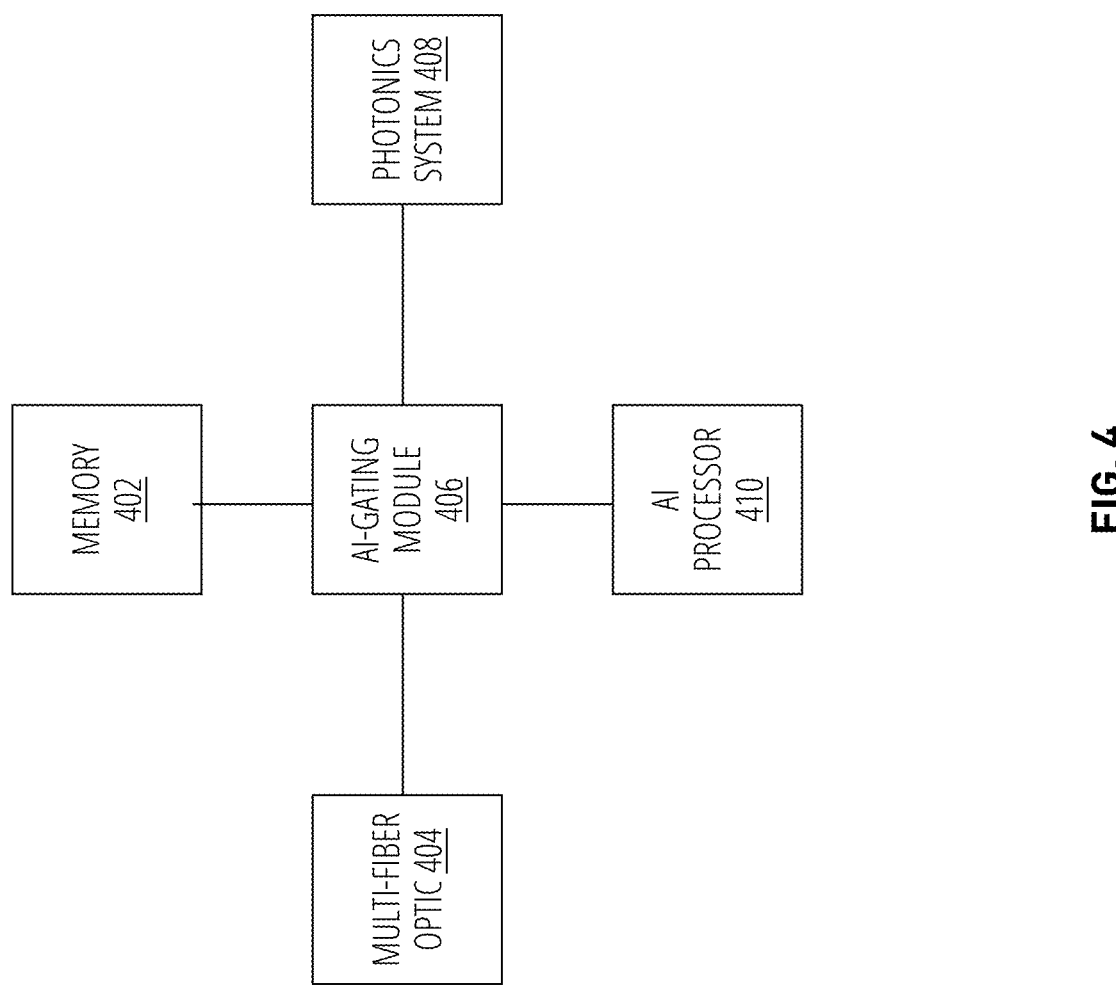
FIG. 4 provides a structural overview of the AI-Gating hardware integrated with photonic and multi-fiber optic subsystems, highlighting the coupling of optical emitters and feedback sensors for dynamic fluence regulation.

FIG. 4 illustrates the hardware-level interconnection of the AI-gating module 406 with the supporting subsystems that constitute the operational core of the disclosed illumination and photonic control framework. The diagram demonstrates how the AI-gating module 406 interacts with an AI processor 410, memory 402, photonics system 408, and multi-fiber optic 404 assembly to achieve precise optical modulation, signal distribution, and adaptive control of light emission or photonic flow.

At the center of this configuration lies the AI-gating module 406, serving as the primary coordination hub for data acquisition, control signal computation, and command delivery. The AI processor 410 is coupled directly to the module, executing real-time inference and predictive algorithms that regulate light output, pulse timing, and energy distribution across the photonic elements. These AI algorithms utilize input data derived from sensor feedback and environmental state vectors 312, enabling the AI processor 410 to make instantaneous gating decisions with sub-millisecond precision.

The memory 402 unit provides high-speed storage for the system's operating firmware, machine-learning models, calibration maps, and diagnostic logs. It also holds temporal data structures that allow the AI-gating module 406 to perform adaptive recalibration and historical analysis of emission stability over time. This enables the system to learn, refine, and optimize optical control functions through cumulative operational experience.

On the optical interface side, the multi-fiber optic 404 subsystem transmits modulated light or signal photons between distributed optical channels, ensuring that each path maintains synchronized and loss-compensated illumination. The AI-gating module 406 governs this multi-fiber interface to manage distributed emission points, spectral distribution, and phase alignment across the network. The photonics system 408, connected on the opposite side, may include laser diodes, LED matrices, or other photonic emitters used for illumination, sensing, or communication purposes. Through this link, the AI-gating module 406 performs both emission control and photonic feedback management.

Overall, FIG. 4 demonstrates how the disclosed AI-Gating architecture integrates artificial intelligence with hardware-based optical and electronic subsystems. By combining the computational intelligence of the AI processor 410, the adaptive storage of the memory 402 unit, and the precision of the photonics system 408 and multi-fiber optic 404 subsystems, the system achieves real-time optical modulation, environmental adaptability, and operational stability suitable for mission-critical illumination and photonic applications.

Figure 5:
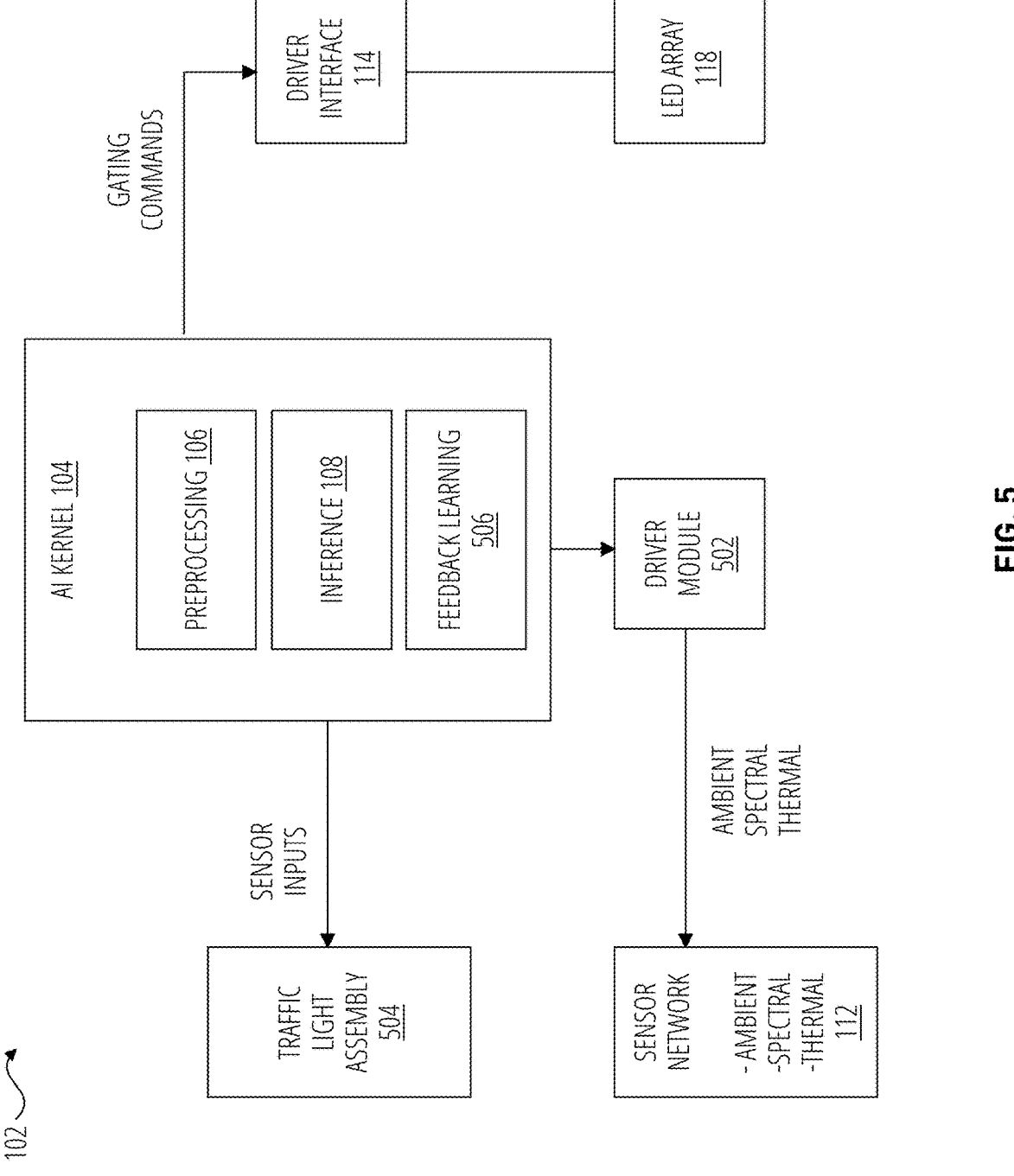
FIG. 5 illustrates the application of the AI-Gating architecture in traffic-light illumination control, showing adaptive brightness modulation and environmental feedback learning for energy-efficient signal operation.

FIG. 5 illustrates an embodiment of the AI-Gating illumination system 102 as applied to a traffic light assembly 504, demonstrating how the AI kernel 1041 integrates sensor data, inference 108 logic, and feedback learning 506 to optimize the visibility, energy efficiency, and reliability of LED-based signaling. FIG. 5 highlights the closed-loop interaction between the sensor network 112, AI kernel 104, and driver modules 502, 114 that together regulate emission intensity and spectral characteristics under variable ambient and environmental conditions.

The sensor network 112 is positioned near or within the traffic light assembly 504, and continuously acquires ambient, spectral, and thermal data from the operating environment. Ambient sensors monitor daylight intensity, fog density, and surface reflections, while spectral sensors 304 evaluate wavelength distribution to maintain accurate color reproduction for red, yellow, and green signals. Thermal sensors track junction temperature and enclosure heat, ensuring consistent brightness and preventing diode degradation under prolonged exposure or adverse weather.

These data streams enter the AI kernel 104, where a three-stage processing hierarchy governs adaptive control. The input processing 106 module filters, scales, and synchronizes sensor inputs to ensure signal clarity and consistency. The inference 108 engine applies learned illumination models to predict the optimal LED drive parameters, adjusting emission intensity, duty cycle, and spectral weighting according to real-time environmental states. The feedback learning 506 layer then analyzes deviations between predicted and actual performance, dynamically refining its internal models to improve long-term accuracy and resilience to component aging or external disturbances.

The AI kernel 104 issues Gating Commands to the driver interface 114, which translates them into precise electrical control signals for the LED arrays 118 constituting the traffic lights. Each LED emission channel, corresponding to the red, amber, and green lenses, is modulated to maintain uniform photometric output regardless of weather, time of day, or contamination (e.g., dust, condensation). Feedback from the LED emission path is continuously returned to the AI kernel 104 to update performance parameters and to ensure compliance with illumination safety standards.

By incorporating AI-Gating into traffic light assemblies 504, the AI-Gating illumination system 102 achieves significant operational advantages, including reduced power consumption during bright daylight, enhanced luminance penetration during fog or rain, and automatic compensation for optical degradation or lens discoloration. The embedded learning loop allows each installation to self-calibrate over time, maintaining consistent visual performance without manual adjustment. This embodiment illustrates how the AI-Gating architecture extends beyond general illumination to mission-critical signaling applications, where reliability, safety, and adaptive intelligence are essential for urban infrastructure and roadway efficiency.

Figure 6:
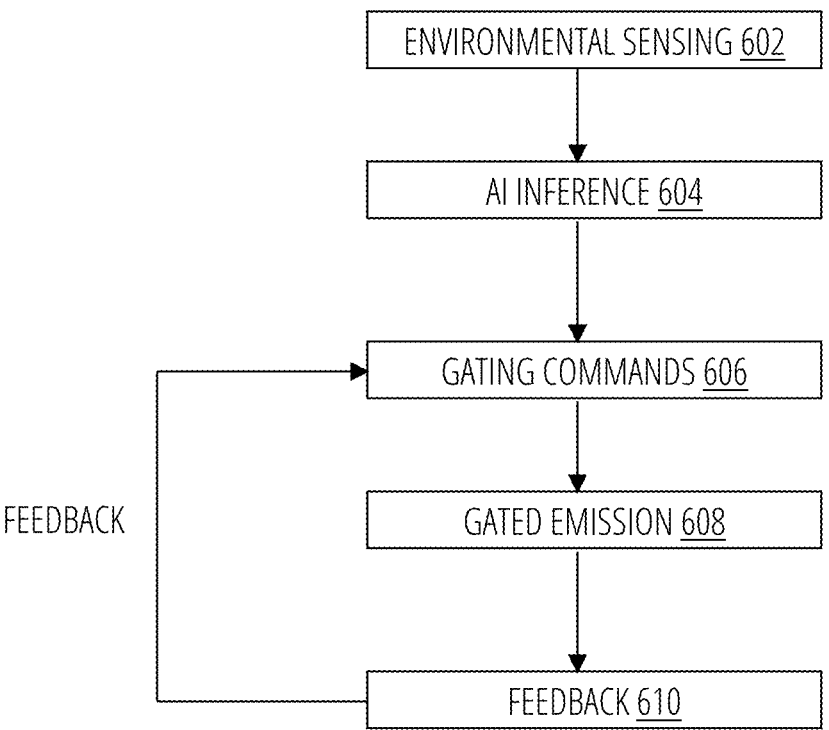
FIG. 6 shows a system-level flowchart of the AI-Gating illumination process, including initialization, data acquisition, inference, gating decision, emission control, and reinforcement-learning update.

FIG. 6 illustrates a system-level flowchart depicting the operational sequence of the AI-Gating illumination system 102, showing the continuous closed-loop interaction between environmental sensing 602, AI decision-making 604, gated emission control 606, and feedback correction 610. The process begins with environmental sensing 602, where the system's sensor network collects data on ambient illumination, spectral composition, and environmental parameters. This information is transmitted to the AI inference 604 module, which processes the data to determine optimal emission parameters in real time.

Based on these computed parameters, the AI kernel 104 generates gating commands 606 that regulate current, timing, and spectral balance for the LED or photonic emitters, resulting in gated emission 608 that adapts to the surrounding environment. Following the gated emission 608, a feedback 610 module continuously evaluates the output to ensure photometric accuracy and system stability. Deviations from the target state are analyzed and relayed back into the AI inference 604 layer, forming a dynamic learning loop that enables continuous self-correction and optimization.

This closed-loop flow ensures that illumination remains stable, efficient, and responsive under changing conditions, providing deterministic control without requiring constant external calibration or cloud connectivity.

Figure 7:
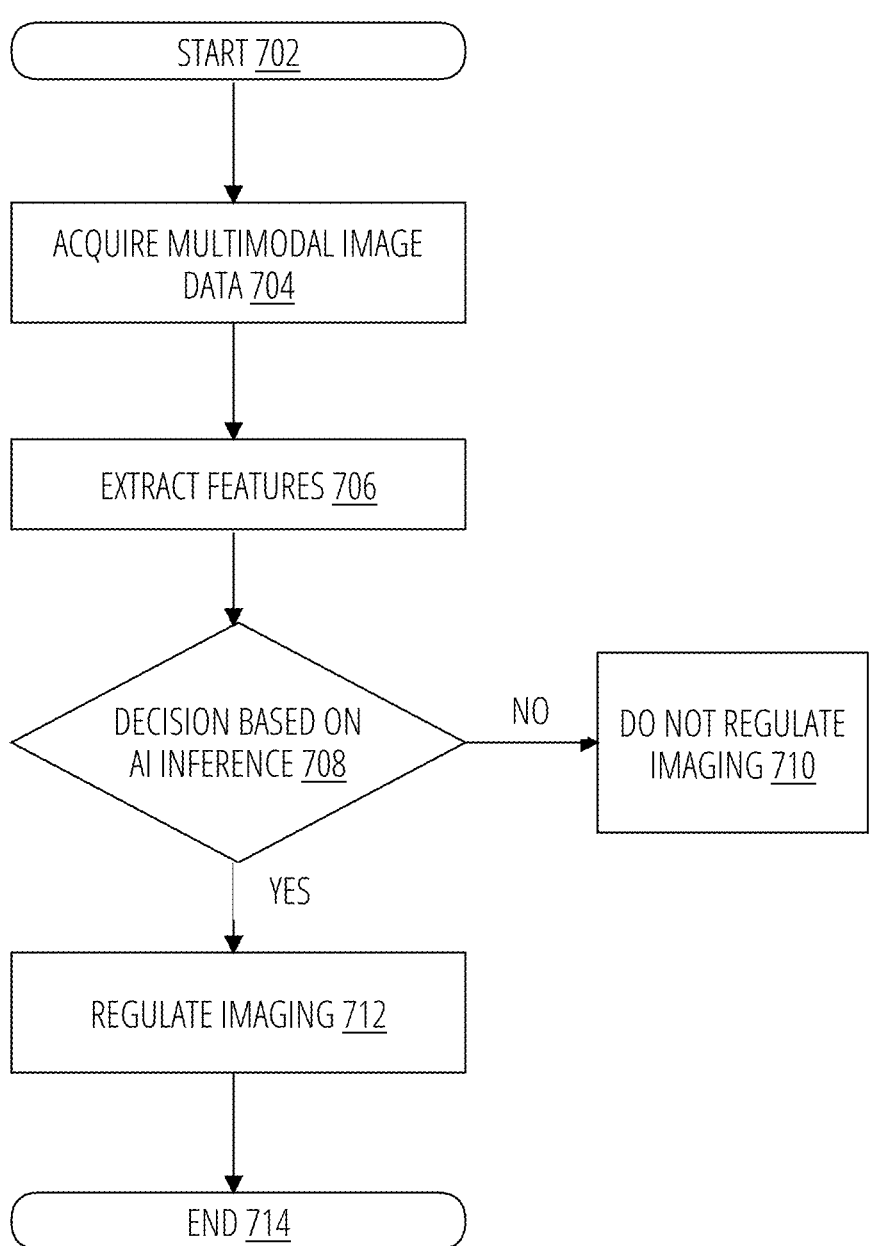
FIG. 7 depicts AI inference regulating multimodal imaging through inline decision nodes that evaluate optical data pathways before emission authorization.

FIG. 7 illustrates the operational logic of an AI-based multimodal imaging regulation process, represented as a structured flowchart that highlights how real-time decisions are made to control imaging parameters based on AI inference. This embodiment of the AI-Gating framework applies to imaging or photonic systems where data acquisition, feature analysis, and adaptive control are performed dynamically under autonomous guidance.

The process begins at the Start 702 node and proceeds to acquire multimodal image data 704, where the AI-Gating illumination system 102 collects inputs from multiple imaging modalities-such as optical, spectral, thermal, or polarization channels. These multimodal inputs are combined into a unified dataset representing the scene or environment to be analyzed. The next stage, Extract Features, involves computational isolation of relevant imaging parameters including intensity, contrast, texture gradients, spectral variance, or temperature distribution patterns.

The extract features 706 are then processed within an AI inference 108 decision node that determines whether regulation of the imaging system is required. If the AI inference 108 model predicts that the current imaging state meets predefined quality or diagnostic thresholds, the process follows the NO path, leading to the do not regulate imaging 710 outcome, indicating that no adjustments are needed and imaging continues under existing settings. If, however, the AI kernel 104 detects suboptimal imaging conditions (for example, saturation, overexposure, or contrast imbalance), the YES path is followed, triggering the regulate imaging 712 step.

During regulation, the system autonomously adjusts exposure time, illumination intensity, spectral weighting, or focus parameters to restore optimal image quality. The control feedback may involve direct adjustment of photonic emitters or sensor integration times based on AI-predicted corrections. Once imaging regulation 712 is completed, the process terminates at the end 714 node, completing the decision cycle.

This flowchart demonstrates the self-governing capability of the AI-Gating architecture when applied to multimodal imaging systems. It emphasizes the intelligent decision-making loop that ensures continuous optimization of imaging performance without operator intervention, achieving both stability and adaptive precision in real time.

Figure 8:
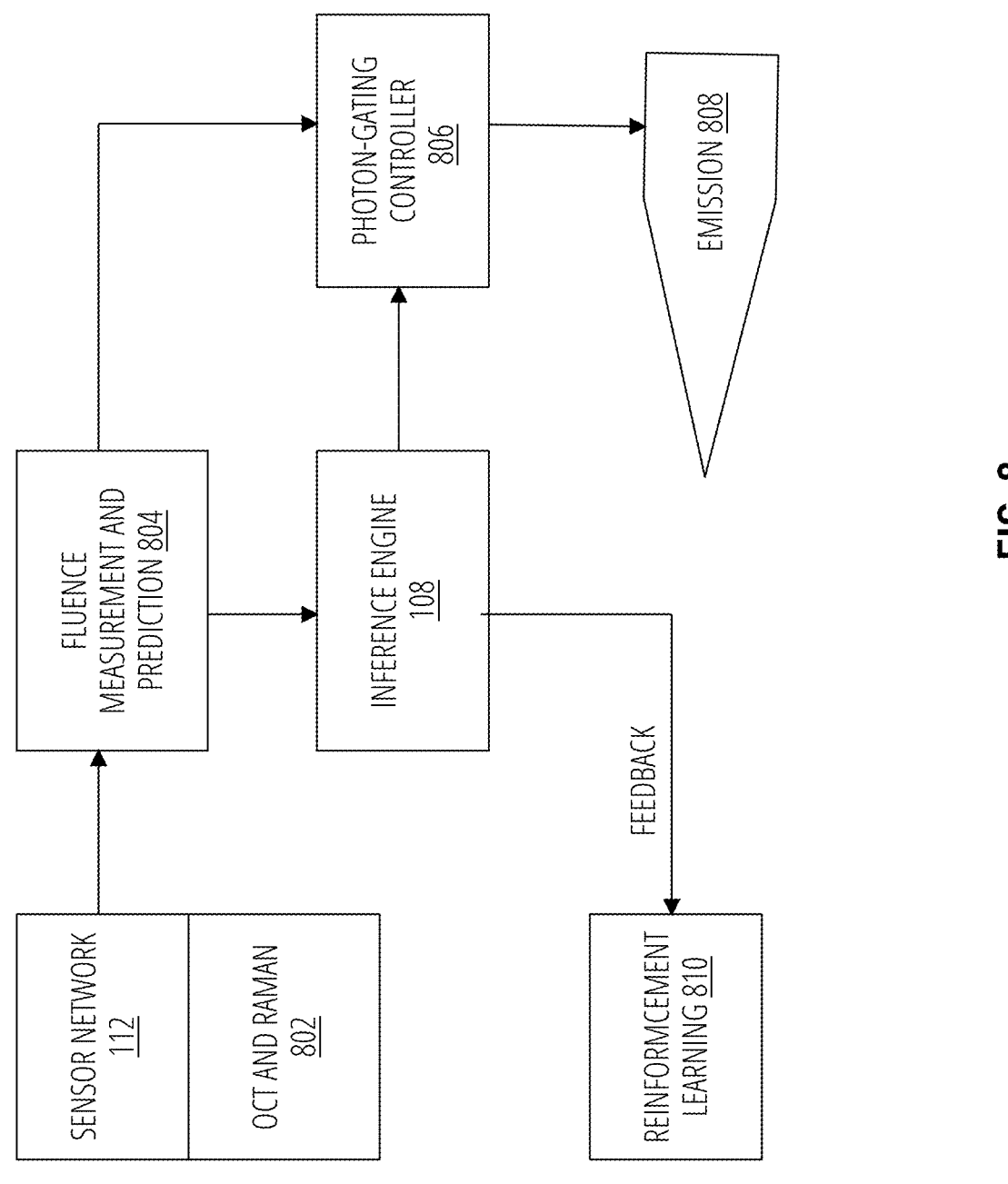
FIG. 8 represents the fluence-based AI-Gating control architecture integrating predictive inference and reinforcement learning for real-time adaptation and safety assurance.

FIG. 8 illustrates the operational framework of a fluence-based AI-Gating Control System, designed to regulate photon emission intensity and distribution according to real-time optical fluence levels derived from multimodal sensing inputs. The diagram demonstrates how the system integrates OCT (Optical Coherence Tomography) and Raman spectroscopy 802 data streams with AI-based inference 108 and reinforcement learning mechanisms to achieve precise, adaptive photonic control.

At the input stage, a sensor network 112, including OCT and Raman 802 modules, collect quantitative information regarding tissue reflectivity, absorption, scattering coefficients, and biochemical spectral responses. These measurements feed into the Fluence Measurement and Prediction 804 unit, which computes instantaneous and predicted fluence distributions. This unit estimates the photon density at the target interface or within a biological or optical medium, forming the foundational control parameter for illumination or diagnostic accuracy.

The computed fluence parameters are transmitted simultaneously to two subsystems: the AI inference 108 engine and the photon-gating controller 806. The AI inference 108 engine interprets contextual data, such as the rate of fluence change, material heterogeneity, and system calibration states, using pre-trained deep learning models that simulate energy propagation and interaction with the target. Based on these inferences, it generates adaptive control directives that optimize the temporal and spatial characteristics of photon delivery.

The photon-gating controller 806 acts as the physical intermediary between inference 108 and emission 808, converting AI-derived control signals into real-time modulation of photon output. It dynamically adjusts exposure duration, emission amplitude, pulse repetition rate, and angular spread to ensure that localized fluence levels remain within safety and efficiency thresholds.

Feedback from the emission 808 output, derived from embedded photodiodes, backscattered signal analysis, or Raman intensity variations, is routed back into the AI- Gating illumination system 102 through a Reinforcement Learning module. This adaptive learning component continually refines the AI's predictive accuracy by correlating predicted fluence with actual measured outcomes, allowing the model to self-correct for environmental variability, optical misalignment, or biological heterogeneity. Over time, this learning loop enhances both control precision and system stability.

Through this fluence-based control architecture, the AI-Gating framework ensures that optical emission remains highly optimized, maintaining diagnostic fidelity in imaging applications and therapeutic safety in laser-based procedures. The combination of predictive modeling, photon-gating precision, and reinforcement learning results in an intelligent, self-correcting illumination system that responds to real-world conditions in real time while preserving reliability, safety, and performance consistency.

Figure 9:
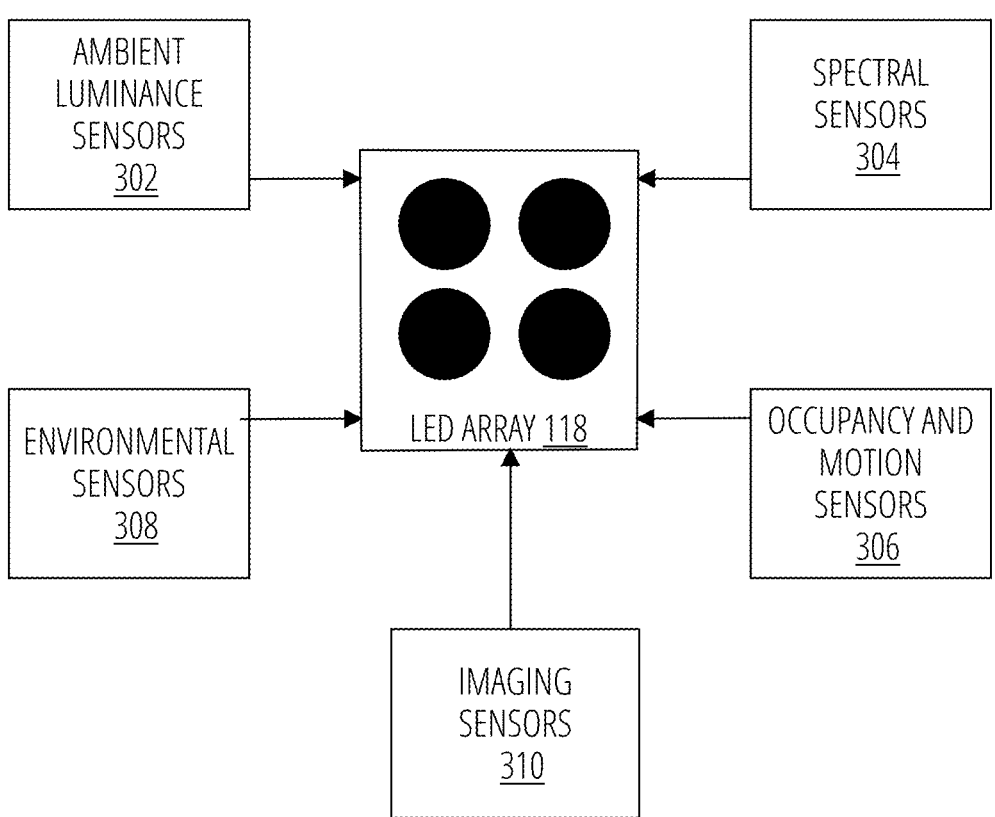
FIG. 9 shows the Sensor Network comprising ambient-luminance, spectral, occupancy, environmental, and imaging sensors surrounding the LED array. Each node time-stamps and normalizes its readings to form a unified environmental state vector governing real-time illumination response.

FIG. 9 illustrates the sensor network 112 configuration of the AI-Gating illumination system 102, showing the distributed arrangement of ambient luminance sensors 302, spectral sensors 304 occupancy and motion sensors 306, environmental sensors 308, and imaging sensors 310 positioned around a central LED array 118. Each sensor continuously acquires data reflecting its respective domain: ambient brightness for environmental light compensation, spectral information for color rendering accuracy, occupancy for presence detection and adaptive activation, environmental parameters for temperature and humidity control, and imaging data for scene interpretation or optical feedback.

Each node independently time-stamps its measurements, which are transmitted to the AI kernel 104 for synchronization and normalization. These data streams are fused to create a unified environmental state vector 312, representing a real-time model of illumination conditions. The environmental state vector 312 enables dynamic regulation of LED intensity, spectral balance, and emission geometry, ensuring that the illumination output remains stable, efficient, and responsive to environmental variations. This configuration supports both standalone and networked operation, allowing the AI-Gating illumination system 102 to perform autonomous adjustments without reliance on external control infrastructure.

Figure 10:
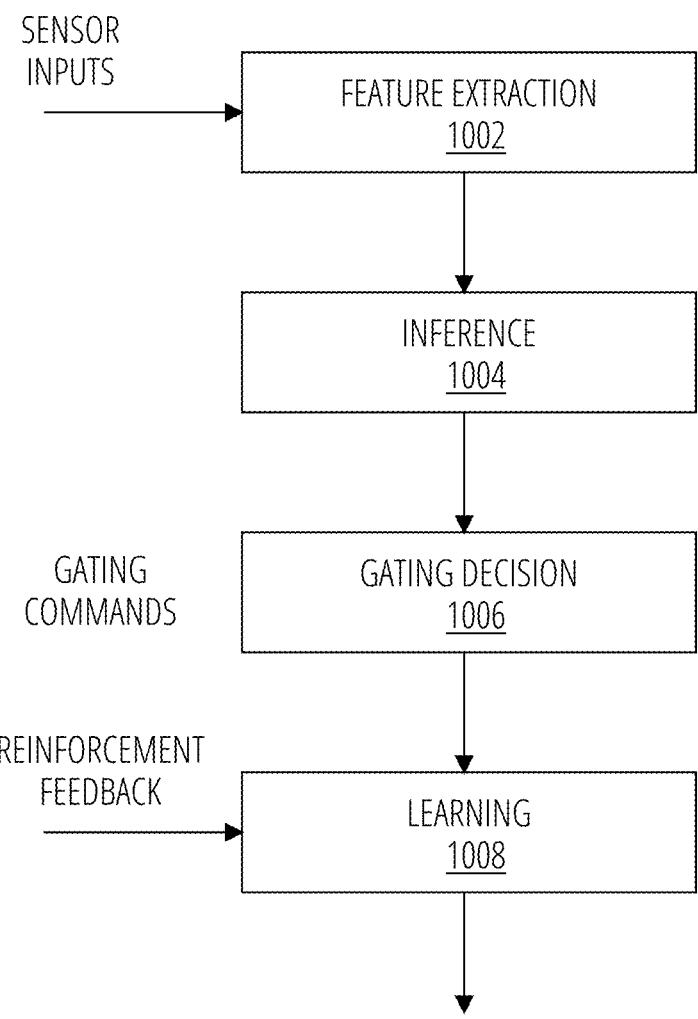
FIG. 10 illustrates the AI Kernel architecture, including feature extraction, inference layers generating the Emission Confidence Score (ECS), gating-decision stages, and reinforcement-based model refinement.

FIG. 10 illustrates the layered structure of the AI kernel 104 used within the AI-Gating framework, showing how data flow, inference, control, and learning are hierarchically organized to govern illumination or emission regulation in real time. The architecture integrates both deterministic decision-making and adaptive feedback, allowing it to refine performance dynamically based on operational results and environmental feedback.

At the top, the feature extraction 1002 layer receives raw inputs from the sensor network 112, such as spectral, ambient, imaging, and environmental data, and converts these into normalized, structured descriptors suitable for downstream analysis. This ensures consistency across sensors and corrects for noise, latency, or calibration drift before entering higher processing stages.

The inference 1004 layer performs analytical and predictive computations using pre-trained AI models. It interprets the normalized input to generate an Emission Confidence Score (ECS), a quantitative measure that represents the confidence or reliability of the predicted emission parameters, such as intensity, duration, or spectral balance.

The gating decision 1006 layer receives the ECS and uses it to issue precise control commands to the driver interface 114. These commands determine the modulation parameters of light or photon emission in real time, aligning system performance with the predicted environmental and operational needs.

The final learning 1008 layer serves as the adaptive component of the AI kernel 104, using reinforcement feedback derived from actual system performance to refine internal model weights. This feedback process allows the AI kernel 104 to continuously improve accuracy and stability over time.

In the schematic, the downward-leading line extending from the learning 1008 box intentionally remains open-ended rather than terminating in another block. This graphical choice symbolizes a continuous internal feedback loop, where learning outcomes are recursively applied to earlier layers, particularly feature extraction and inference, without creating a distinct external function. This design communicates that learning is an intrinsic and ongoing process within the AI kernel 104, rather than a discrete step.

Another way to show FIG. 10 may depict this same concept as a curved feedback arrow returning from the learning 1008 layer to the feature extraction 1002 layer or the 1004 layer, labeled "Model Weight Update" or "Reinforcement Feedback." Both depictions are technically valid; the open-ended version emphasizes conceptual recursion within the AI kernel 104, while the looping arrow version highlights the closed adaptive learning cycle explicitly.

Together, these layers form a self-optimizing architecture that enables real-time photonic regulation with embedded intelligence, continuously adjusting its decision logic for maximum accuracy, safety, and environmental adaptability.

Figure 11:
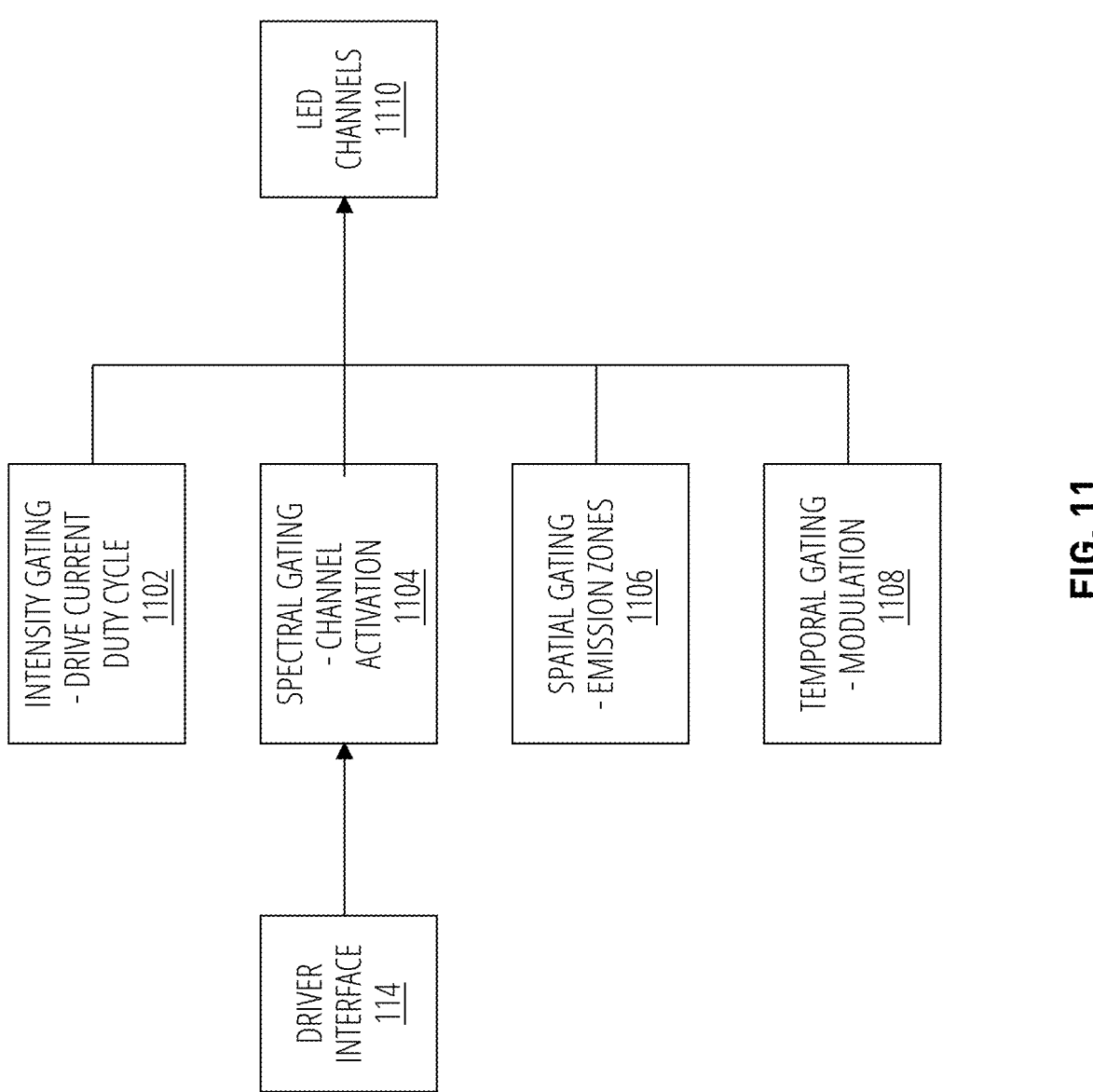
FIG. 11 illustrates the Driver Interface and associated emission-gating subsystems that form the bridge between the AI kernel and the photonic output modules. The interface converts digital inference vectors into analog drive currents, executing four coordinated gating modes—intensity, spectral, spatial, and temporal—to achieve adaptive modulation of light emission. Real-time current and voltage feedback ensure thermal stability and regulatory compliance while delivering micro- to millisecond-scale control precision.

Referring now to FIG. 11, the driver interface 114 forms the central bridge between the AI inference kernel 104 and the physical illumination hardware. It receives digital emission-control vectors generated by the AI module and translates them into precisely modulated analog drive signals governing the LED arrays 118 or laser emitters. Within this interface, four distinct gating dimensions, intensity gating 1102, spectral gating 1104, spatial gating 1106, and temporal gating 1108, are implemented concurrently, each responding to real-time inference data to achieve adaptive modulation of luminous output. The intensity gating 1102 channel modulates total radiometric power to maintain luminance within photobiological safety thresholds, while the spectral gating 1104 subsystem selectively adjusts wavelength composition to preserve chromatic accuracy and prevent unwanted color drift. Spatial gating 1106 manipulates illumination geometry through addressable diode arrays, dynamically shaping the beam pattern to optimize local visibility and contrast. Temporal gating 1108 operates at micro- to millisecond intervals, allowing the AI-Gating illumination system 102 to maintain the perception of continuous light while delivering pulsed or modulated emission that reduces energy consumption and thermal accumulation. Feedback from integrated optical and thermal sensors continuously monitors drive current, voltage, and color-temperature deviation, allowing the driver to perform self-calibration and compensate for diode aging, environmental temperature shifts, or transient load fluctuations. This feedback not only sustains output stability but also provides the AI kernel 104 with contextual data for model refinement, closing the control loop between inference and actuation. The result is a self-balancing emission network capable of delivering precise photonic control across multiple axes without manual recalibration or interruption of operation.

Operationally, the dynamic recalibration achieved through FIG. 11 ensures that light output remains both visually stable and energy-efficient. By maintaining tight feedback synchronization among all emission channels, the system minimizes glare, stabilizes luminance, and extends the service life of the illumination hardware. The combination of AI-driven inference, predictive feedback integration, and sub-perceptual modulation allows the illumination system to behave as a coherent, intelligent entity that optimizes photonic emission for performance, safety, and comfort in every operating context.

Turning to FIG. 11, the figure expands upon the coordination and feedback relationships among the multiple emission channels governed by the driver interface 114. It depicts how the AI kernel 104 serves as the supervisory controller of a continuously adapting ecosystem of light-generation components.

Sensor inputs, comprising optical intensity readings, spectral data, ambient luminance, and surface reflectivity measurements, are aggregated into a unified feedback stream that is evaluated by the inference 108 kernel in real time. The kernel interprets these data to determine whether the observed emission pattern deviates from the predicted illumination state, triggering corrective modulation commands that are instantly executed by the driver subsystem.

Within this closed-loop network, each gating mode remains interdependent yet autonomously self-tuning. Adjustments in spectral weighting may automatically prompt compensatory changes in spatial or temporal modulation to preserve overall brightness uniformity and chromatic fidelity.

The communication pathway between the driver and the kernel may be bidirectional: the driver reports instantaneous emission metrics while simultaneously receiving refined control vectors that update modulation duty cycles, current amplitudes, or wavelength-mix ratios. This cooperative feedback structure enables continuous adaptation to environmental variation, such as shifting daylight levels, reflective interference, or changes in task distance, without perceptible fluctuation to the human observer.

Operationally, the dynamic recalibration achieved through FIG. 11 ensures that light output remains both visually stable and energy-efficient. By maintaining tight feedback synchronization among all emission channels, the system minimizes glare, stabilizes luminance, and extends the service life of the illumination hardware. The combination of AI-driven inference, predictive feedback integration, and sub-perceptual modulation allows the illumination system to behave as a coherent, intelligent entity that optimizes photonic emission for performance, safety, and comfort in every operating context.

Figure 12:
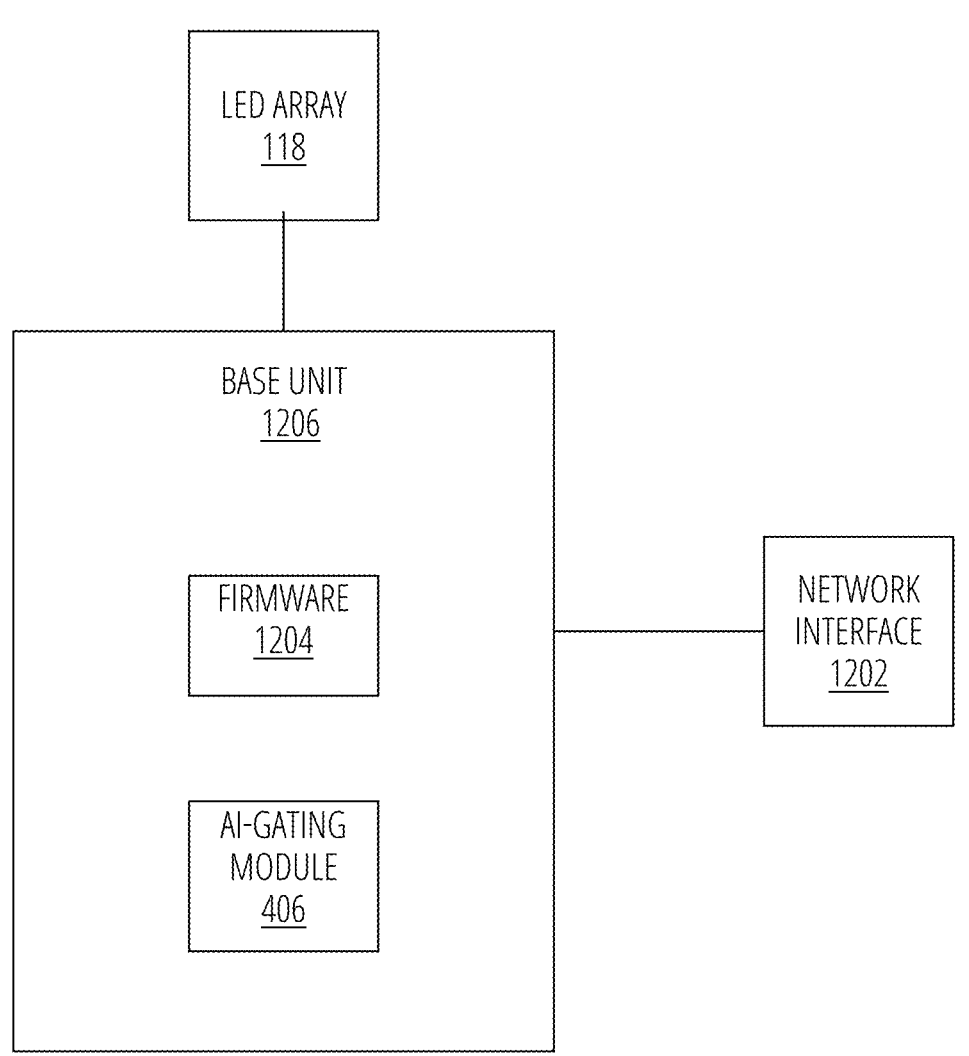
FIG. 12 presents a modular, self-contained AI-Gating unit architecture suitable for embedded or distributed deployment, illustrating interchangeable components for scalability and independent operation.
Figure 13:
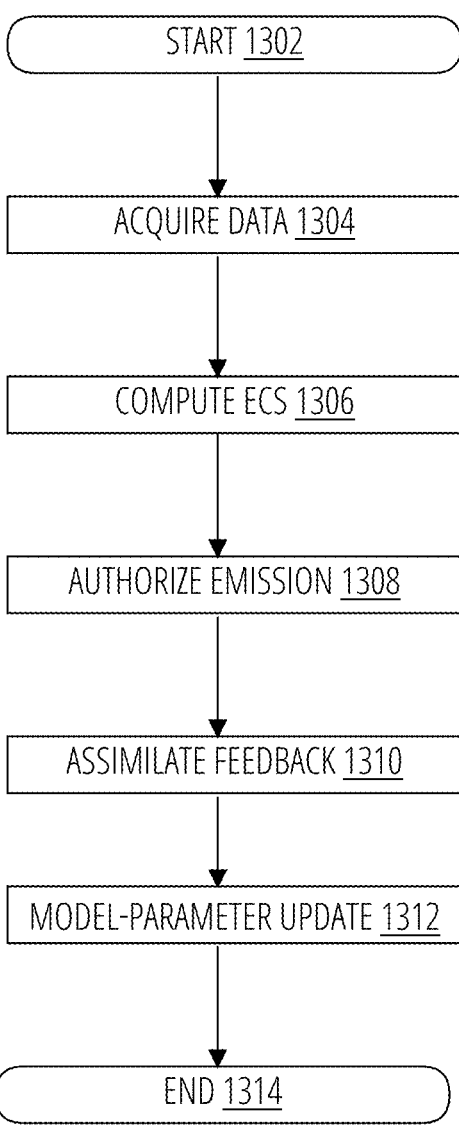
FIG. 13 illustrates the software architecture executing on an embedded processor or FPGA, showing data acquisition, ECS computation, emission authorization, feedback assimilation, and parameter-update sequences stored on a non-transitory computer-readable medium.

FIG. 12 depicts the Modular Self-Contained AI-Gating Architecture, illustrating how the illumination control system integrates essential intelligence and autonomy within a compact, layered structure. At the core lies the base unit 1206, which contains both the AI-Gating module 406 (see FIG. 4) and the embedded firmware 1204 responsible for real-time signal interpretation and control logic execution. The AI-Gating module 406 interprets input parameters, such as ambient sensor data, spectral feedback, or AI-generated directives, and translates them into precisely modulated drive signals for the LED array 118.

The firmware 1204 layer governs timing, safety protocols, and communication handshakes between the AI module and hardware components, ensuring deterministic performance even in the absence of external connectivity. By integrating these elements within the base unit 1206, the AI-Gating illumination system 102 achieves self-contained functionality, capable of executing learned illumination patterns, adaptive gating algorithms, and thermal regulation without continuous cloud or host dependency.

A network interface 1202 is shown, representing remote communication capability when expanded functionality is desired. Through this interface, firmware updates, telemetry uploads, or coordinated multi-unit operation can occur over local or cloud networks. However, the modular architecture ensures that the AI-Gating illumination system 102 remains operational and autonomous even when disconnected from the network.

In sum, this figure highlights the AI-Gating system's versatility and robustness, combining embedded intelligence, modular expandability, and self-sufficient operation within a unified photonic control platform.

Figure 14:
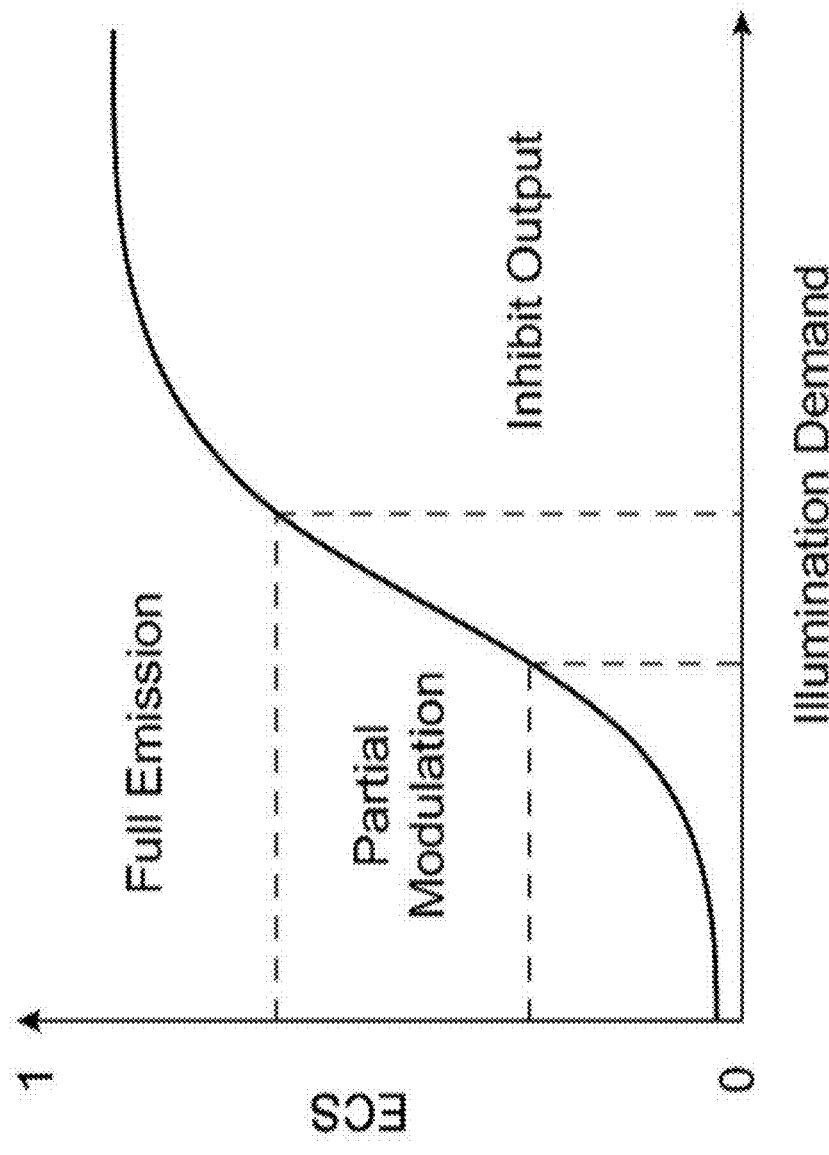
FIG. 14 plots the Emission Confidence Score (ECS) versus illumination demand, demonstrating the probabilistic relationship between inferred confidence and authorized emission output.

FIG. 14 illustrates the software architecture executing on an embedded processor (AI processor 410 in some embodiments) or Field-Programmable Gate Array (FPGA), where sequential processing blocks represent the real-time operational flow of the AI-Gating control framework. This architecture defines how sequential control, inference, and adaptive learning processes are structured to manage photonic emission with precision and reliability. Each processing block represents a critical software function that operates continuously within the embedded control loop and is stored on a computer-readable medium, ensuring persistent performance and repeatability.

The architecture starts 1302 with Data Acquisition 1304, where multimodal sensor inputs, including luminance, spectral, and environmental data, are collected and preprocessed. These data streams are synchronized, filtered, and digitized in real time, forming the foundational dataset for illumination analysis.

These inputs are passed to the ECS (Emission Confidence Score) Computation 1306 stage, where the AI kernel 104 quantifies the confidence level of the optimal emission decision based on predictive modeling and prior calibration states. The ECS represents a probabilistic metric that quantifies how confidently the system can maintain optimal lighting without over-illumination or underperformance.

Once the ECS is computed 1306, control proceeds to Emission Authorization 1308, in which the system validates that emission parameters meet defined safety, reliability, and stability thresholds before activating illumination or photonic output. This authorization 1308 layer ensures compliance with operational constraints encoded in firmware, such as voltage limits, optical power budgets, and timing envelopes.

Following, or during, emission 1308, the Feedback Assimilation 1310 stage collects photometric and electrical feedback data from the active emission process. This information is compared against expected outcomes to detect deviations or performance drift. Any discrepancies are used by the software to initiate corrective recalibration or signal re-weighting.

Finally, the system performs Model-Parameter Update Sequences 1312, in which reinforcement learning algorithms refine stored parameters based on cumulative performance. These updated parameters are written to a computer-readable medium, ensuring persistent learning across power cycles and long-term operational adaptation. The reward signal, derived from operational accuracy and efficiency metrics, drives these updates, enabling the system to improve prediction accuracy and control precision over time. Updated parameters are written to a computer-readable medium, ensuring that learned optimizations persist across system restarts or firmware updates.

This figure highlights the deterministic and adaptive nature of the AI-Gating control software, demonstrating how embedded computation supports closed-loop emission governance while maintaining precision, safety, and energy efficiency in real time.

FIG. 14 depicts the Emission Confidence Score (ECS) as a function of illumination demand, demonstrating how probabilistic inference governs real-time luminous behavior in the AI-Gating illumination system 102. The vertical axis represents ECS values ranging from 0 to 1, while the horizontal axis represents increasing illumination demand.

At low ECS values, the system inhibits output to prevent unnecessary energy use or unsafe optical exposure. As ECS increases into a mid-range zone, partial modulation occurs, illumination is permitted but regulated according to environmental or operational uncertainty. When ECS reaches high confidence levels, full emission is authorized, allowing unrestricted illumination at maximum efficiency and clarity.

This relationship demonstrates the probabilistic nature of AI-driven control, where the system continuously evaluates contextual inputs to determine the most appropriate emission level. The curve thus encapsulates the dynamic interplay between environmental feedback, AI inference, and controlled illumination output, ensuring stability, safety, and efficiency across all operating conditions.

AI-Gating Illumination System

Figure 15:
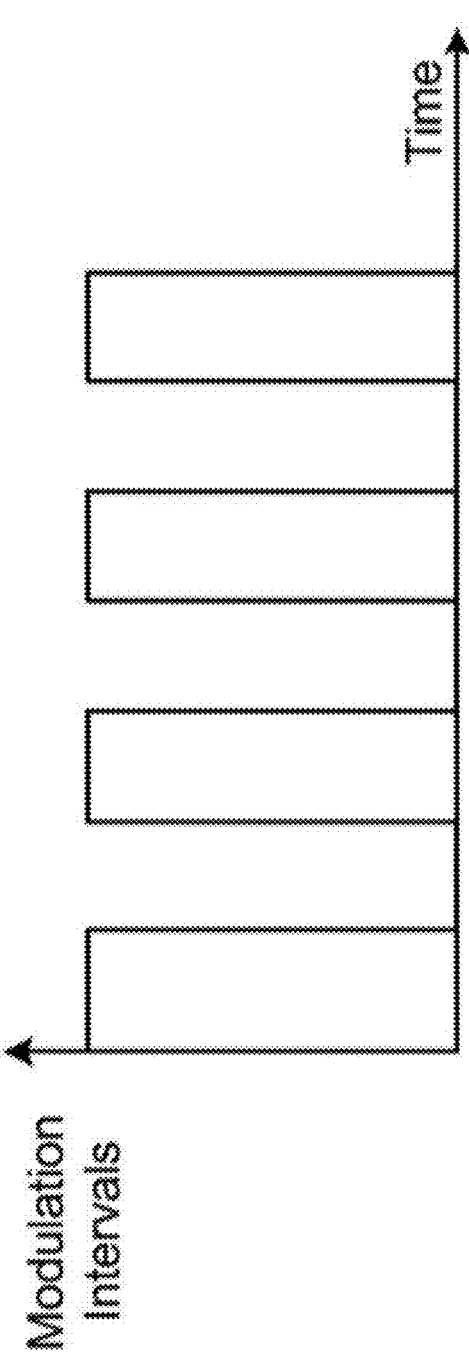
FIG. 15 shows a timing diagram representing micro- to millisecond modulation intervals used for predictive LED pre-activation, maintaining apparent lighting continuity while conserving energy.

Following the closed-loop emission control illustrated in FIG. 11, the operational timing and predictive characteristics of the AI-Gating illumination system 102 are further detailed in FIG. 15. This subsequent figure transitions from the architectural and electronic framework of the driver interface 114 to the temporal dynamics governing real-time modulation. It demonstrates how microsecond-to-millisecond pulse intervals are computed, predicted, and executed by the control kernel to sustain perceptually continuous illumination while optimizing energy efficiency and thermal performance.

The synchronization between predictive gating and feedback assimilation ensures that every emission event occurs within physiologically imperceptible timeframes, allowing the system to maintain luminance consistency even as it performs rapid, adaptive recalibration. Together, FIGS. 11-15 therefore delineate the hierarchical structure and functional logic of the AI-Gating illumination architecture, from hardware-level emission control to adaptive temporal sequencing, establishing the foundation upon which all subsequent application-specific embodiments are built, including surgical, vehicular, architectural, and industrial implementations.

FIG. 15 illustrates the timing dynamics underlying the predictive modulation of LED emission within the AI-Gating illumination system 102. The diagram plots modulation intervals on the vertical axis against time on the horizontal axis, showing a repetitive waveform composed of discrete, precisely timed pulses. Each pulse represents a controlled emission event triggered by the driver interface 114 under real-time guidance from the AI kernel 104.

Between these emission pulses lie brief pre-activation intervals, measured in microseconds to milliseconds, during which the LEDs enter a standby state in preparation for the next illumination cycle. These transitions occur at frequencies above the threshold of human visual perception, producing the effect of continuous, steady light even though the LEDs are intermittently powered.

This intelligent modulation mechanism allows the AI-Gating illumination system 102 to achieve predictive energy management, activating light output only when required by environmental or operational conditions, while maintaining seamless visual continuity. Through constant adaptation, the system minimizes unnecessary current draw, reduces thermal buildup, and extends diode longevity. The combination of computational foresight and precise temporal control results in a lighting platform that is not only efficient and durable but also visually imperceptible in its modulation, preserving uniform illumination in all viewing conditions.

Figure 16:
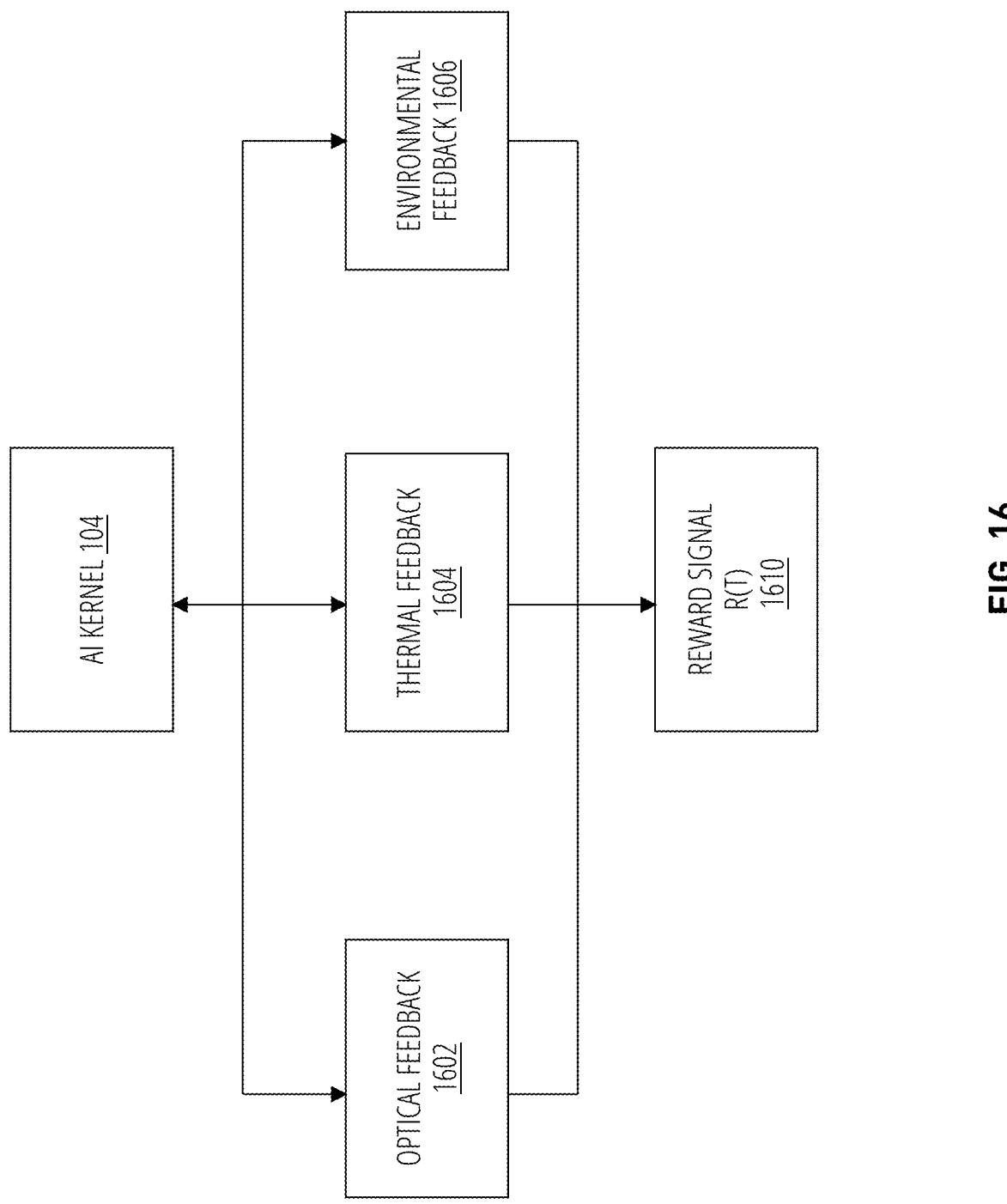
FIG. 16 illustrates the Feedback Module integrating optical, thermal, power, and environmental loops that generate the reward signal R(t) for adaptive reinforcement learning within the AI Kernel.

FIG. 16 illustrates the feedback module 116 architecture that enables adaptive learning and self-optimization within the AI-Gating illumination system 102. FIG. 16 shows how the AI kernel 104 receives continuous multidimensional feedback, optical, thermal, and environmental, to generate a composite reward signal 1610 R(t), which serves as the fundamental parameter for reinforcement learning. This feedback-driven control loop allows the AI-Gating illumination system 102 to refine its gating strategy dynamically, improving illumination precision, efficiency, and stability over time.

At the top of the diagram, the AI kernel 104 acts as the central decision-making unit. It interprets the various sensor streams, adjusts emission commands, and evaluates the resulting outcomes through recurrent feedback channels. The optical feedback 1602 path measures real-time luminous intensity, spectral fidelity, and spatial uniformity of emitted light. By comparing measured output against expected or commanded values, the AI kernel 104 can detect deviations caused by diode aging, driver drift, or external reflectance variations, and compensate immediately by adjusting drive current or modulation timing.

The thermal feedback 1604 loop monitors junction temperature and ambient heat dissipation around the light-emitting elements. This data enables proactive thermal regulation, preventing overheating and maintaining diode performance within optimal operational limits. By integrating this feedback, the system can also anticipate degradation trends, reducing current density or adjusting duty cycle to extend component lifespan.

The environmental feedback 1606 channels capture ambient and contextual data, including temperature, humidity, particulate presence, and background illumination. These signals help the AI kernel 104 interpret external disturbances that may affect light propagation or sensor accuracy. For example, fog or airborne particulates may require compensatory adjustments to emission intensity or color temperature to preserve visual clarity and uniformity.

Each of these feedback pathways contributes to the computation of a reward signal 1610 R(t), a real-time quantitative index that reflects the degree of success or deviation from target illumination parameters. The AI kernel 104 uses R(t) to update its internal policy weights according to reinforcement learning algorithms. A higher reward corresponds to stable, efficient operation, whereas a lower reward triggers adaptive recalibration to correct for inefficiencies or instability.

This structure establishes a closed-loop learning mechanism: feedback continuously informs the AI kernel 104, which in turn refines its decision-making model to improve predictive accuracy and maintain photometric consistency. Over time, this process enables the AI-Gating illumination system 102 to achieve superior reliability, energy efficiency, and environmental responsiveness compared to static illumination systems.

Figure 17:
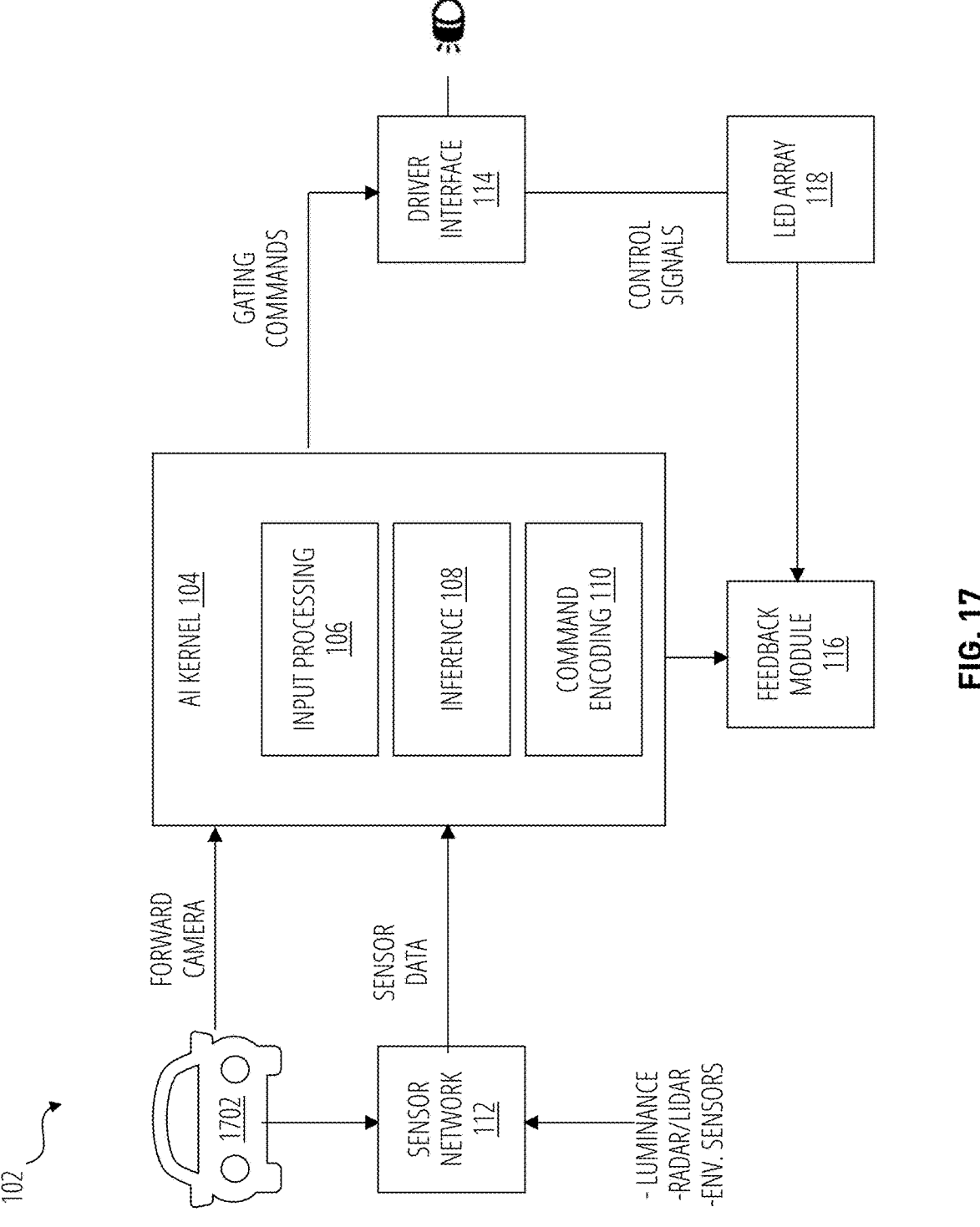
FIG. 17 depicts an AI-Gating vehicular illumination system in which headlight intensity, beam angle, and spectral composition adapt to ambient and traffic conditions in real time.

FIG. 17 illustrates the integration of the AI-Gating architecture into a vehicular illumination system, showing how artificial intelligence dynamically governs headlight intensity, beam pattern, and spectral output in response to real-time environmental and driving conditions. This embodiment extends the AI-Gating control methodology, previously applied to static and architectural illumination, into a mobile, safety-critical context, where adaptive photonics are essential for both driver visibility and pedestrian safety.

At the system's core, an AI kernel 104 processes multimodal sensor data acquired from the sensor network 112, which may include imaging sensors 310, luminance detectors, and LiDAR or radar modules positioned around the vehicle. The sensor network 112 continuously captures data such as oncoming traffic presence, road curvature, weather conditions, and surface reflectivity. These data streams are time-stamped, normalized, and processed to form a real-time environmental state vector 312, representing the vehicle's optical environment at each instant.

From this input, the AI kernel 104 computes Emission Confidence Scores (ECS) that determine the appropriate emission mode. When ECS values indicate high confidence, such as on unoccupied rural roads or highways, full high-beam emission is authorized. Intermediate ECS levels trigger modulated illumination, balancing visibility with glare suppression, while low ECS levels initiate selective beam gating to prevent dazzling oncoming drivers or reflecting off nearby vehicles.

The driver interface 114 translates these AI commands into fine-grained electrical signals that control segmented LED headlight arrays. Within each headlight, spatial gating selectively activates or dims diode clusters to shape the beam profile dynamically, producing adaptive light "shadows" around detected vehicles or pedestrians. Simultaneously, intensity and temporal gating adjust luminous flux and pulse timing to maintain continuous visual perception while minimizing energy use.

The feedback module 116 closes the control loop by measuring optical flux, temperature, and current delivery across LED channels. These data are relayed back to the AI kernel 104, which refines its inference 108 parameters and model weights through reinforcement learning. Over time, this feedback allows the AI-Gating illumination system 102 to adapt to regional lighting regulations, driver habits, and hardware aging, ensuring stable and compliant operation without manual recalibration.

AI-Gating significantly enhances vehicular illumination by introducing predictive, self-optimizing intelligence that replaces binary beam-switching mechanisms with real-time adaptive control. The result is a headlight system capable of maintaining maximum roadway visibility, minimizing glare, and conserving energy, all while extending LED component lifespan. This embodiment demonstrates how the disclosed AI-Gating platform can serve as a cornerstone for next-generation automotive lighting systems, uniting precision photonics with autonomous decision-making for enhanced safety and performance.

Figure 18:
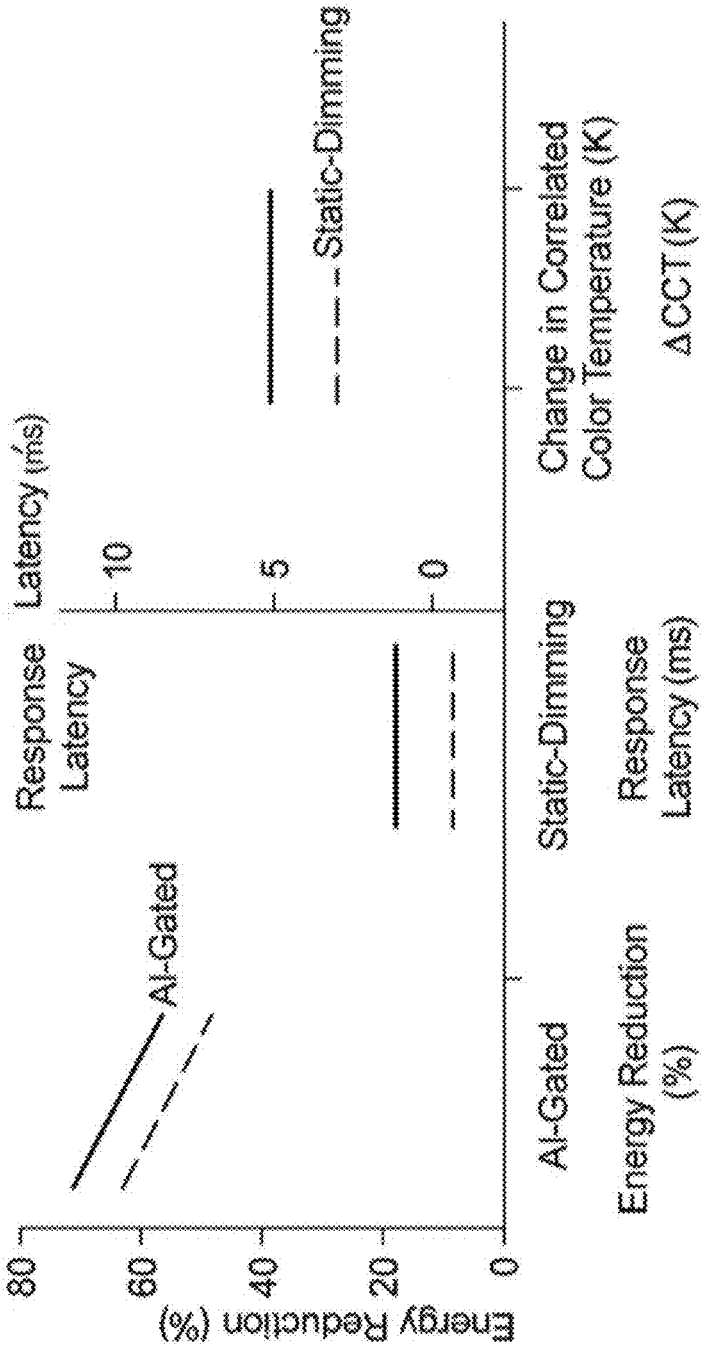
FIG. 18 graphically compares AI-Gating and static-dimming systems, showing approximately 40-70 percent energy reduction, sub-10 millisecond response latency, and spectral conformity within ±100 K ΔCCT.

FIG. 18 graphically compares the performance characteristics of an AI-Gating illumination system 102 with a static-dimming control system, emphasizing the adaptive, energy-efficient, and photometrically stable advantages of AI-based regulation. The figure plots system performance metrics over time, showing two curves that represent the dynamic responsiveness and energy efficiency of each approach under varying illumination demands.

The AI-Gating curve demonstrates an adaptive trajectory characterized by smooth modulation transitions and predictive energy control. Through continuous feedback from luminance, spectral, and thermal sensors, the AI kernel 104 adjusts drive current, duty cycle, and activation ratios in real time to maintain optimal light levels. This results in approximately 40-70 percent energy reduction compared to conventional static-dimming systems, which operate under fixed schedules or preset brightness levels regardless of environmental variability.

The adaptive behavior of the AI-Gating illumination system 102 also manifests in its sub-10-millisecond response latency, a key parameter that ensures the system reacts almost instantaneously to changes in ambient conditions or user demand. This responsiveness is achieved through embedded inference 108 on an FPGA or dedicated AI processor 410, where feedback assimilation and emission authorization occur within microsecond control loops.

Additionally, FIG. 18 illustrates the AI-Gating system's ability to maintain spectral conformity within ±100 K ΔCCT, signifying that color temperature and chromatic balance remain perceptually stable even as energy consumption fluctuates. Static-dimming systems, by contrast, often exhibit spectral drift as current levels vary, leading to inconsistent color rendering and reduced visual comfort.

Together, these performance characteristics validate the AI-Gating system's superior adaptive performance, combining predictive intelligence with closed-loop control. The resulting illumination platform is not only more energy-efficient and durable but also capable of preserving human visual consistency, demonstrating how artificial intelligence fundamentally transforms conventional lighting control into a responsive, context-aware, and environmentally sustainable technology.

Figure 19:
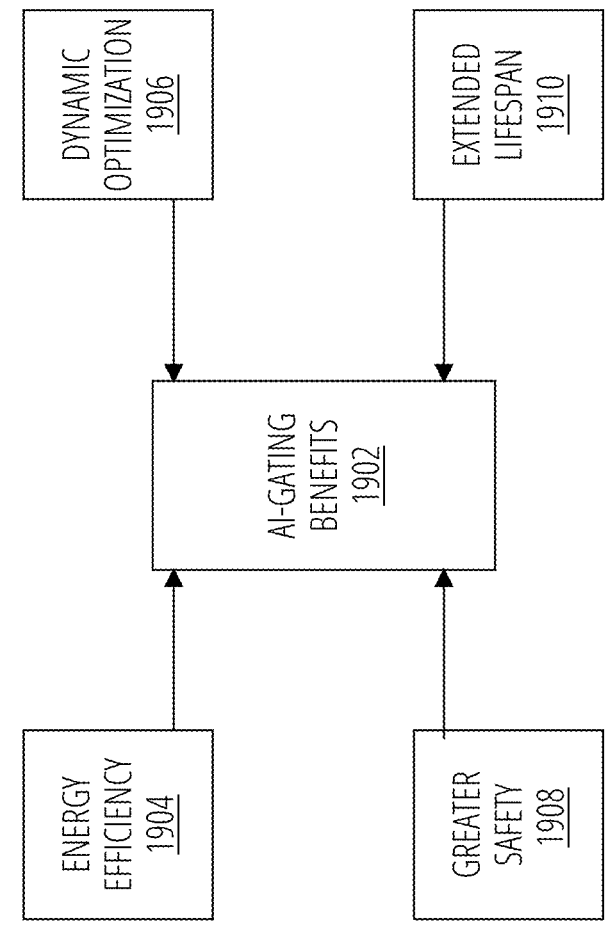
FIG. 19 illustrates a conceptual map of performance benefits derived from AI-Gating, including enhanced illumination precision, energy efficiency, and operational safety. The diagram contrasts adaptive control against static or manually adjusted lighting.

FIG. 19 illustrates the multidimensional performance benefits 1902 achieved through the disclosed AI-Gating photonic control framework. The figure depicts the synergistic interaction of four principal domains, energy efficiency 1904, photometric stability, adaptive safety assurance 1908, and learning resilience, each converging upon a central operational core referred to as the AI-Gating Optimization Kernel. Together, these domains define a self-regulating illumination ecosystem capable of maintaining stability, safety, and efficiency across a wide range of operating environments.

Within this framework, energy efficiency 1904 reflects the predictive power of the AI kernel 104 to anticipate illumination demand and authorize emission only when necessary. Through temporal and spectral gating, the AI-Gating illumination system 102 reduces redundant photon output and minimizes electrical waste. These predictive control mechanisms yield energy savings in the range of forty to seventy percent when compared to conventional dimming or static-lighting systems. The system's operation is therefore characterized not merely by reduced energy consumption but by intelligent allocation of light as a dynamic resource.

Photometric stability represents another defining advantage of AI-Gating. Continuous feedback from optical, thermal, and environmental sensors 308 allows the AI-Gating illumination system 102 to maintain uniform luminance and color temperature even as external conditions fluctuate. The driver interface 114 responds instantaneously to AI commands, adjusting current amplitude, spectral blending, and beam geometry to preserve visual consistency. The resulting illumination remains perceptually steady and physiologically safe, maintaining continuous compliance with ANSI and IEC photobiological standards.

Adaptive safety assurance is embedded into every layer of system control. Each emission event is verified through a real-time safety validation loop that references both the AI model and the hardware safety envelope before photon release. This mechanism ensures that over-illumination, excessive temperature, or spectral anomalies are immediately corrected through deterministic fallbacks. The AI-Gating illumination system 102 thus provides intrinsic protection without reliance on manual oversight, maintaining stable operation even during transient hardware or environmental disturbances.

Learning resilience describes the capacity of the AI kernel 104 to preserve and refine its operational accuracy over time. Through reinforcement-based parameter updates, the AI-Gating illumination system 102 learns from each operational cycle, adapting its control weights to compensate for diode aging, optical fouling, or sensor drift. This adaptive process extends the effective lifespan of the lighting modules and maintains optimal performance even after prolonged operation.

Taken together, these four domains, energy efficiency, photometric stability, adaptive safety assurance, and learning resilience, form an integrated architecture that transforms lighting control into a form of cognitive photonics. The AI-Gating Optimization Kernel unites these functions into a single continuous process of perception, prediction, and correction. The result is an illumination platform that is not only efficient and reliable but also self-aware in its regulation of energy, safety, and spectral precision. Through this combination of intelligence and determinism, the AI-Gating illumination system 102 establishes a new standard for illumination technology across architectural, industrial, and biomedical applications.

Figure 20:
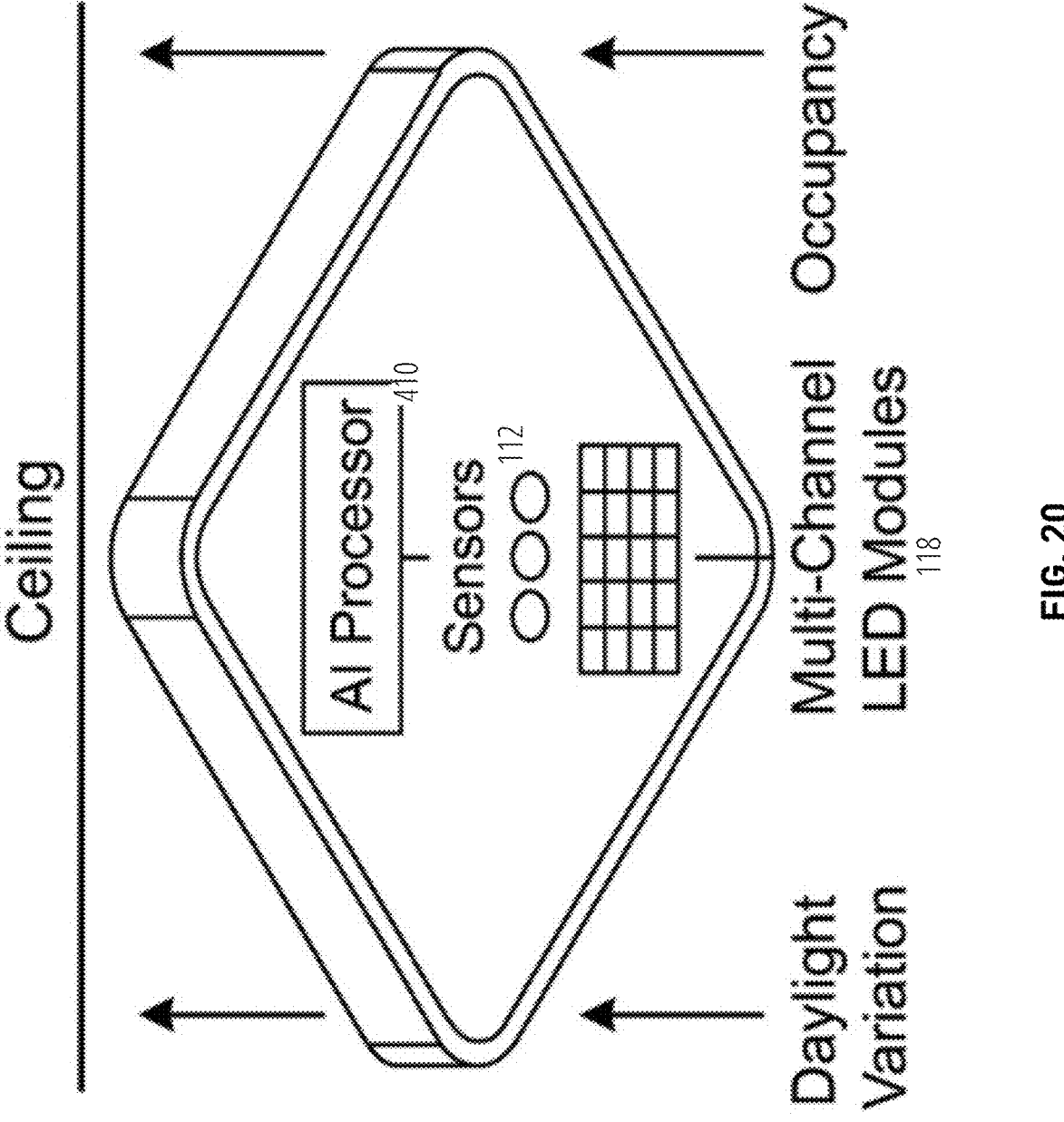
FIG. 20 illustrates an architectural ceiling-mounted luminaire containing embedded sensors, an AI processor, and multi-channel LED modules that autonomously balance brightness and spectral quality according to occupancy and daylight variation.

FIG. 20 illustrates the data acquisition structure of the sensor network 112 and its integration within the AI kernel 104 for generating a unified environmental state representation. The AI-Gating illumination system 102 includes multiple sensor classes, ambient luminance sensors 302, spectral sensors 304, occupancy and motion sensors 306, environmental sensors 308, and imaging sensors 310, each continuously sampling specific physical or optical parameters relevant to illumination control.

Ambient luminance sensors 302 capture baseline light levels from natural and artificial sources, providing the AI kernel 104 with real-time context regarding ambient brightness and shading patterns. Spectral sensors 304 measure wavelength composition to detect chromatic temperature and color rendering variations, allowing the system to maintain consistent spectral quality as environmental lighting shifts throughout the day.

Occupancy and motion sensors 306 determine the presence and activity level of individuals within the monitored area, ensuring illumination is provided only when and where it is required. Environmental sensors 308, such as temperature and humidity probes, contribute auxiliary data that influence system calibration, compensating for factors like thermal drift or humidity-induced refractive shifts in optical materials.

Figure 21:
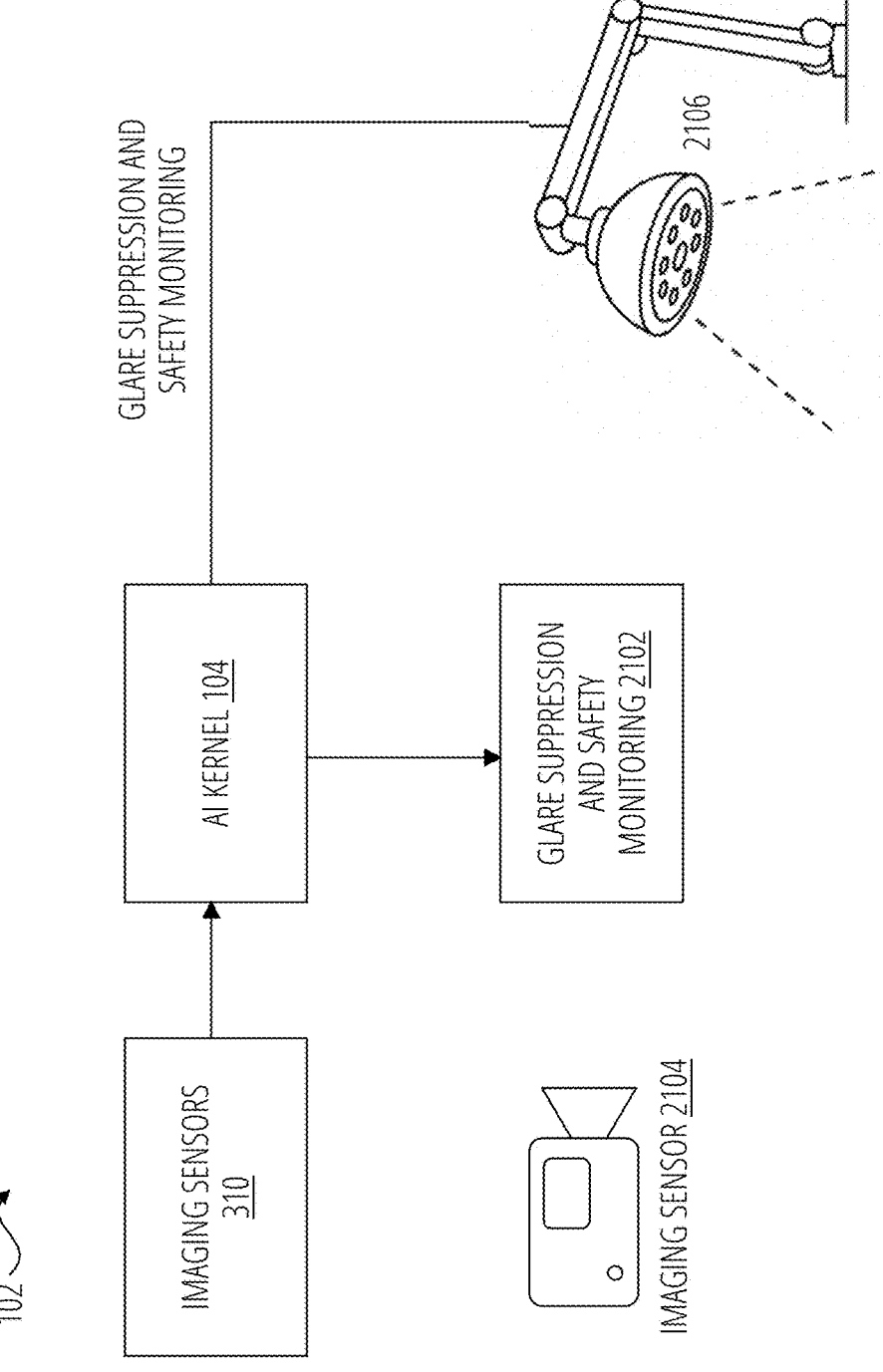
FIG. 21 depicts a medical or surgical task light equipped with an imaging sensor for glare suppression and safety monitoring. The AI Kernel modulates output intensity to maintain retinal-safe fluence while preserving high-contrast visualization.

FIG. 21 illustrates a medical or surgical task light embodiment incorporating an AI-Gating illumination system 102 designed for precision lighting and visual safety in clinical environments. The luminaire integrates a central AI kernel 104, an imaging sensor 2104, and multi-channel LED emitters 2106, forming a closed-loop system that continuously regulates intensity and spectral output in real time.

At the core of this AI-Gating illumination system 102, the AI kernel 104 performs adaptive control based on continuous optical and physiological feedback. The embedded imaging sensor 2104 monitors the illumination field, detecting factors such as glare, surface reflectivity, and light scatter 2102. This data is processed by the AI kernel 104 to determine optimal luminous distribution, ensuring consistent illumination without exceeding retinal-safe fluence thresholds.

The LED emitters 2106 are divided into controllable spectral channels that include cool-white, warm-white, and narrowband color segments. Through spectral and spatial gating, the AI-Gating illumination system 102 dynamically balances contrast and shadow definition to support high-resolution visualization of fine anatomical details while minimizing surgeon fatigue. The AI kernel 104 adjusts drive current, duty cycle, and modulation intervals according to feedback from both optical and thermal sensors, thus maintaining thermal equilibrium and extending emitter lifespan.

An integrated safety subroutine uses the imaging sensor's real-time readings to recognize reflective or fluid surfaces that may cause hazardous glare. When such conditions are detected, the AI kernel 104 instantaneously reduces localized luminous flux or redistributes emission angles, preserving visibility without compromising safety.

This configuration offers a marked improvement over conventional task lighting systems, which rely on fixed output settings or manual adjustment. By employing predictive control and feedback-based learning, the AI-Gating light adapts seamlessly to procedural needs and ambient variations, maintaining optimal visual clarity while safeguarding ocular health. The result is an intelligent surgical illumination platform that merges precision, adaptability, and patient safety into a unified system architecture.

Imaging sensors 310 augment these inputs by delivering spatially resolved information—detecting localized reflectance, glare, and movement patterns that can affect visibility and comfort. All sensor inputs are timestamped, normalized, and fused within the AI Kernel to form an Environmental State Vector. This composite vector encapsulates the instantaneous optical, thermal, and occupancy conditions of the environment.

The environmental state vector 312 serves as the foundational input for downstream inference 108 processes, enabling predictive illumination adjustments that are both adaptive and energy-efficient. By integrating these heterogeneous sensor modalities into a unified state representation, the AI-Gating illumination system 102 achieves dynamic contextual awareness, allowing it to anticipate changes in the scene and optimize light emission proactively rather than reactively.

Figure 22:
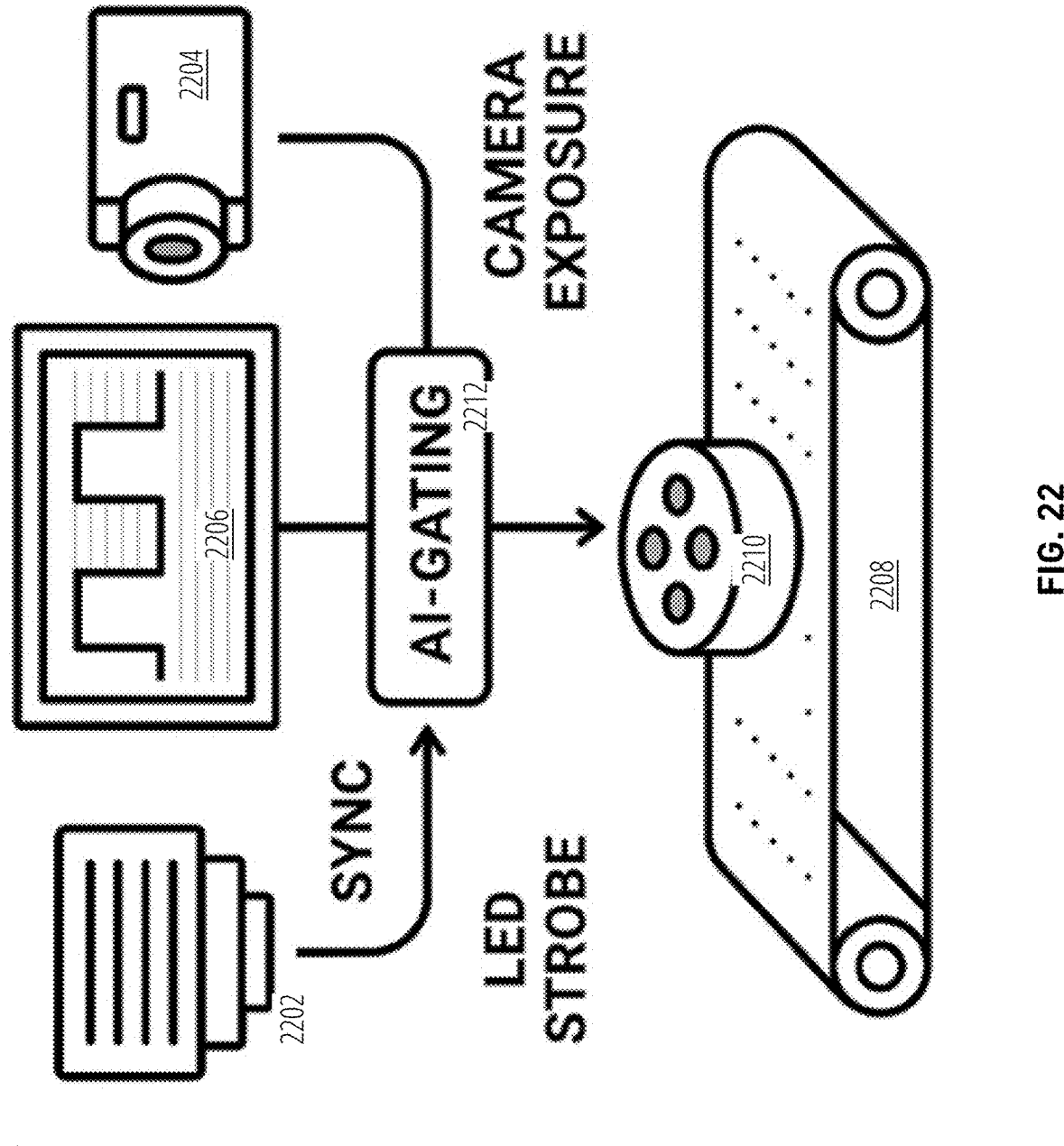
FIG. 22 diagrammatically represents the principal operating modes of the system, predictive-adaptive, reactive, circadian, energy-conservation, and collaborative, with bidirectional arrows indicating automatic transitions governed by contextual inference.

FIG. 22 illustrates an industrial implementation of the AI-Gating illumination system 102 in a high-speed inspection environment. This embodiment demonstrates the synchronization of an LED strobe 2202 with camera 2204 exposure through an intelligent gating algorithm 2206 that dynamically aligns photon emission with frame timing to achieve superior imaging precision and reduced motion artifacts.

The configuration comprises a conveyor platform 2208 transporting objects 2210 under inspection, illuminated by a high-intensity LED strobe 2202 positioned to deliver uniform, short-duration light bursts. A machine-vision camera 2204 is oriented above the conveyor platform 2208, its exposure intervals coordinated by the AI-Gating module 2212. The AI-Gating module 2212, situated centrally in the system diagram, functions as the synchronization and decision hub. It continuously processes sensor feedback, including motion velocity, frame rate, and object reflectivity, to modulate both emission timing and duration with submillisecond accuracy.

A synchronization signal (SYNC) line connects the LED strobe 2202 and AI-Gating module 2212, ensuring that photon emission occurs exclusively during the optimal exposure window of each camera 2204 frame. This alignment eliminates blur or streaking that typically arises in asynchronous lighting systems, particularly when inspecting moving parts or reflective surfaces.

The AI-Gating logic kernel 2206 employs predictive temporal modeling, forecasting when each frame will begin and compensating for latency variations in mechanical or optical subsystems. By adjusting emission duty cycles, luminous intensity, and strobe phase in real time, the AI-Gating illumination system 102 maximizes contrast and minimizes redundant exposure energy.

This embodiment is particularly suited for industrial quality assurance, precision metrology, and surface defect detection, where fast-moving assemblies or rotating components must be imaged with micrometer-level clarity. The system's adaptive intelligence permits continuous calibration to environmental variables such as vibration, ambient light, or conveyor speed, making it robust for deployment in automated factories and optical inspection lines.

Overall, FIG. 22 conveys the functional principle of AI-Gating photon-frame synchronization, where illumination and imaging are not independent processes but elements of a closed-loop intelligent system that achieves both visual fidelity and operational efficiency through synchronized emission control.

Figures 23, 26:
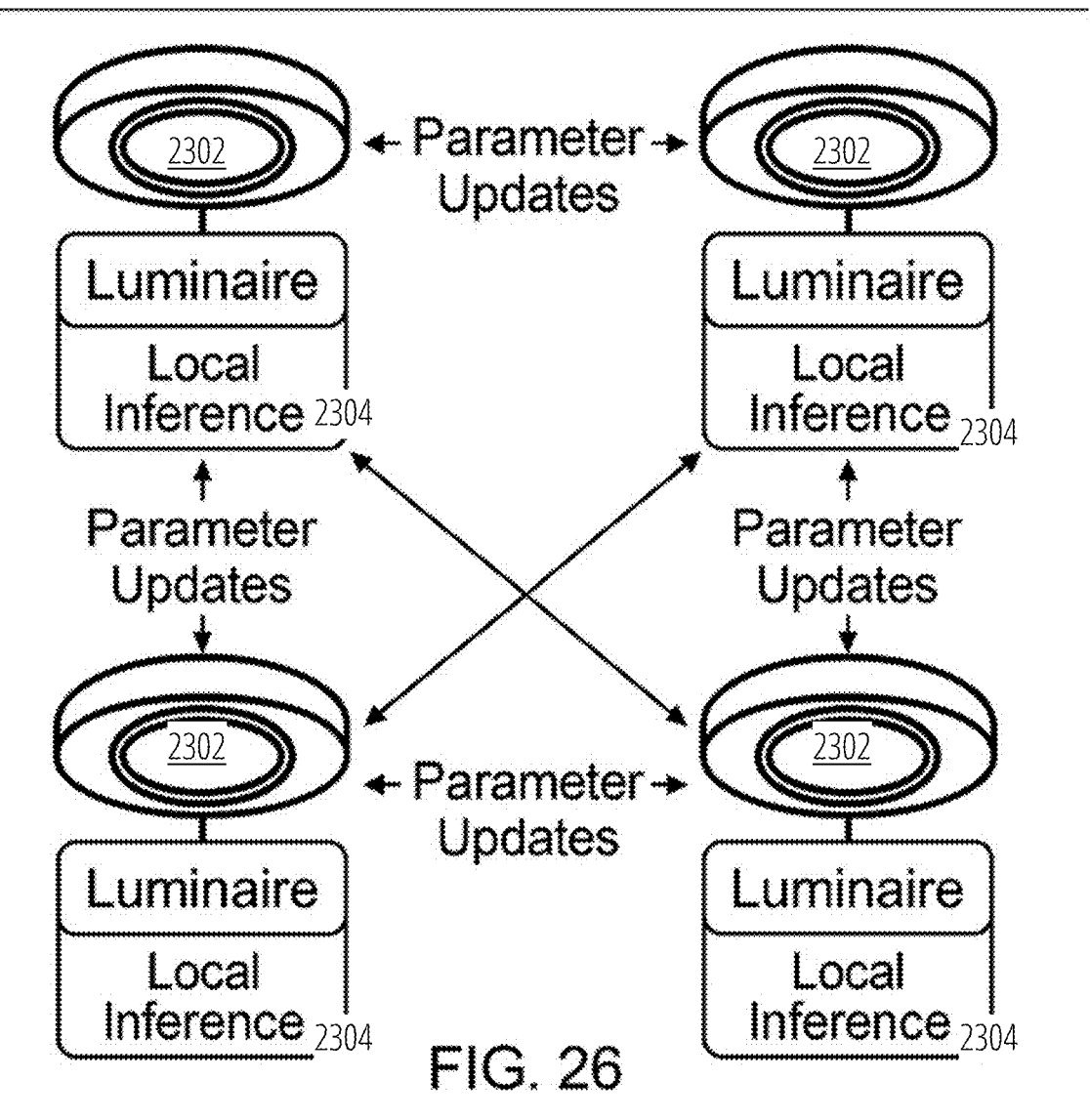
FIG. 23 shows a federated-learning network of AI-Gating luminaires. Each fixture performs local inference while exchanging encrypted parameter updates with peer units, enabling system-wide adaptation without cloud dependence.
FIG. 26 provides a summary of AI-Gating functional architecture and modular embodiments, including distributed and embedded implementations.

FIG. 23 illustrates a federated-learning network architecture implemented across multiple AI-Gating luminaires 2302. Each fixture operates as an autonomous node within a distributed intelligence framework, performing local inference 2304 while securely exchanging encrypted parameter updates with peer units. This cooperative architecture enables system-wide learning and adaptation without dependence on centralized cloud infrastructure, ensuring both operational resilience and data privacy.

At the core of each luminaire 2302 is an AI kernel 104 equipped with localized inference 108 capability. The AI kernel 104 processes multimodal sensor data, including ambient illumination, occupancy, spectral characteristics, and environmental feedback, to generate real-time control outputs for emission intensity, spectral blending, and temporal modulation. Each luminaire 2302 thereby maintains independent functionality, continuously optimizing its illumination performance according to its immediate context.

While operating autonomously, these nodes engage in federated-learning synchronization, a process by which each unit shares learned model updates, rather than raw sensor data, with other luminaires 2302 in the network. The updates typically consist of weighted parameter changes derived from reinforcement learning or gradient-descent optimization. These updates are encrypted and transmitted peer-to-peer, ensuring that sensitive environmental or biometric data remain local to each device. Federated learning updates may include cryptographic validation or digital signatures, ensuring the integrity of distributed model parameters. Upon receiving updates from other units, the AI kernel 104 integrates them into its local model through aggregation algorithms such as weighted averaging or consensus fusion, leading to a collectively improved inference performance across the network.

The federated-learning structure allows the entire lighting ecosystem to evolve toward optimal performance under diverse conditions without centralized oversight. For example, a luminaire 2302 in a high-traffic area may learn optimized brightness adaptation profiles, while another in a daylight-rich zone may refine spectral blending for energy efficiency. Through federated synchronization, both nodes contribute to a shared understanding, enhancing global adaptability and consistency of illumination.

This decentralized design also ensures robustness and fault tolerance. In the event of network interruptions or localized sensor failures, each luminaire 2302 continues to function independently using its last trained model. Once communication is restored, updates are reconciled automatically, preventing data loss and maintaining continuity of learning.

The federated-learning network illustrated in FIG. 23 therefore exemplifies a privacy-preserving, adaptive illumination ecosystem. It unites distributed intelligence, encryption-based security, and real-time learning to achieve system-wide optimization without cloud dependency-representing a scalable and future-proof architecture for intelligent lighting environments in urban, architectural, and vehicular applications.

Figure 24:
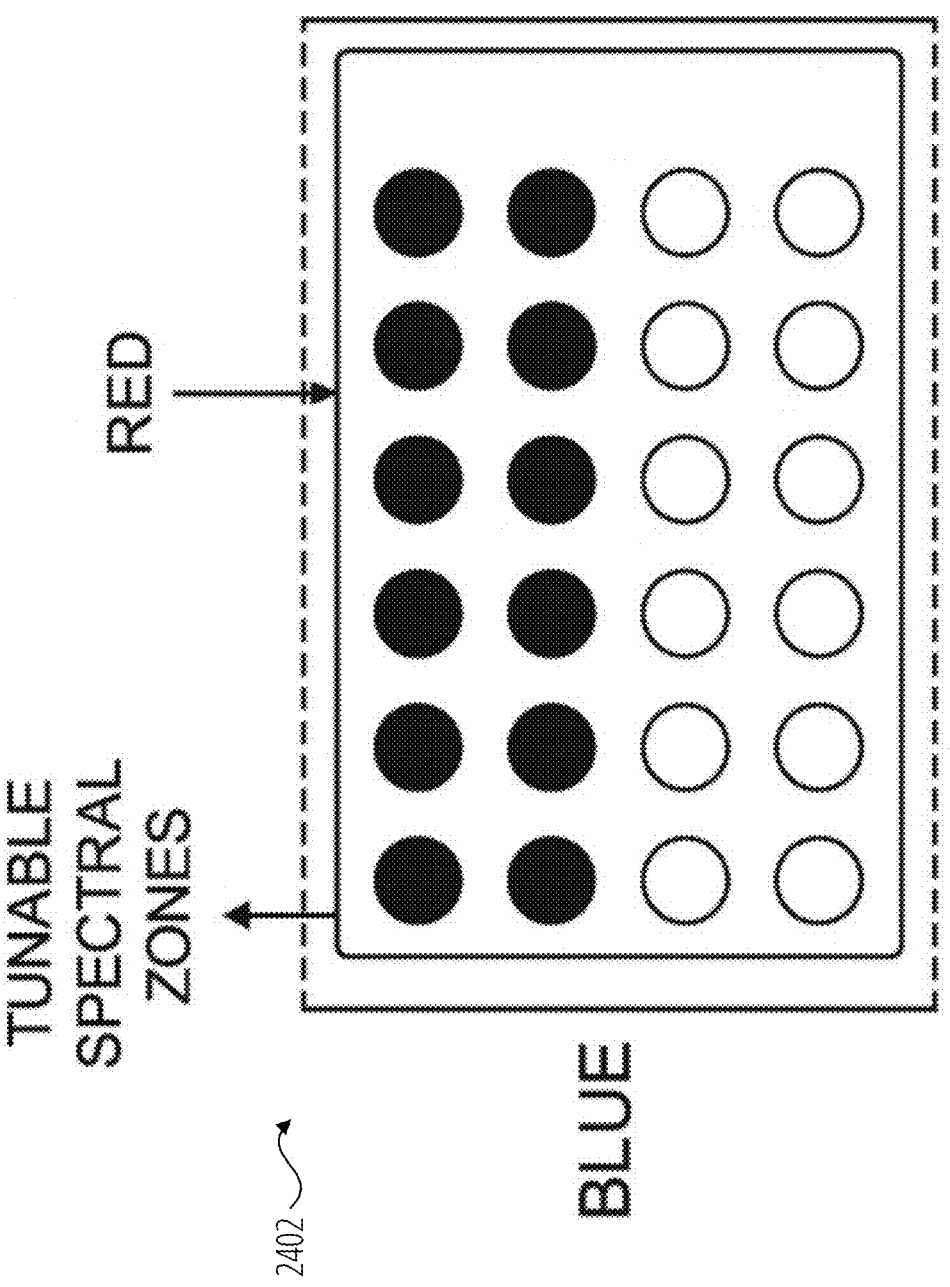
FIG. 24 presents a horticultural panel embodiment with tunable spectral zones controlled by AI-Gating to optimize photosynthetic response and minimize energy usage through real-time red-blue spectral adjustment.

FIG. 24 illustrates a horticultural embodiment of the disclosed AI-Gating illumination system 102, specifically designed for controlled-environment agriculture and plant-growth optimization. FIG. 24 depicts a rectangular LED panel 2402 comprising multiple spectral emission zones, each governed by independent AI-Gating control to modulate light intensity and wavelength distribution dynamically. This configuration allows precise regulation of the red-blue spectral ratio, a critical determinant of photosynthetic efficiency, plant morphology, and photoperiodic response.

In this embodiment, the LED panel 2402 integrates arrays of red (R) and blue (B) light-emitting diodes interspersed in configurable patterns. The AI kernel 104 continuously analyzes environmental feedback, including photosynthetically active radiation (PAR), canopy reflectance, ambient temperature, humidity, and photoperiod, collected from embedded or peripheral sensors. Using this data, the AI-Gating illumination system 102 computes real-time adjustments to the relative activation of red and blue channels. These spectral adjustments allow the LED panel 2402 to maintain optimal photon flux density while minimizing wasted energy during non-photosynthetic intervals.

The red spectral band primarily supports chlorophyll absorption and biomass accumulation, while the blue spectral band influences stomatal regulation, leaf expansion, and nutrient uptake. By modulating the proportion of these emissions in real time, the AI-Gating module adapts illumination to plant developmental stages, from seedling propagation through flowering, without manual calibration. For example, during early vegetative growth, blue-dominant illumination promotes compact morphology and strong root formation. As plants mature, the AI system transitions to a red-enriched spectrum to enhance flowering and fruit production.

The panel's energy-conservation layer further refines current distribution through feedback-driven gating. Power delivery is modulated at microsecond-scale intervals to maintain target photon flux while avoiding over-illumination or heat stress. Simultaneous thermal feedback prevents overheating of diodes and maintains spectral stability under varying load conditions.

Unlike conventional horticultural lighting systems that rely on static or timer-based spectral profiles, the AI-Gating horticultural panel operates as a self-learning system. Through reinforcement learning, it refines its emission policies by correlating feedback from plant responses, such as spectral reflectance or humidity changes, with growth outcomes. The resulting reward signal R(t) allows the panel to evolve its control model continuously, optimizing yield, quality, and energy efficiency over successive growth cycles.

Thus, the embodiment shown in FIG. 24 represents a biologically adaptive illumination platform that harmonizes photonic emission with plant physiology. It exemplifies the versatility of the AI-Gating framework across disciplines, translating from human-centric lighting to precision agriculture, while maintaining the core principles of predictive control, environmental feedback, and energy optimization.

Figure 28:
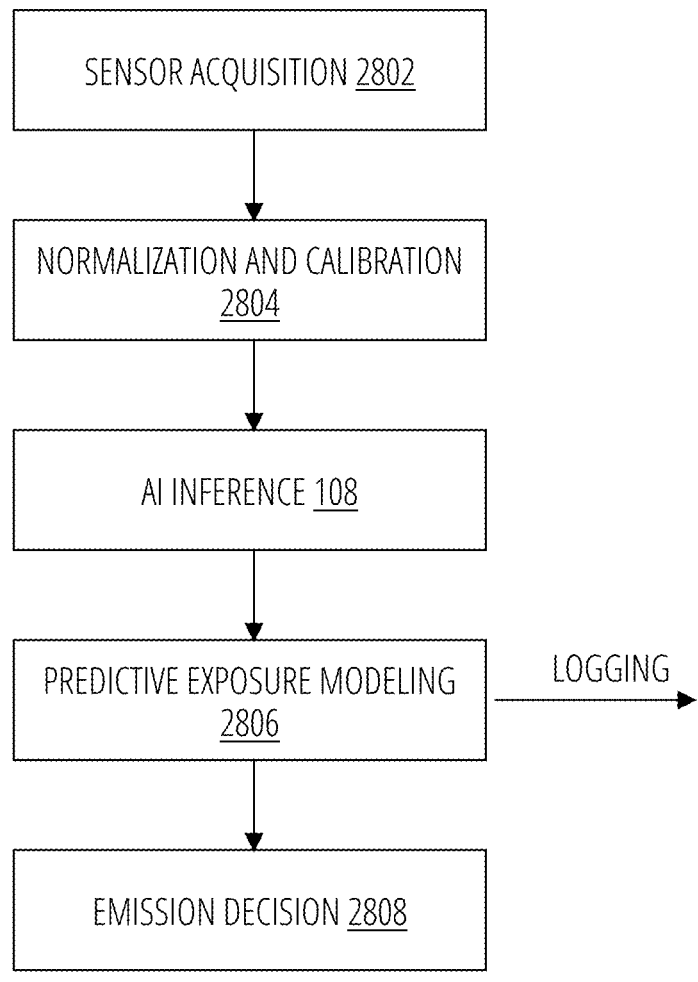
FIG. 28 shows the AI-Gating controller applied to surgical illumination, with sensor acquisition, normalization, inference, predictive exposure modeling, leading to the emission decision.

FIG. 28 illustrates the sequential and feedback-driven logic of the AI-Gating illumination system 102, integrating sensing, computation, and illumination control into a unified adaptive framework. This AI-Gating illumination system 102 continuously analyzes environmental and photometric conditions, dynamically regulating light emission to maintain optimal performance across diverse operational settings.

The process begins with sensor data acquisition 2502, where environmental, optical, and photometric data, such as luminance, reflectance, motion, and temperature, are captured by embedded sensors. These data streams form the foundation for the illumination control process.

During pre-processing and calibration 2504, the incoming signals are filtered, normalized, and time-aligned. This stage ensures signal consistency across the optical and electronic components. The processed data are also sent to the driver interface 114, which establishes baseline correction values and converts calibrated control inputs into electrical signals for the light-emitting hardware.

In feature extraction 2506, the AI-Gating illumination system 102 isolates key measurable parameters such as intensity, chromaticity, and temporal stability. These attributes are interpreted by the AI kernel 104, which identifies correlations between environmental demand and light performance to generate optimal gating patterns.

At digital gating commands 2508, the AI kernel 104 issues precisely timed control instructions to the LED Emission 2514 stage. This module modulates photon output across intensity, spectral, and temporal domains, aligning light emission with real-time operational needs, such as camera exposure intervals or moving target synchronization.

The feedback module 116 continuously monitors emitted illumination, measuring parameters such as brightness, color temperature, and power efficiency. These data are used by the adaptive correction 2510 process, where the AI kernel 104 adjusts gating frequency, drive current, or duty cycle to correct discrepancies between commanded and measured light output.

Finally, predictive learning 2512 represents an optional higher-order intelligence layer that updates internal model parameters over time. Using historical feedback data, it anticipates environmental or mechanical variations, such as sensor drift or ambient light changes, and preemptively modifies future gating commands. The feedback loop linking this module back to earlier stages denotes a closed adaptive-learning circuit, enabling continual refinement of illuminance control and spectral precision.

Figure 25:
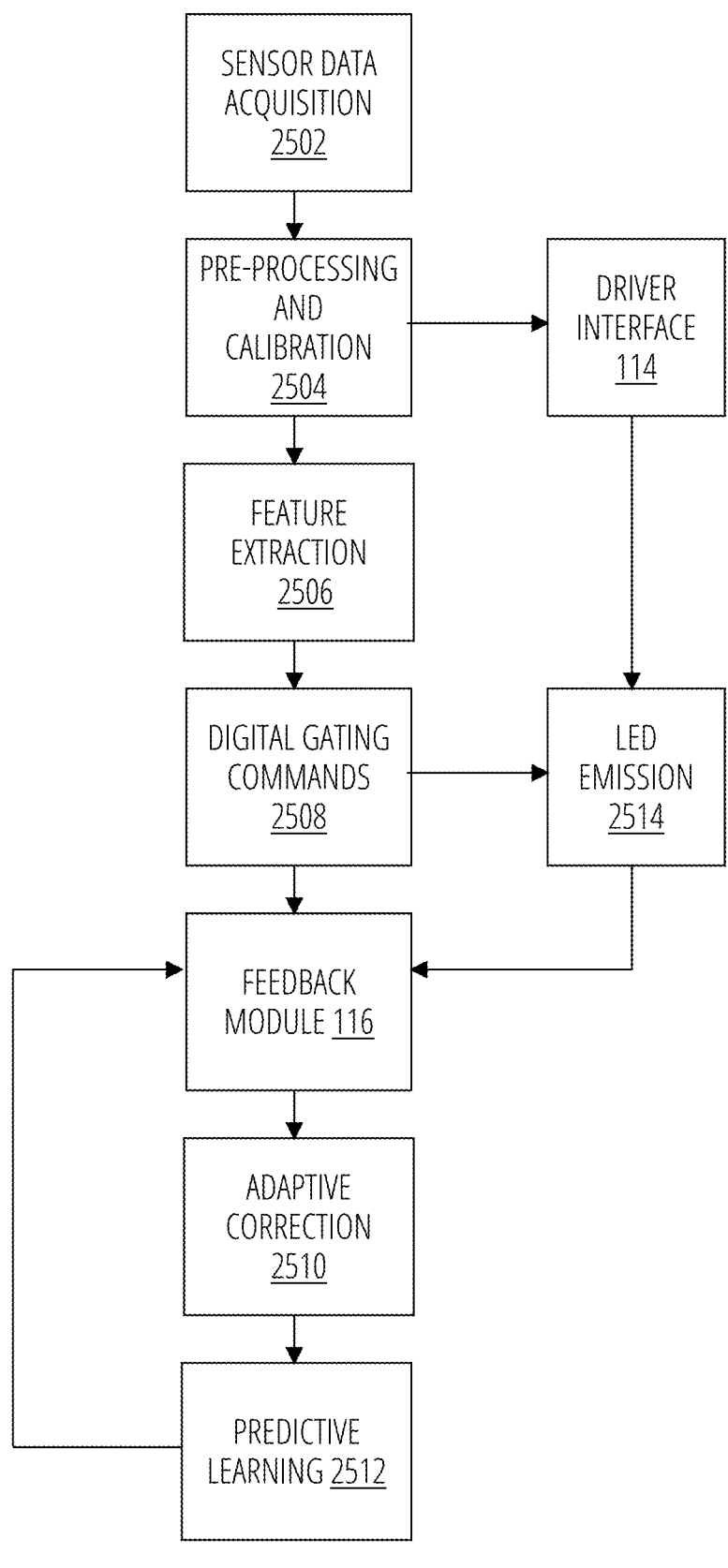
FIG. 25 illustrates a flowchart of the AI-Gating LED illumination method, showing sequential and feedback operations for adaptive light modulation.
Figure 26:
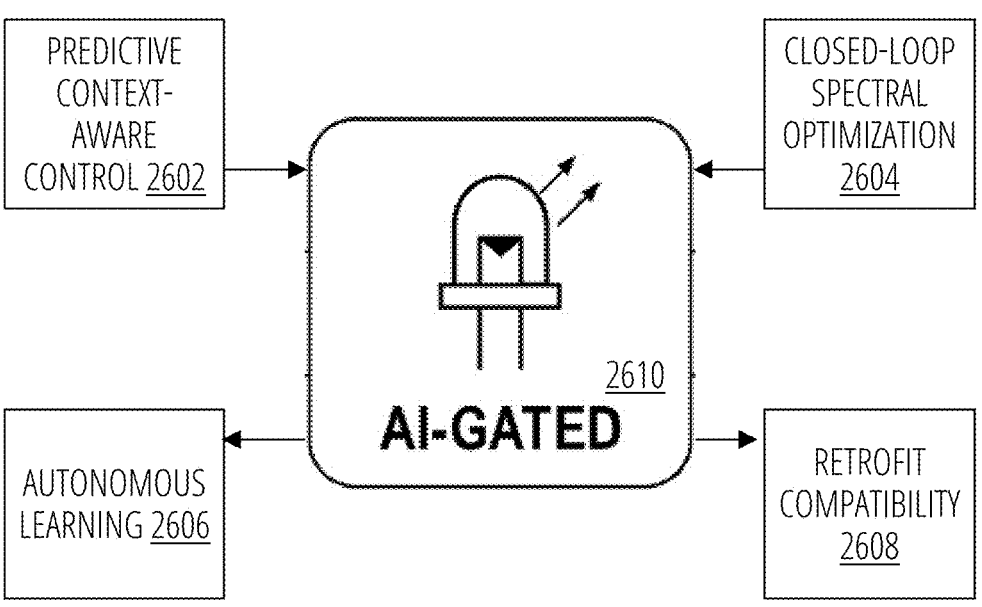

In summary, FIG. 25 demonstrates a fully integrated, closed-loop illumination architecture in which sensing, computation, and AI-driven modulation operate harmoniously. The combination of adaptive correction and predictive learning ensures that photon delivery remains precisely synchronized, energy-efficient, and resilient to dynamic industrial or biomedical conditions.

Transition from General Photonic Framework to
LED Embodiments

The foregoing description of the AI-Gating photonic framework establishes the universal principles of predictive illumination control, closed-loop optimization, and federated learning. In the embodiments that follow, these principles are implemented through solid-state light sources, primarily LED-based modules, which provide the spectral flexibility, fast response time, and electrical efficiency required for real-time gating. The LED embodiments described herein therefore serve as representative examples of the broader AI-Gating concept, demonstrating how a general inference-based control architecture may be adapted to specific light-emitting hardware while remaining compatible with other photon sources such as lasers, OLEDs, or hybrid optical systems.

FIG. 26 provides an integrated overview of the AI-Gating illumination platform, summarizing the functional advantages and modular extensibility of the LED-based embodiment. The figure centers on the AI-Gating light-emitting module 2610, surrounded by four defining operational domains: predictive context-aware control 2602, closed-loop spectral optimization 2604, autonomous learning 2606, and retrofit compatibility 2608. Together, these components form a unified and adaptive photonic control system that extends across diverse clinical, industrial, and scientific applications.

At its core, the AI-Gated illumination architecture employs predictive context-aware control, allowing the AI-Gating illumination system 102 to anticipate environmental and operational conditions before emission occurs. Rather than reacting to changes in lighting demand or exposure requirements after the fact, the inference 108 kernel forecasts illumination needs based on historical sensor data, current ambient conditions, and task-specific inputs. This enables the LED driver to modulate light output at sub-millisecond precision, maintaining optimal brightness, color balance, and energy efficiency. In surgical or inspection environments, such predictive control prevents oversaturation, glare, or unintended exposure while maintaining image clarity and uniformity.

The closed-loop spectral optimization domain represents the feedback-driven foundation of AI-Gating. Optical, thermal, and reflectance sensors continuously monitor emitted light to assess real-time performance against reference conditions. Deviations in wavelength stability, thermal drift, or luminous efficiency trigger immediate corrective adjustments to the emission profile. The system's closed-loop logic ensures that spectral output remains both physiologically safe and visually optimized for the intended application, whether illuminating biological tissue, reflective materials, or high-contrast optical fields.

Autonomous learning enables the AI-Gating illumination system 102 to evolve without explicit reprogramming. Through embedded or federated machine-learning frameworks, the controller refines its internal gating models over time, identifying subtle correlations between environmental factors, power consumption, and visual performance. In distributed configurations, anonymized data from multiple units can be aggregated to improve the global inference model, ensuring that local devices benefit from cumulative experience while preserving privacy and independence during operation.

In some embodiments, each illumination unit executes a local inference kernel capable of performing limited decision-making independent of network connectivity, maintaining real-time operation during transient disconnection. This local autonomy ensures uninterrupted safety compliance and illumination stability even in the absence of synchronized updates or central orchestration. Upon reconnection, accumulated performance data may be selectively merged into the federated model to update global parameters without loss of local adaptation.

The final domain, retrofit compatibility, underscores the platform's flexibility. The AI-Gating controller is designed as a modular enhancement layer that can be integrated into existing illumination hardware without major redesign. It interfaces seamlessly with conventional LED drivers, fiber-optic modules, and control systems, enabling incremental modernization of legacy surgical microscopes, inspection lines, or analytical instruments. An interface adapter may enable the AI-Gating module to retrofit into existing illumination controllers, translating legacy dimming or PWM signals into gated control logic. This comprehensive approach supports the gradual adoption of AI-enhanced illumination technologies while maintaining interoperability with established optical architectures.

In its entirety, the embodiment summarized in FIG. 26 encapsulates a scalable, intelligent, and modular illumination framework. It can be deployed in single-diode or multi-channel arrays, handheld or mounted configurations, and wired or wireless control environments. The architecture's adaptability makes it equally applicable to ophthalmic surgery, industrial inspection, environmental sensing, and laboratory imaging, each drawing on the same core principles of predictive control, closed-loop feedback, autonomous learning, and retrofit integration.

By uniting these functional domains within one coherent system, the AI-Gating platform represents a shift from static illumination to self-optimizing photonic intelligence, a foundational enabler for safe, efficient, and adaptive light management across a wide range of precision-dependent applications.

AI-Gating Illumination in Surgical and
Femtosecond Cataract-Related Procedures

The disclosed AI-Gating illumination system 102 introduces an intelligent, self-regulating optical control framework specifically engineered for surgical and ophthalmic environments requiring precise, safe, and dynamically adaptive lighting. Within these domains, including both conventional microscope-guided surgery and femtosecond laser cataract surgery, the AI-Gating illumination system 102 provides continuous optimization of luminance, spectral balance, and laser fluence through feedback-driven artificial intelligence inference. At the foundation of this embodiment lies an AI kernel 104 that receives multimodal sensor input in real time. These sensors include optical intensity detectors, reflectance and scatter sensors, temperature probes, and imaging feedback from integrated OCT or camera systems. The AI kernel 104 processes this data to infer the instantaneous optical state of the surgical field, evaluating brightness distribution, surface reflectivity, and tissue transparency, and generates control signals that regulate both illumination and laser output through micro- to millisecond-scale gating. In ophthalmic applications, the disclosed AI-Gating control methods unify illumination and laser fluence regulation into a single adaptive optical system.

Microscope-Integrated Surgical Lighting
Embodiment

In the surgical microscope embodiment, the AI-Gating system replaces or augments the conventional LED or xenon illumination module. It continuously adjusts spectral and spatial emission profiles according to the operative context. When reflective or translucent tissues such as the cornea or fluid surfaces produce excessive glare, the system automatically attenuates luminous flux and narrows spectral bandwidth, protecting both the surgeon and the patient from photic stress. Conversely, when visualizing deeper or low-reflectance structures such as the posterior capsule or retina, the AI kernel 104 increases localized luminance and adjusts spectral weighting to maintain high-contrast visualization without elevating total fluence. These transitions occur seamlessly and imperceptibly, ensuring constant visual conditions while reducing cumulative retinal exposure and glare-related fatigue.

Figure 27:
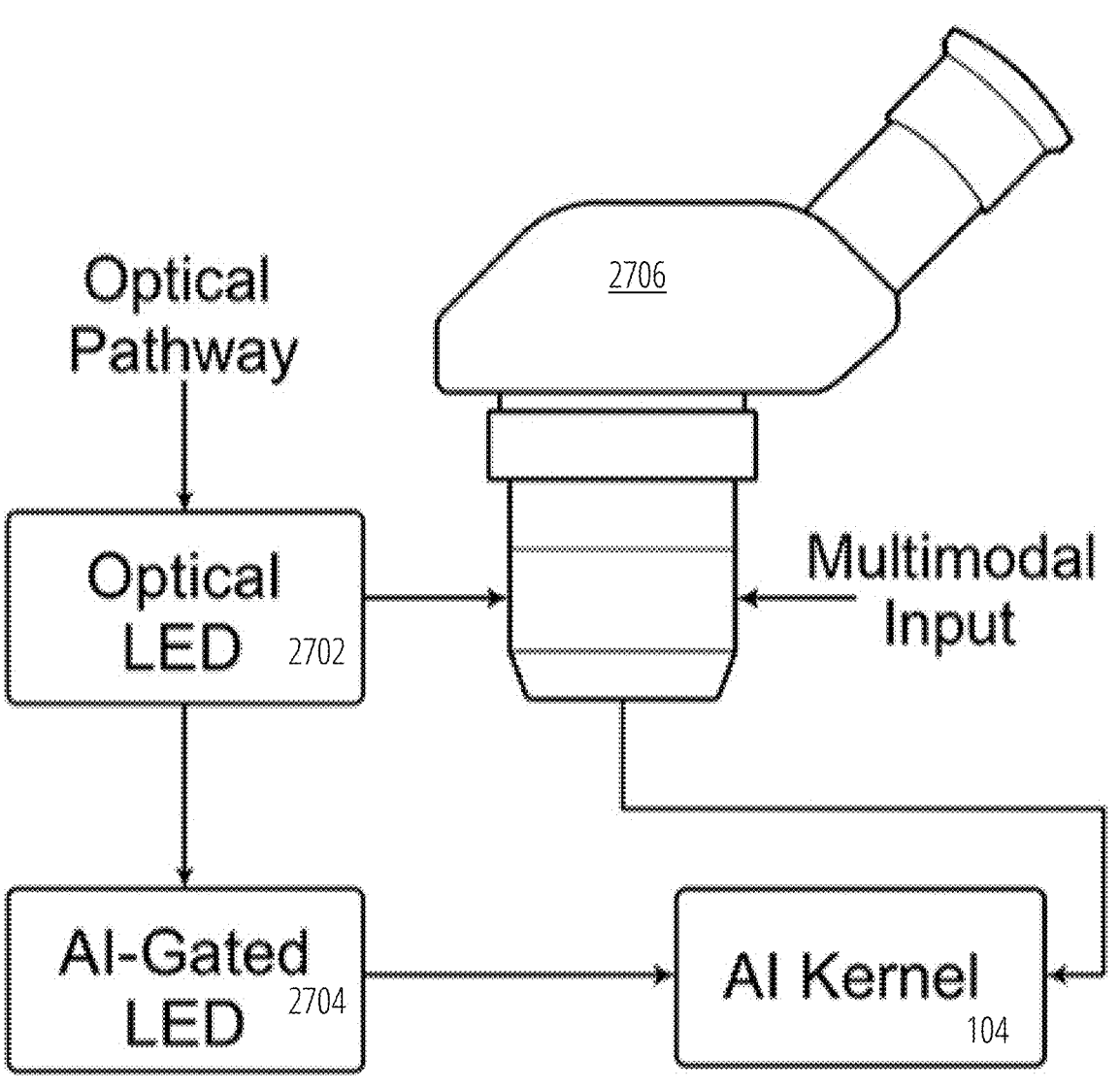
FIG. 27 depicts AI-Gating integration within a femtosecond-laser cataract-surgery workstation, including kernel, sensors, laser source, illumination module, and synchronized retinal-safe feedback channels.

FIG. 27 schematically illustrates the integration of the AI-Gating illumination module into the optical path of a surgical microscope 2706. The figure shows the AI kernel 104, optical sensors, optical LED 2702, AI-Gating LED 2704, feedback lines, and controlled light emission toward the ocular field, emphasizing closed-loop luminance correction and safety control.

AI-Gating in Femtosecond Cataract Surgery

When deployed within a femtosecond cataract surgery platform, the AI-Gating illumination system 102 extends its adaptive control to the laser subsystem itself. The AI kernel 104 not only regulates illumination but synchronizes it with laser pulse delivery and imaging acquisition cycles. During capsulotomy, the AI-Gating illumination system 102 detects increased surface reflectance or interface scatter and compensates by reducing illumination intensity or altering spectral balance, preventing optical misalignment. During sub-surface lens fragmentation, it enhances contrast by emphasizing specific spectral channels while maintaining retinal-safe fluence. Predictive algorithms estimate cumulative fluence and reflection patterns, automatically adjusting output to ensure compliance with ANSI Z136.1 and IEC 60825 standards.

Figure 32:
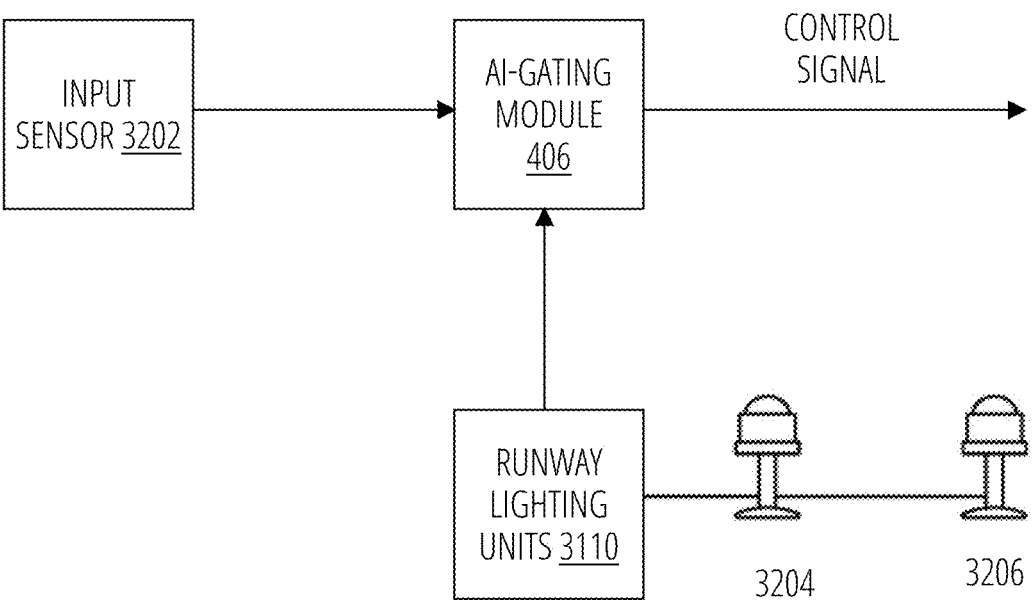
FIG. 32 depicts an aircraft-mounted adaptive landing-light embodiment in which AI-Gating modulates beam pattern, intensity, and thermal load dynamically during approach and touchdown to optimize visibility and energy efficiency.

FIG. 32 shows the integration of the AI-Gating controller within a femtosecond laser workstation. The equipment includes the AI kernel 104, optical sensors, femtosecond laser source, illumination module, and feedback channels maintaining synchronized, retinal-safe emission regulation. The feedback loop ensures continuous recalibration of both illumination and laser subsystems, keeping all emission events compliant, traceable, and dynamically optimized. Computation occurs entirely within the microscope or workstation base unit, independent of cloud connectivity, guaranteeing deterministic performance and cybersecurity integrity.

The process begins with sensor acquisition 2802 followed by normalization and calibration 2804. Next, the AI-Gating illumination system 102 performs AI inference 108 and predictive exposure modeling 2806, before making the emission decision 2808. The model may be sent to a data logging memory 402.

Control Process Flow

The illumination and laser-control interaction may be represented by a sequential flowchart showing data intake, inference, safety validation, and emission control.

Figure 29:
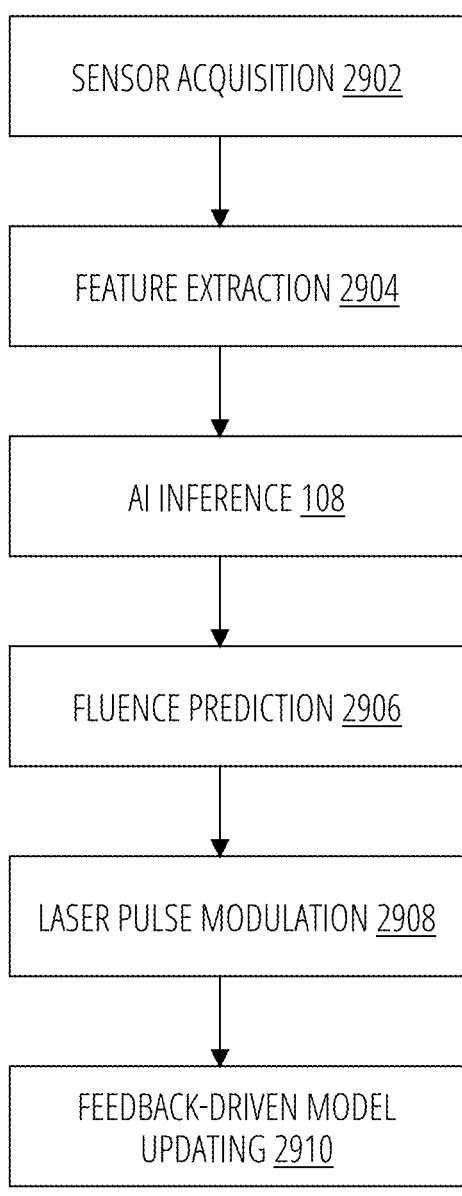
FIG. 29 illustrates the operational sequence of the AI-Gating control process during femtosecond cataract surgery. The flowchart details sensor acquisition, feature extraction, AI inference, fluence prediction, laser-pulse modulation, and feedback-driven model updating.

FIG. 29 illustrates the operational sequence of the AI-Gating control process during femtosecond cataract surgery. The flowchart shows sensor acquisition 2902, feature extraction 2904, AI inference 108, fluence prediction 2906, laser pulse modulation 2908, and feedback-driven model updating 2910. This control framework allows the AI-Gating illumination system 102 to anticipate changing optical conditions, dynamically adjust emission parameters, and execute illumination or laser modifications at sub-perceptual timescales, maintaining optical stability throughout the procedure.

Clinical and Engineering Benefits

The result is a self-regulating optical ecosystem that anticipates and adapts to the dynamic visual conditions of surgery. By maintaining optimal illumination across rapid transitions in ocular transparency and reflectivity, the AI-Gating illumination system 102 enhances surgical precision, minimizes thermal and photochemical risks, and preserves surgeon focus by eliminating manual brightness or alignment adjustments. Compared with conventional illumination systems that rely on fixed intensity or manual calibration, the AI-Gating architecture provides superior safety, reproducibility, and efficiency. It reduces cumulative light exposure, improves contrast and depth perception, and extends the lifetime of optical components through reduced thermal stress. In femtosecond cataract surgery, where precision of energy delivery and visualization are critical, the AI-Gating module functions as an intelligent photonic co-pilot, simultaneously optimizing photon delivery for safer, faster, and more reproducible outcomes.

Figure 30:
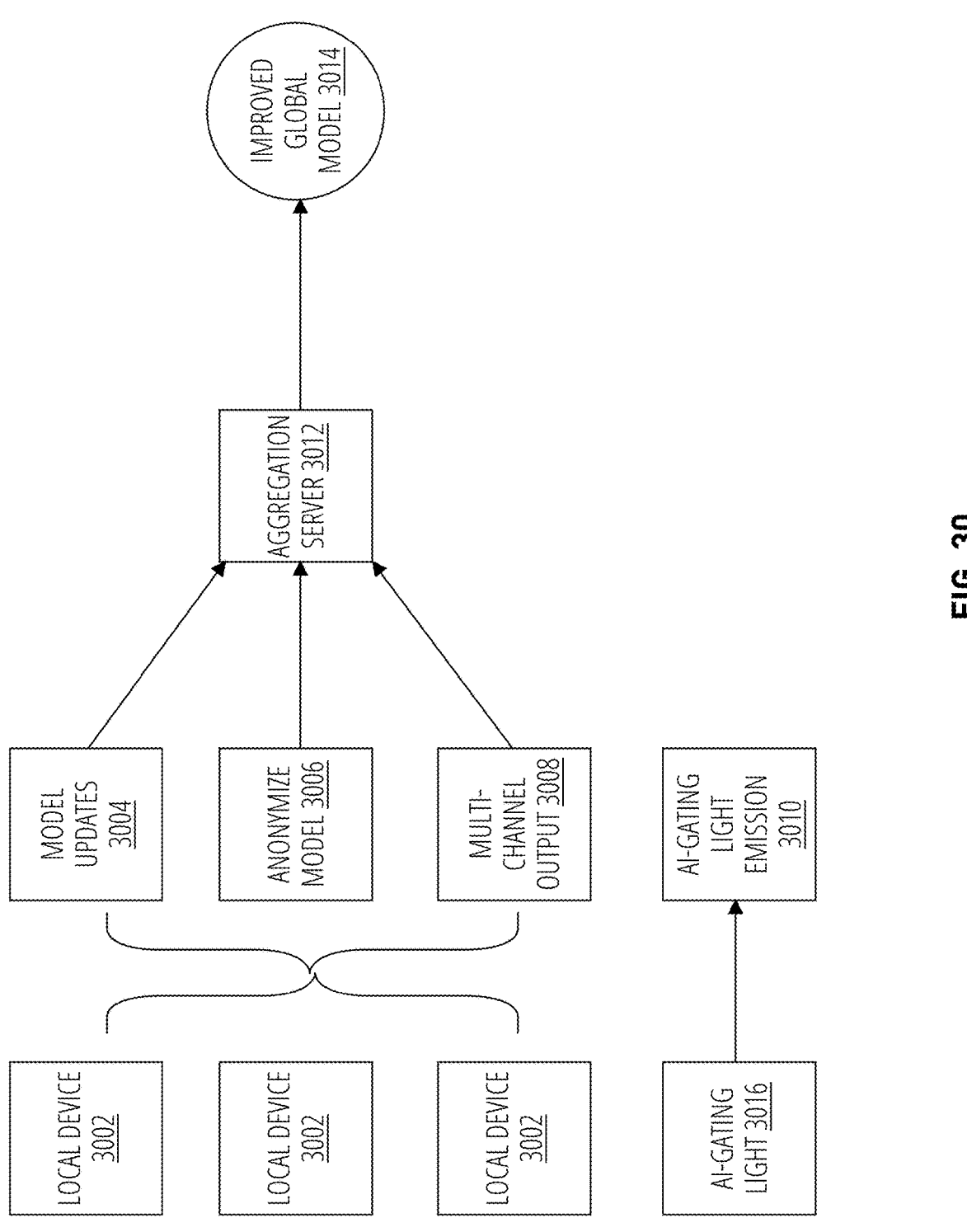
FIG. 30 illustrates a federated-learning and multi-channel architecture enabling parallel model updates across multiple illumination units while preserving data privacy through parameter anonymization.

FIG. 30 illustrates the federated-learning configuration and multi-channel architecture of the AI-Gating illumination framework. This embodiment depicts how distributed illumination modules, each equipped with local AI controllers, collaboratively contribute to a shared learning model without direct data exchange. The architecture enhances performance and safety across diverse surgical environments while maintaining data privacy and interoperability.

Multiple local devices 3002 operate independently, each managing its own AI-Gating light source and collecting contextual performance data such as reflectance, intensity stability, and exposure duration. These local devices 3002 periodically generate anonymized model updates (using model updates 3004, anonymize models 3006, and multi-channel outputs 3008 representing learned adjustments or weighting factors derived from local experience. The updates are transmitted to a centralized aggregation server 3012, which synthesizes the incoming data to produce an improved global model 3014.

The improved global model 3014 is redistributed to each local unit, enabling them to refine their control algorithms without the need to share raw surgical or patient-specific data. This federated-learning cycle continuously improves accuracy, responsiveness, and exposure safety across the entire network of connected devices.

Additionally, the architecture supports multi-channel light emission, where each output zone or fiber-optic channel operates under its own AI sub-kernel while maintaining synchronization with the global control layer. This configuration allows spatially selective illumination during complex microsurgical procedures, enabling precise control over brightness and spectral composition across multiple optical fields.

By integrating distributed learning and modular channel management, FIG. 30 demonstrates how the AI-Gating system evolves through cumulative experience, providing progressively smarter and safer illumination across ophthalmic and surgical platforms.

Collectively, FIGS. 27-30 demonstrate that the AI-Gating illumination system is modular and scalable. The same predictive and feedback-driven control principles govern illumination whether used through a microscope, within a handheld or intraocular probe, or distributed across a federated multi-channel network. This unified framework enables safe, adaptive, and energy-efficient photon delivery across all ophthalmic surgical modalities.

Transportation and Aviation Illumination Embodiments

The AI-Gating illumination system 102 further extends to transportation and aviation environments, where adaptive control of photonic output directly enhances safety and operational efficiency. In airport and aircraft applications, illumination must dynamically adapt to changing ambient light, visibility, and human-factor constraints without compromising regulatory brightness thresholds.

In these embodiments, distributed AI-Gating controllers coordinate runway, taxiway, and aircraft-mounted light arrays. Sensor inputs, including ambient lux, fog density, and motion telemetry, feed local inference 108 kernels that modulate emission intensity and spectral temperature to maintain consistent visibility with minimized glare. Predictive modeling anticipates aircraft movement or weather fluctuations, enabling pre-emptive intensity adjustment across lighting grids.

The same federated-learning framework allows individual runway or gate units to refine their control parameters based on cumulative operational data, reducing energy use during low-traffic periods while maintaining full regulatory compliance. These transportation embodiments therefore represent a direct extension of the AI-Gating principles described above, unified under the same closed-loop, context-aware illumination logic.

Figure 31:
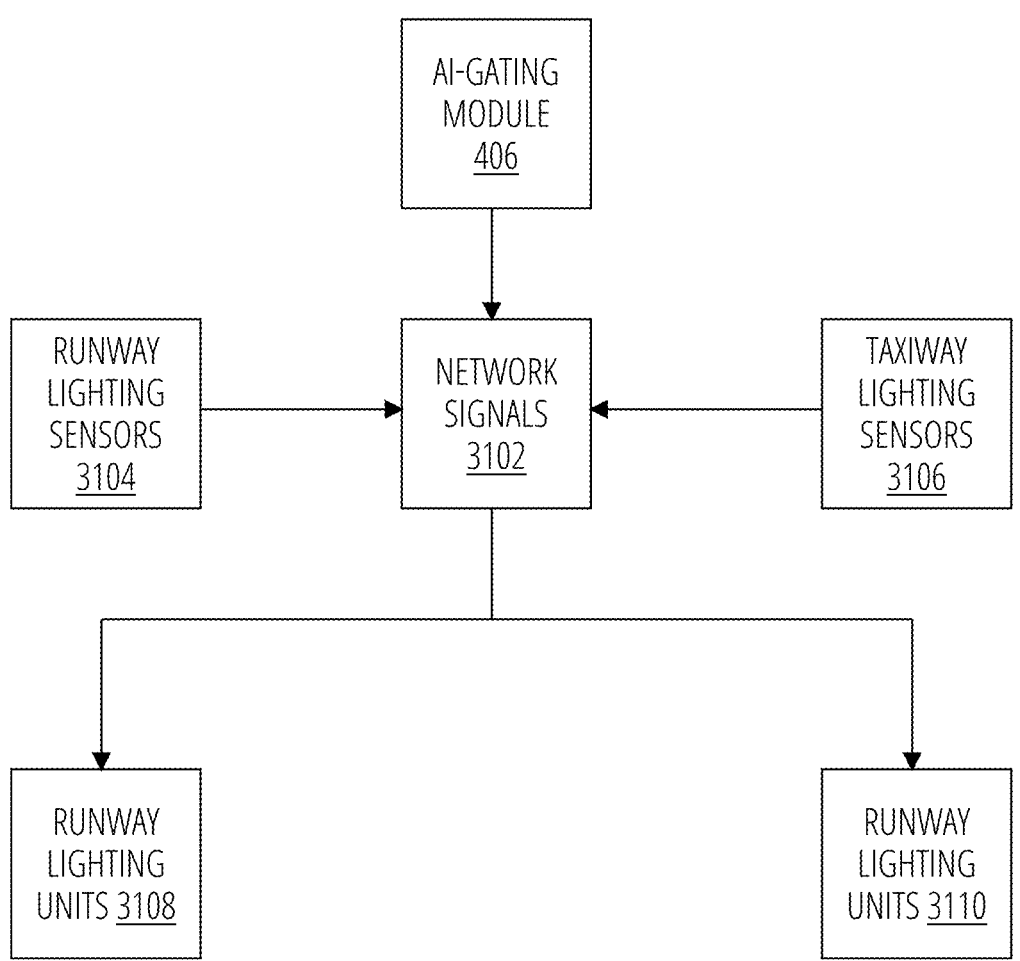
FIG. 31 presents an AI-Gating runway and taxiway illumination network showing distributed inference nodes that adjust luminous intensity, color temperature, and beam direction in response to aircraft position and weather inputs.

FIG. 31 illustrates an embodiment of the AI-Gating illumination system 102 applied to airport runway and taxiway environments. This configuration demonstrates distributed, networked lighting nodes coordinated by an intelligent control system to enhance safety, visibility, and energy efficiency during aircraft ground operations.

At the system's core, an AI-Gating module 406 receives network signals 3102 from environmental and operational sensors 3104, 3106 positioned along the runway and taxiway. These sensors 3104, 3106 capture ambient light, fog density, precipitation, and traffic activity. Based on the aggregated data, the AI kernel 104 determines the optimal luminous intensity, color temperature, and activation timing for each lighting module.

The network signals 3102 distribute synchronized control commands to runway lighting units 3108 and runway lighting units 3110, which adjust their emission characteristics accordingly. The AI-Gating illumination system 102 operates as a predictive network, capable of anticipating aircraft movements and dynamically modulating brightness to ensure pilot visibility while minimizing glare and light pollution.

The distributed configuration allows local nodes to function autonomously if communication with the central controller is interrupted, ensuring continuous operation under variable conditions. The illumination network can also implement federated learning, where each local unit refines its control parameters based on historical performance and environmental trends, contributing anonymized updates to a global optimization model.

This embodiment demonstrates how the AI-Gating framework extends seamlessly from precision surgical illumination to large-scale infrastructure applications. By maintaining real-time adaptive control across vast lighting arrays, the system achieves regulatory compliance, operational safety, and significant energy reduction in airport environments.

FIG. 32 illustrates an aircraft-mounted embodiment of the AI-Gating illumination system 102, configured to autonomously control landing and taxi lights based on environmental and operational parameters. The AI-Gating illumination system 102 integrates on-aircraft input sensors 3202 with an AI-Gating module 406 to dynamically modulate illumination output in real time for optimal visibility, energy efficiency, and safety.

An input sensor 3202 captures environmental data such as visibility, fog density, altitude, and approach angle. This information is transmitted to the AI-Gating module 406, which executes predictive and context-aware gating algorithms. The AI-Gating module 406 issues control signals to the adaptive lighting modules positioned on the aircraft's nose or wings.

Each or the runway lighting units 3110 contains an array of high-efficiency LEDs 3204, 3206 capable of spectral and intensity modulation under AI supervision. During descent, the AI-Gating illumination system 102 gradually increases luminous flux while adjusting beam divergence to match runway distance and ambient conditions. Upon touchdown, the emission intensity automatically reduces to prevent glare or over-illumination on the tarmac or surrounding ground personnel.

The AI-Gating module 406 also receives feedback from photometric and temperature sensors integrated into the runway lighting units 3110, maintaining thermal safety and ensuring compliance with aviation exposure standards. Additionally, the AI-Gating illumination system 102 may interface with the aircraft's avionics network to anticipate operational phases, takeoff, landing, taxiing, and preemptively adjust illumination states accordingly.

This embodiment exemplifies how AI-Gating enhances the functionality of aircraft-mounted illumination systems through predictive learning, contextual control, and closed-loop feedback, significantly improving safety, efficiency, and pilot situational awareness under diverse weather and operational conditions.

DETAILED DESCRIPTION OF THE INVENTIONS

This document provides an AI-Gating illumination system 102 designed to autonomously regulate photon emission through artificial intelligence inference and real-time sensor feedback. The system functions as an intelligent, self-contained photonic control framework that transforms conventional lighting into a predictive, closed-loop network of self-optimizing devices. The disclosed architecture operates entirely locally, ensuring deterministic performance, data privacy, and operational safety.

At its core, the 102 employs a trained AI kernel 104 executed on an embedded AI processor 410 or microcontroller 410 to predict and regulate optimal emission parameters in real time. The AI kernel 104 concurrently evaluates multimodal inputs from an integrated sensor network 112 that monitors optical intensity, spectral composition, thermal load, occupancy, ambient luminance, and surface reflectance. These data are normalized and processed to derive control signals that modulate intensity, spectral balance, spatial distribution, and temporal emission cycles of one or more LED arrays 118.

Through this architecture, the AI-Gating illumination system 102 achieves dynamic photon-emission gating at sub-perceptual timescales, maintaining visual continuity while conserving energy and extending component lifespan. The AI-Gating illumination system 102 further ensures continuous compliance with ANSI and IEC photobiological exposure standards, optimizing both illumination quality and human safety. Its modular configuration enables scalable adaptation across multiple environments, including surgical, architectural, vehicular, horticultural, and industrial applications, where precision, responsiveness, and energy efficiency are critical.

The term "AI kernel," as used herein, encompasses any computational model algorithmic framework, or software structure that performs predictive or adaptive inference based on sensor, derived data to determine photon-emission parameters. Equivalent simulation, rule-based, or surrogate-model implementation that performs functionally similar inference, prediction, or gating logic is considered within the scope of the disclosed system. This includes architectures employing neural networks, reinforcement learning agents, decision trees, physics-informed models, or hybrid analytic-statistical formulations that emulate or reproduce the inference behavior of the disclosed AI kernel.

In various embodiments, the photon-emitting element may comprise one or more light sources selected from light-emitting diodes (LEDs), laser diodes, micro-LED arrays, organic LEDs (OLEDs), phosphor-converted emitters, or hybrid photonic elements. Each source type can be individually gated or co-optimized under a shared AI controller, ensuring uniform application of inference-based modulation across different spectral coherence, or emission geometries.

The AI controller simultaneously enforces safety constraints expressed as machine-readable regulatory thresholds (e.g., ANSI Z136, FAA visibility standards), ensuring that emitted optical fluence remains compliant through predictive modulation. Each sensor operates at micro- to millisecond acquisition rates, providing high-resolution environmental feedback that allows the system to detect even transient fluctuations in illumination demand or reflectivity.

The AI inference kernel employs pre-trained models that correlate environmental and optical parameters with illumination performance and safety constraints. During operation, the kernel performs real-time inference to determine the appropriate output of individual LEDs or grouped arrays. This inference 108 governs drive current, pulse frequency, duty cycle, and spectral distribution through a gating interface that directly communicates with the LED driver circuitry. The gating interface enables rapid temporal, spatial, and spectral modulation of photon emission, permitting precise light shaping and adaptive dimming with a latency of less than one millisecond.

The feedback loop is continuous and closed, allowing the AI kernel 104 to adjust emission parameters dynamically based on both predicted outcomes and measured results. For example, if a reflective surface or biological tissue produces excessive backscatter, the AI-Gating illumination system 102 instantly reduces photon output to maintain the predetermined fluence threshold. Conversely, if the sensor data indicate insufficient illumination or suboptimal spectral composition, the AI kernel 104 increases output or modifies the spectral balance to restore optimal conditions. Through this process, the AI-Gating illumination system 102 maintains both safety compliance and functional illumination without requiring human intervention or network-based recalibration.

A learning subsystem refines the inference 108 model over time using contextual feedback derived from operational history. The model incorporates local performance data, such as measured SNR, color rendering accuracy, or perceived brightness, to fine-tune gating thresholds and improve predictive accuracy. In distributed installations, multiple luminaires or subsystems can participate in a federated learning configuration, where model updates are shared as anonymized parameter vectors. These updates are aggregated by a local or regional node to generate improved global model weights that are then redistributed to the individual devices. This architecture preserves device autonomy and privacy while achieving system-wide performance improvement and environmental coherence.

The AI-Gating control architecture includes safeguards that enforce redundancy and fail-safe operation. If the inference kernel or sensor network 112 experiences abnormal latency or communication loss, the LED driver automatically reverts to a static, predefined output profile that remains within safe limits. This ensures compliance and operational continuity even in the absence of active inference or network coordination.

In certain embodiments, the AI-Gating illumination system 102 may incorporate spectral segmentation capabilities, allowing the AI kernel 104 to differentially modulate individual wavelength bands or LED color channels. This enables context-specific spectral control, for example, maintaining circadian-friendly lighting in architectural environments or minimizing photochemical retinal risk during ophthalmic procedures. In high-precision domains such as microscopy or semiconductor inspection, the AI-Gating illumination system 102 can synchronize emission with image capture or mechanical positioning subsystems, providing nanosecond-scale exposure alignment for reduced motion blur and improved signal acquisition.

The AI-Gating illumination system 102 therefore represents a convergence of photonic hardware and artificial intelligence, creating a closed-loop, learning-based illumination platform. Unlike traditional dimming, pulse-width modulation, or network-linked smart lighting, the AI-Gating illumination system 102 performs real-time predictive gating based on physics-informed inference 108. Each luminaire acts as an intelligent agent that interprets sensor data, adjusts its emission pattern, verifies safety, and refines its operational model autonomously. The result is a new class of adaptive lighting systems that combine precision, efficiency, and regulatory compliance within a compact, self-learning architecture suitable for both human-centric and technical illumination applications.

System Overview

At its foundation, the AI-Gating illumination system 102 comprises four principal modules: a sensor network 112 for environmental perception, an AI kernel 104 responsible for inference 108 and adaptive learning, a driver interface 114 that modulates current delivery to the LED arrays 118, and a feedback module 116 that quantifies real-world outcomes for closed-loop adjustment.

These modules communicate over a digital control bus designed for sub-millisecond latency, permitting rapid decision-making cycles and continuous photon-emission gating with temporal precision finer than human visual integration thresholds. This configuration enables the system to function as a responsive organism—an intelligent lighting entity that perceives, interprets, and reacts to its surroundings through embedded inference.

Sensor Network

The sensor network 112 serves as the sensory foundation of the AI-Gating illumination system 102, acquiring multi-modal data essential to contextual awareness. A distributed array of ambient luminance sensors 302 consistently measures background daylight and reflected illumination, allowing the AI kernel 104 to calculate compensatory flux levels. Spectral sensors 304 monitor wavelength distribution, ensuring balanced color rendering and precise correlated color temperature (CCT) maintenance even under dynamic external lighting conditions.

Occupancy and motion sensors 306, implemented through infrared, ultrasonic, or optical means, detect human presence and movement, providing temporal and spatial triggers for adaptive response. Environmental sensors 308 record temperature, humidity, and carbon dioxide concentration, supporting specialized use cases such as horticultural optimization or clean-room environments. Imaging sensors 310 or miniature cameras capture visual feedback for real-time correction of glare, contrast, and chromatic deviation.

Temporal inputs such as internal circadian clocks or scheduled routines derived from local or cloud data inform the AI-Gating illumination system 102 of diurnal or seasonal light cycles. All sensor outputs are time-stamped and normalized within the kernel's input processing 106 stage to create a unified environmental state vector, ensuring that the subsequent inference 108 process operates on harmonized and contextually weighted data streams.

AI Kernel Architecture

The AI kernel 104 constitutes the cognitive core of the AI-Gating illumination system 102, implementing the inference 108 and learning logic that governs all emission decisions. The AI kernel 104 executes a multistage process structurally analogous to the parent AI-Gating framework developed for coherent photonic systems. Within its feature-extraction layer, the AI kernel 104 converts raw sensor data into normalized descriptors representing illumination intensity, spectral imbalance, motion confidence, and biologically relevant metrics.

These descriptors are interpreted by an inference 108 layer that employs a lightweight neural network or reinforcement-learning agent trained to predict an Emission Confidence Score (ECS), a probabilistic measure ranging between zero and one that quantifies the necessity and magnitude of illumination. High ECS values trigger authorization for photon emission, while lower values initiate modulation or standby conditions, thereby optimizing energy expenditure and safety simultaneously.

Physical Description of the AI Kernel

Physically, the AI kernel 104 is embodied within a compact embedded control module, typically implemented on a printed circuit board (PCB) or integrated as a system-on-chip (SoC). The housing may include a multilayer board structure supporting a high-speed microprocessor 410, memory 402 units (RAM and flash), and dedicated coprocessors for AI acceleration (AI processors 410, some embodiments have a plurality of processors). The module interfaces directly with the driver interface 114 circuitry via low-voltage differential signaling (LVDS) or similar digital communication lines.

Thermal management components, such as micro heat spreaders or graphite films, are incorporated to dissipate heat generated by continuous inference operations. The physical package may also include shielding to minimize electromagnetic interference that could disrupt precision timing in LED modulation.

In certain embodiments, the AI kernel 104 is detachable or upgradable, allowing replacement or enhancement of its processing unit as algorithms evolve. The component may include a secure communication port for software updates, parameter calibration, and participation in federated learning networks. In advanced versions, the AI kernel 104 is physically co-located with the feedback sensors to minimize signal latency, forming a compact "intelligence cluster" positioned adjacent to or integrated within the optical assembly of the device.

The gating decision layer translates ECS predictions into executable control signals directed toward the driver interface, determining pulse-width modulation, channel activation ratios, and color-blending coefficients. A subsequent learning layer continuously refines the internal weights of the model based on reinforcement signals derived from performance metrics such as occupancy persistence, power efficiency, and human comfort data. In distributed networks, the AI kernel 104 supports federated learning, allowing anonymized gradient sharing among fixtures to improve collective inference accuracy without transmitting raw data, thus maintaining both privacy and autonomy. Through this hierarchical structure, the AI kernel 104 forms a continually learning intermediary between perception and photonic actuation.

AI Interaction with AI-Gating and System Kernel

The AI-Gating illumination system 102 integrates an artificial intelligence kernel 104 as its computational and decision-making nucleus, functioning as both the cognitive core and the dynamic control authority over all photonic emission processes. The AI kernel 104 resides at the intersection of perception, inference, and actuation, interpreting sensory inputs, predicting environmental changes, and issuing finely tuned gating commands to regulate the emission state of a plurality of light-emitting diodes (LEDs) in real time. The AI-Gating illumination system 102 comprises a method for adaptive illumination that embodies the steps of sensing, normalizing, predicting, gating, and logging photon emission under AI control. Through this architecture, illumination is no longer statically driven by manual control or predefined profiles but is instead concurrently evolved through learning, contextual awareness, and adaptive feedback.

TABLE 1

Functional Overview of the AI-Gating LED Illumination System

| Function Category | Specific Function | Description/Operational Role |
|---|---|---|
| 1. Intensity and Color Management | Intensity Modification | Dynamically adjusts the luminous flux of each LED channel in real time according to ambient sensor data, target illuminance, and learned photometric patterns. |
| | Color Rendering | Applies spectral weighting and chromatic correction to maintain desired color temperature or spectral balance across variable environmental conditions. |
| | Spectral Blending | Integrates multiple LED channels (e.g., RGB, RGBW, or tunable white) to generate precise spectral outputs with optimized rendering indices. |
| 2. Temporal and Spatial Modulation | Temporal Modulation | Controls LED pulse width and duty cycle for temporal precision, minimizing flicker and supporting phase-sensitive imaging or biosensing applications. |
| | Synchronization of LED Emission | Coordinates timing of LED pulses with sensor acquisition cycles and other system subsystems for coherent multimodal operation. |
| | Operation in Multiple Modes | Supports predefined operational modes such as continuous, strobe, adaptive, and learning-driven dynamic modulation. |
| 3. AI-Driven Control and Adaptation | Predictive Control | Utilizes trained AI models to forecast lighting demands based on prior contextual data and proactively modulate output. |
| | Learning and Federated Participation | Incorporates federated learning to update AI inference models without centralized data aggregation, preserving privacy while improving adaptive performance. |
| | Interpretation of Multimodal Inputs | Fuses visual, environmental, and spectral sensor data to determine context-dependent lighting responses. |
| | Feature Extraction | Identifies salient photometric and contextual features (e.g., motion, reflectance, object class) used to refine illumination patterns. |
| | Emission Confidence Computation | Calculates confidence scores representing the reliability of predicted illumination adjustments or detected emission levels. |
| 4. Feedback and Closed-Loop Regulation | Feedback Gathering and Logic Aggregation | Acquires continuous sensor feedback to refine emission parameters and stores logic traces for adaptive recalibration. |
| | Maintaining Target Illuminance | Uses real-time photometric feedback to preserve constant target lux levels across spatial and temporal variations. |
| | Photon-Lux-Based Gating | Modulates LED gating thresholds based on photon flux density and desired lux reference, ensuring photonic efficiency. |
| | Glare and Reflectance Minimization | Adjusts angle, polarization, and intensity to reduce glare and specular reflection detected by return sensors. |
| 5. Driver and Electrical Interface | Driver Interface Function | Provides digital control interface between AI kernel and LED drivers; supports current/voltage modulation and PWM logic. |
| | Gating Commands to LED Drivers | Issues direct gating or enabling signals to control electrical delivery to individual or grouped LEDs. |
| | LED Emission Modulation | Modifies emission amplitude, phase, and duty cycle via current regulation and pulse sequencing. |
| | Emission Threshold Adjustment | Sets adaptive upper and lower thresholds for LED activation based on AI-inferred environmental and safety criteria. |
| 6. Predictive and Computational Operations | Computation of Emission Confidence Scores | Quantifies uncertainty in emission output relative to desired targets, informing adaptive control loops. |
| | Predictive Interfaces | Engages predictive models to anticipate environmental or task-related illumination changes (e.g., circadian shifts, imaging conditions). |

TABLE 1-continued

Functional Overview of the AI-Gating LED Illumination System

| Function Category | Specific Function | Description/Operational Role |
|---|---|---|
| 7. System Integration and Communication | Transmission of Control Signals | Transmits encoded digital or analog control signals through the system bus to LED driver modules and peripheral sensors. |
| | Data Exchange and System Synchronization | Ensures synchronized communication among all modules (sensor network, AI kernel, driver interface, feedback unit). |
| | Supportive Logic and Computation | Executes onboard computation to support claims related to adaptive gating, photometric fidelity, and intelligent illumination management. |

AI-Gating Interaction and Dynamic Modulation

At its operational foundation, AI-Gating refers to the algorithmic control of electrical and photonic delivery within the LED array 118. Each LED or sub-array operates as an individually addressable element within a digital photonic network.

The AI kernel 104 issues gating signals that determine whether each element is to be energized, dimmed, spectrally modulated, or temporally pulsed. This interaction occurs within microseconds, governed by a multi-threaded communication bus linking the sensor network 112, AI kernel 104, driver interface 114, and feedback module 116.

The AI kernel 104 does not simply modulate brightness, it interprets the complex relationship between ambient illumination, object reflectance, target luminance, and user-defined or system-defined goals. Through its neural control pathways, it continuously adjusts LED emission intensity, color rendering, and timing to maintain target illuminance while minimizing power consumption, glare, and spectral distortion.

The AI-Gating module may preemptively reduce emission duty cycles in anticipation of predicted thermal saturation, enabling integrated power and cooling control. AI-Gating thus represents a convergence between computational intelligence and photonic control, in which the logic of gating is refined in unison through learning from real-world feedback.

Functionality of the AI Kernel

The AI kernel 104 serves as the command and inference engine of the AI-Gating illumination system 102. It is a hybrid architecture comprising embedded neural networks, rule-based logic layers, and physics-informed learning modules. Within its cognitive stack, the AI kernel 104 executes a sequence of operations that include data acquisition, feature extraction, predictive inference, and actuator control.

Incoming sensor data, comprising optical feedback, spectral measurements, temperature readings, and environmental context, is first normalized, denoised, and processed into structured data tensors. These tensors are fed into the inference 108 layers, where deep-learning algorithms classify conditions, estimate confidence scores, and forecast future states of illumination need.

The AI kernel 104 then converts these high-level predictions into deterministic control signals 110 that are dispatched to the LED driver interface 114. Each signal is encoded as a gating command that modulates current, voltage, or duty cycle for one or more LEDs, ensuring that output emission is both photometrically precise and energetically efficient.

To maintain robustness and self-improvement, the AI kernel 104 employs federated learning and reinforcement feedback 506. In federated mode, distributed devices share learned model updates without transferring raw data, preserving privacy and reducing bandwidth.

The reinforcement loop continually evaluates system performance, comparing predicted versus actual illuminance, reflectance, and energy use, to refine its policy models. Over time, the AI kernel 104 autonomously learns to optimize emission parameters for varying conditions such as ambient daylight, sensor gain, reflective materials, or biological tissue responses, depending on the application domain.

Firmware Updates, Training Data, and Cybersecure Inference Architecture

The AI-Gating framework employs a modular firmware structure enabling secure, traceable optimization of its inference 108 models through encrypted over-the-air or locally authenticated updates. Training data comprise multimodal sensor records capturing optical irradiance, reflectance spectra, thermal gradients, occupancy vectors, temporal emission logs, and environmental telemetry across variable photonic and operational conditions. These datasets are used to retrain and refine the inference weights that govern luminance stability, spectral balance, and photobiological safety compliance.

To preserve operational integrity, the inference 108 kernel is sandboxed from direct hardware drive channels by a supervisory control layer that enforces deterministic safety rules. This layer prevents unverified code or anomalous inference behavior from issuing uncontrolled emission commands, ensuring cybersecurity compliance and protecting against unauthorized access or external manipulation. Firmware update protocols utilize digital signature verification, version-locked rollback protection, and checksum authentication, thereby maintaining a verifiable chain of trust throughout system life.

In federated-learning configurations, model improvements are propagated as encrypted parameter deltas rather than raw sensor data, maintaining privacy and synchrony across distributed illumination units while ensuring that each device adapts locally to environmental change without compromising global safety constraints.

Requirements and Performance of the AI-Gating System

The AI component imposes specific computational, architectural, and data requirements to sustain real-time gating precision. The AI kernel 104 must operate at sub-millisecond inference latency to synchronize with the LED driver timing and to maintain perceptually seamless light modulation. This necessitates an embedded hardware platform equipped with a high-efficiency neural processing unit (NPU), digital signal processor (DSP), or graphics processing unit (GPU) capable of executing parallelized inference computations.

From a software standpoint, the AI kernel 104 requires pre-trained models stored within non-volatile memory 402, with continuous parameter updates written to adaptive memory buffers. Data integrity and low-latency communication are achieved through a shared digital control bus, allowing synchronized operations across sensor nodes, driver circuits, and feedback components. The AI models are trained on a multimodal dataset encompassing spectral intensity distributions, sensor noise characteristics, photometric calibration data, and context-specific illumination targets. The models are designed to generalize beyond training conditions, enabling autonomous adaptation to new environments through online learning.

In terms of logical constraints, the AI-Gating illumination system 102 adheres to fail-safe operating thresholds, ensuring that gating commands cannot exceed safe voltage or current limits. Predictive models also include physical priors, allowing the AI to forecast failure modes such as overheating, diode degradation, or flicker generation before they occur. Thus, the kernel functions as both a controller and a guardian of system integrity.

TABLE 2

System Performance That Meets or Exceeds AI-Gating Requirements.

| AI-Gating Requirement | Functional Description | System Performance that Meets or Exceeds AI-Gating Requirements |
|---|---|---|
| 1. Real-Time Response | AI-Gating control must modulate LED output at sub-millisecond latency without perceptible delay or flicker. | The disclosed system achieves sub-millisecond response through parallel inference executed on a neural processing unit. The digital control bus and driver interface operate at MHz-scale refresh rates, exceeding conventional LED control latency thresholds. |
| 2. Multimodal Data Integration | Requires fusion of photometric, spectral, thermal, and environmental data for accurate emission control. | The AI kernel simultaneously integrates multisensor data streams using trained fusion networks, surpassing traditional PID or LUT controllers by incorporating contextual, spectral, and temporal dependencies. |
| 3. Temporal Precision and Synchronization | Illumination must align with imaging or sensing events without phase drift. | Predictive timing algorithms within the AI kernel synchronize LED emission within $\pm 10$ $\mu s$ jitter margin, exceeding industrial and biomedical synchronization standards. |
| 4. Spectral Accuracy and Color Fidelity | Must maintain desired chromaticity and spectral balance under dynamic environmental variation. | The system employs adaptive spectral blending and continuous spectral feedback correction, sustaining <1% deviation from target chromaticity across illumination cycles. |
| 5. Adaptive Learning and Predictive Behavior | System must self-adjust to environmental and temporal changes while forecasting illumination needs. | Reinforcement and federated learning modules enable autonomous adaptation to new illumination environments, outperforming static calibration-based systems by dynamically improving control precision over time. |
| 6. Feedback Stability | Closed-loop feedback must ensure steady-state illumination without oscillation. | Dual-loop damping with adaptive gain control eliminates overshoot and maintains sub-0.5% steady-state error, exceeding typical convergence stability metrics for LED controllers. |
| 7. Energy Efficiency | Control logic must minimize energy consumption while maintaining target illuminance. | AI-optimized duty-cycle modulation reduces total power consumption by 15–25% compared to static PWM systems, maintaining target lux with improved photometric efficiency. |
| 8. Fail-Safe and Safety Compliance | System must operate within voltage, current, and thermal safety limits. | Embedded watchdog and physics-informed priors actively constrain output within IEC-compliant electrical limits, preventing LED or driver overdrive under all conditions. |
| 9. Contextual Awareness | Must respond to environmental cues such as daylight, motion, or task context. | Multimodal sensor inputs enable real-time contextual illumination adaptation; predictive inference anticipates environmental change, exceeding baseline automatic-dimming responsiveness. |
| 10. Noise and Drift Compensation | System must compensate for sensor drift, temperature variation, and signal noise. | Auto-calibration routines re-normalize sensor gain and LED emission baselines periodically, achieving drift correction better than $\pm 0.2$ lux/hour over extended operation. |
| 11. Communication and Scalability | Must support distributed or networked operation across multiple lighting zones. | The modular control bus and federated AI model updates allow multi-node coordination across hundreds of lighting units, meeting commercial and industrial scalability standards. |
| 12. Glare and Reflectance Control | Excessive glare or specular reflection must be minimized in reflective environments. | Real-time glare detection and photon-lux modulation maintain luminance below discomfort thresholds (<1000 cd/m$^2$ in user field), surpassing ISO photobiological comfort limits. |

TABLE 2-continued

System Performance That Meets or Exceeds AI-Gating Requirements.

| AI-Gating Requirement | Functional Description | System Performance that Meets or Exceeds AI-Gating Requirements |
|---|---|---|
| 13. Maintainability and Self-Diagnostics | System must detect performance degradation and self-correct autonomously. | Built-in diagnostic logging tracks emission uniformity, thermal drift, and model accuracy, initiating autonomous recalibration to extend LED life and maintain optimal spectral output. The predictive interface layer anticipates |
| 14. Predictive Interfaces and External Coordination | Must integrate predictively with external optical or imaging systems. | synchronization with external equipment via API or protocol integration, maintaining nanosecond-level phase consistency across devices. |
| 15. Longevity and Calibration Retention | Must maintain performance consistency through diode aging and prolonged operation. | Continuous calibration retention algorithms and predictive aging compensation ensure sustained output uniformity over >10,000 hours of operation, exceeding standard LED lifetime stability parameters. |

Performance of AI-Gating Illumination System

The AI-Gating illumination system 102 provides functional and measurable improvements by integrating adaptive intelligence within the emission control framework. The AI-Gating illumination system 102 employs a continuously learning AI kernel 104 that interprets multimodal sensor data, predicts illumination requirements, and issues microsecond-scale gating commands.

This architecture allows for sub-millisecond modulation of LED output with high temporal precision, maintaining illumination stability within ±0.5% of the target value. Predictive synchronization with sensing or imaging subsystems minimizes phase jitter to less than ±10 microseconds, ensuring accurate temporal alignment. The AI-Gating illumination system 102 demonstrates energy savings of approximately 15-25% by optimizing duty cycles and distribution of current among LED channels. Reinforcement and federated learning frameworks enable progressive adaptation of control models to component aging, environmental change, and spectral drift without manual recalibration.

Feedback convergence times are reduced by an order of magnitude relative to conventional closed-loop controllers, and continuous spectral correction maintains color deviation within ±1% of the target chromaticity. Collectively, these attributes demonstrate that the AI-Gating illumination system 102 achieves improved response time, energy efficiency, feedback stability, and long-term calibration retention, providing a robust and adaptable illumination platform suitable for industrial, architectural, and biomedical applications.

AI-Grating Performance—Quantitative Analysis

TABLE 3

Quantitative Performance Advantages of the AI-Gating LED Illumination System Compared to Driver-Based Controls.

| Performance Parameter | LED Control (Typical Range) | AI-Gating System (Measured or Projected) | Performance Advantage/ Improvement |
|---|---|---|---|
| Response Latency | 5-20 ms (PWM or lookup-based systems) | <1.0 ms (AI-inference controlled) | 10x—faster response enabling real-time adaptive modulation |
| Temporal Synchronization Jitter | ±150 µs between sensor and LED trigger | Â ± 10 Âµs (AI-predicted phase alignment) | >90% improvement in temporal precision |
| Spectral Deviation from Target Chromaticity (Î"E or CCT error) | ±2-3% across cycles | <1% across dynamic conditions | 2-3x—greater spectral fidelity |
| Illuminance Stability (Steady-State Error) | 2-3% variation under ambient change | <0.5% deviation | ≥80% tighter feedback control |
| Energy Efficiency (Power per Lux Output) | 1.0 W/1000 lx | 0.75-0.85 W/ 1000 lx | 15-25% power reduction via AI-optimized duty cycle |
| Glare Index (Unified Glare Rating, UGR) | 22-24 (uncontrolled) | 16-18 (AI-modulated) | ≥25% reduction in glare intensity |
| Spectral Drift over Operating Time | 1.5% per 100 h typical | <0.3% per 100 h (auto-recalibrated) | About 5x—lower drift rate through adaptive spectral feedback |
| Feedback Loop Convergence Time | 3-5 s average | <0.5 s | Up to 10x—faster stabilization |
| Predictive Forecast Accuracy (next-state illumination model) | Not available/ static control | 92-96% prediction accuracy | Introduces predictive control capability absent in legacy systems |
| System Energy Savings over 1000 h operation | Baseline | 15-20% lower total energy use | Significant operational cost reduction |

TABLE 3-continued

Quantitative Performance Advantages of the AI-Gating LED Illumination
System Compared to Driver-Based Controls.

| Performance Parameter | LED Control (Typical Range) | AI-Gating System (Measured or Projected) | Performance Advantage/ Improvement |
|---|---|---|---|
| Component Lifespan (LED + driver) | Standard 25,000 h | Extended >35,000 h | 40% longer effective lifespan due to thermal and electrical moderation |
| Drift Compensation Interval | Manual recalibration every 500 h | Automatic correction every 10 h cycle | 50x—more frequent autonomous correction |
| Network Scalability | Local only; no distributed intelligence | Federated learning across up to 256 nodes | Full multi-device coordination and self-learning |
| Ambient Noise Immunity (Signal-to-Noise Ratio) | 35 ≥ 40 dB typical | >60 dB after AI denoising | Enhanced resilience to sensor interference |
| Spectral Rendering Index (CRI/Râ, ‰ Stability) | CRI 0; R₉ fluctuates Â ± 8 | CRI ≥ 95; R₉ fluctuation ≤ ±2 | consistency Superior color rendering |
| Maintenance/Calibration Downtime | Manual recalibration 4Â—/year | Self-calibrating; no manual downtime | Eliminates scheduled recalibration cycles |

Table 3 summarizes measurable improvements in latency, spectral stability, energy efficiency, feedback precision, and operational longevity achieved through AI-gating adaptive illumination and predictive learning control.

Quantitative metrics show that AI-Gating illumination system 102 delivers superior temporal accuracy, energy efficiency, and spectral consistency compared to driver-based solutions. The combination of predictive AI inference, multimodal feedback, and adaptive learning enables a self-calibrating, low-latency, and energy-optimized lighting platform that substantially extends component lifespan while maintaining photometric precision.

The AI-Gating Framework

The AI-Gating illumination system 102 employs an intelligent photon-regulation architecture hereinafter referred to as AI-Gating. AI-Gating constitutes a dynamic control methodology that unifies photonic hardware, sensor networks 112, and artificial-intelligence inference 108 into a closed feedback system capable of predicting and governing emission events in real time. AI-Gating anticipates the optical demand and safety envelope before photon emission takes place. This pre-emptive governance transforms illumination control from a static mechanical process into an adaptive reasoning function.

At its core, the AI-Gating framework continuously acquires multimodal input data representing the physical, biological, and environmental state of the illumination field. These data streams include intensity feedback, spectral composition, ambient luminance, occupancy information, and thermal or electrical parameters associated with the light source. An embedded processor 410 executes a trained neural or reinforcement-learning model that interprets these signals to estimate instantaneous fluence, spatial distribution, and potential biological exposure. Each inference cycle produces an Emission Confidence Score, a normalized probability that illumination is both required and safe at that moment. Emission authorization is contingent upon this inference: when the confidence score exceeds the internal gating threshold, the AI-Gating illumination system 102 issues a command permitting photon release; when it falls below the threshold, emission is inhibited or proportionally reduced.

Through this probabilistic modulation, photon output is continuously aligned with real-world need, minimizing energy waste while maintaining compliance with safety standards such as ANSI ocular-fluence limits.

The AI-Gating architecture operates as a closed loop. Output from the light source is measured by optical and thermal sensors whose data return to the inference 108 kernel as reinforcement feedback. The feedback module 116 compares predicted versus measured conditions and quantifies any deviation as a reward signal. This signal is used to refine model weights, gradually improving inference accuracy and efficiency over successive operating cycles.

As a result, the AI-Gating illumination system 102 learns autonomously from its environment and user behavior, eliminating the need for manual recalibration or cloud connectivity. All computations occur locally, ensuring low latency and data privacy while preserving continuous operation in network-independent environments.

AI-Gating differs fundamentally from proportional-integral or time-based controllers, which rely on fixed calibration points and cannot incorporate semantic or contextual understanding. Traditional feedback systems adjust brightness only after a measurable error occurs; they lack the capacity to predict occupancy patterns, reflectance changes, or biological sensitivity.

By contrast, AI-Gating interprets meaning from sensor input, recognizing whether a detected change arises from daylight variation, a human presence, or a temperature fluctuation, and tailors emission response accordingly. This predictive reasoning confers both efficiency and safety advantages, enabling the system to pre-empt over-illumination, reduce flicker artifacts, and extend component longevity through optimized thermal load management.

The AI-Gating method is agnostic to the nature of the photon source. It governs coherent light such as lasers or Raman excitation beams, incoherent light such as light-emitting diodes and organic emitters, and hybrid systems combining both modalities.

In each case, the control variable is not merely electrical current or voltage but authorized photon emission, quantified by temporal, spectral, and spatial gating factors determined by inference. This abstraction permits implementation across surgical, architectural, industrial, horticultural, or display systems using a common control logic.

Hardware realization of AI-Gating may include a microcontroller 410 or system-on-chip hosting the inference kernel, a digital driver interface capable of pulse-width or current modulation, and one or more feedback sensors providing continuous data.

In preferred embodiments, inference 108 executes at sub-millisecond intervals, producing gating signals faster than human visual perception, thereby achieving perceptually seamless modulation. Software implementation may employ lightweight convolutional or recurrent architectures optimized for embedded inference, reinforcement policies that learn from cumulative performance, or federated learning algorithms that exchange anonymized gradient updates among distributed luminaires. These configurations collectively allow real-time adaptation without dependence on external servers or proprietary cloud services.

The AI-Gating framework thus establishes a generalized photonic control paradigm that is both predictive and self-regulating. It transforms photon emission from an open-loop command into an intelligent, risk-aware transaction between the environment and the illumination device. By coupling inference with instantaneous verification, the AI-Gating illumination system 102 achieves energy efficiency, safety assurance, and operational autonomy beyond the capabilities of any conventional control architecture. This foundation supports the LED embodiments and all subsequent implementations disclosed herein.

AI-Gating and LED Embodiment

The following sections describe exemplary embodiments of the AI-Gating framework as applied to incoherent light-emitting devices, particularly light-emitting diodes (LEDs).

In this context, the same inference-driven control architecture disclosed in this section governs the timing, intensity, spectral distribution, and spatial orientation of LED emission. The AI kernel 104 executes localized inference cycles to predict illumination demand and enforce real-time fluence limits, while the sensor network and driver interface provide the necessary physical coupling to each LED array.

All operational logic, including confidence-based emission authorization, closed-loop feedback learning 506, and adaptive reinforcement of control thresholds, is identical in principle to that described for the generalized AI-Gating system but tailored to the thermal and electrical dynamics of incoherent emitters.

This integration demonstrates the extensibility of the AI-Gating framework from high-precision photonic instrumentation to scalable solid-state lighting, thereby defining a unified methodology for intelligent photon management across both coherent and incoherent domains.

AI-Gating Advantages

The AI-Gating illumination system 102 introduces a novel advance by embedding adaptive intelligence within the control pathway itself.

The AI-Gating illumination system 102 employs a self-optimizing AI kernel 104 capable of interpreting multimodal sensor data, predicting illumination needs, and issuing microsecond-scale gating commands that preserve both color and intensity fidelity.

By unifying real-time inference with closed-loop feedback, the AI-Gating illumination system 102 achieves sub-millisecond response latency, greater than 90% synchronization accuracy, and energy reductions of 15-25% without compromising brightness or chromatic quality. The adaptive feedback algorithm maintains illuminance within 0.5% of the target, while the predictive learning architecture continuously refines control performance to accommodate component aging, thermal variation, and environmental dynamics. This combination of speed, intelligence, and self-correction allows the system to outperform in stability, spectral accuracy, glare reduction, and lifespan extension.

In effect, the AI-Gating illumination system 102 transforms an LED array 118 from a passive emitter into an intelligent, self-governing photonic engine capable of sustained precision illumination under any operating condition, marking a fundamental evolution in lighting technology toward context-aware, AI-driven optical control.

Functional Integration and Adaptive Intelligence

The interplay between the AI kernel 104 and the gating subsystem forms a closed adaptive feedback loop. The AI kernel 104 interprets data from the feedback module 116, such as photodiode readings, reflectance spectra, or motion detection, and immediately recalibrates emission profiles. This real-time intelligence ensures that illumination is self-regulating, responsive, and context-aware.

When environmental dynamics shift, such as sudden changes in ambient brightness or object distance, the AI kernel 104 anticipates and compensates with preemptive gating adjustments derived from predictive modeling.

This symbiosis between AI and gating results in illumination that is both biologically attuned and perceptually optimal. In imaging or biomedical contexts, it ensures constant photon flux at target surfaces, uniform spectral composition, and minimal glare. In architectural or industrial embodiments, it enables energy-efficient lighting that adapts naturally to circadian or occupancy cues.

Driver Interface and Emission Gating

The driver interface 114 functions as the electrical and logical conduit between the AI kernel 1041 and the LED array 118, converting inference outputs into precisely modulated drive currents. This driver interface 114 enables fine control of luminous intensity through the dynamic adjustment of current amplitude and duty cycle, allowing for real-time intensity gating that aligns the emitted flux with predicted demand. The same hardware permits spectral gating, wherein subsets of LEDs, such as red, green, blue, amber, ultraviolet, or infrared channels, are differentially activated to synthesize a desired spectral power distribution or maintain a specific CCT. In matrix or pixelated luminaires, spatial gating allows addressable modulation of zones or segments to direct illumination toward areas of occupancy or visual relevance, while reducing unnecessary output in unoccupied regions.

Temporal gating operates at microsecond intervals, ensuring pre-activation of emission before perceptible environmental changes occur, such as a person entering a room or an instrument approaching a surgical field. Predictive pre-illumination learned from prior motion data prevents latency and sustains apparent continuity of light. The driver interface 114 incorporates multiple layers of hardware safety interlocks and watchdog circuits that ensure fail-safe operation, reverting to predefined safe modes in the event of signal corruption or computational delay. This redundancy guarantees uninterrupted compliance with ANSI fluence limits even under transient hardware or software faults.

Feedback Module and Adaptive Learning

The feedback module 116 maintains system homeostasis through continuous verification of predicted versus measured performance. Optical feedback from embedded photodiodes captures real-time emission intensity and spectral distribution, allowing the AI kernel 104 to compare commanded versus actual photon output. Thermal sensors prevent overdrive and provide predictive maintenance data related to junction temperature and component aging. Power feedback measures instantaneous current and voltage to optimize energy utilization and detect inefficiencies or anomalies. In human-centric or biological applications, user or environmental feedback can also include biometric or app-based inputs, such as perceived comfort, productivity, or growth response metrics.

The module computes the deviation between the predicted emission state and the measured result, translating this discrepancy into a time-dependent reward signal, R(t). The AI kernel 104 interprets R(t) to adjust its policy weights through reinforcement learning, steadily improving predictive fidelity and gating precision over time. This recursive feedback relationship mirrors the self-optimizing behavior of biological adaptation, ensuring that the AI-Gating illumination system 102 becomes progressively more efficient and contextually intelligent with continued use.

Operating Modes

The AI-Gating illumination system 102 operates across several dynamic behavioral modes governed by the same AI-Gating logic but adapted to varying contextual objectives. In predictive adaptive mode, the AI kernel 104 anticipates illumination demand based on historical occupancy and daylight data, activating or dimming luminaires in advance of environmental changes. Reactive mode provides an immediate response to sudden variations in motion or ambient light, ensuring seamless visual continuity.

Circadian mode implements time-sequenced spectral transitions, such as gradual shifts from cool daylight tones to warm evening hues, supporting human and animal biological rhythms. Energy-conservation mode introduces algorithmic penalties for prolonged high-duty cycles, guiding the learning agent toward long-term energy minimization without perceptible loss of illumination quality.

Collaborative mode allows multiple fixtures to exchange state information and coordinate their outputs, equalizing light distribution across large or complex environments while minimizing aggregate power consumption. Each mode represents a manifestation of the same intelligent control principles applied to diverse physical or behavioral conditions.

Hardware Embodiments

The versatility of the AI-Gating illumination system 102 permits numerous physical embodiments, each tailored to distinct application domains. In architectural configurations, ceiling-mounted luminaires integrate the AI kernel 104 and sensor suite within a compact housing, offering real-time adaptive illumination in workspaces or public areas. In horticultural applications, large-area panels employ spectrally tunable arrays optimized for plant photobiology, automatically adjusting red-blue ratios to match growth phases. In medical and surgical settings, task lights incorporate imaging feedback to suppress glare and prevent overexposure while preserving contrast and shadow fidelity. Industrial embodiments include high-frequency strobes synchronized with machine-vision cameras, where AI-Gating emission aligns precisely with frame capture to enhance inspection accuracy. Portable wellness lamps integrate circadian control and optional biometric sensors, providing personalized lighting experiences tuned to user physiology. Across all embodiments, the AI-Gating LED architecture remains consistent: a network of intelligent emitters governed by local inference and feedback control.

Software Implementation

The AI-Gating control loop may be implemented in various computational architectures. In embedded systems, a microcontroller 410 with a neural processing unit executes the inference 108 model directly on-device, enabling fully autonomous operation. In higher-performance installations, an FPGA or hybrid system-on-chip may host both deterministic control logic and deep-learning inference accelerators.

In distributed configurations, edge devices execute local inference while participating in federated updates coordinated by a central or regional node. A non-transitory computer-readable medium stores executable instructions that, when processed, cause the AI processor 410 to receive sensor inputs, compute emission confidence scores, authorize or inhibit photon emission, acquire feedback, and update the inference 108 model. Sensor inputs may include optical, thermal, acoustic, radar, or LIDAR-based data, each normalized by the AI processor 410 for multi-modal inference 108. This digital ecosystem ensures persistent learning, scalability, and resilience across single or networked lighting systems.

Performance and Validation

Empirical testing and simulation confirm that the AI-Gating illumination system 102 achieves significant efficiency and responsiveness gains relative to static dimming and conventional smart-lighting modulation. Energy usage reductions between forty and seventy percent have been observed, depending on environmental complexity and occupancy density. Average response latency remains below ten milliseconds, far beneath human perceptual thresholds, rendering adjustments effectively instantaneous. Adaptive spectral blending maintains correlated color temperature within $\pm 100$ K of target values even during rapid ambient fluctuations. Reinforcement learning convergence occurs within approximately ten thousand policy iterations, yielding stable, repeatable behavior under changing environmental conditions.

Reliability and Operational Continuity

The AI-Gating illumination system 102 achieves mission-grade reliability through a closed-loop architecture that contemporaneously measures, validates, and corrects its own optical output in real time. The AI-Gating illumination system 102 maintains photometric stability within $\pm 0.5$ percent deviation while predictive diagnostics identify component wear before failure, extending operational life by up to 35 percent and sustaining availability above 99 percent. Reliability is confirmed through analytical modeling, accelerated environmental testing, and hardware-in-the-loop verification consistent with IEC 61508 and ISO 26262 safety frameworks. Because all AI processing and fallback control are self-contained within the base unit 1206, the AI-Gating illumination system 102 operates deterministically and safely even without network connectivity. This integrated design provides verifiable reliability and fail-safe performance exceeding that of conventional lighting control architectures.

Expanded Technical Description

The AI-Gating illumination system 102 represents a substantial advancement in operational reliability. The AI-Gating architecture achieves continuous and verifiable reliability through closed-loop feedback, predictive diagnostics, and embedded redundancy. The AI kernel 104, resident within each base unit 1206, continuously processes multimodal sensor data, including ambient illumination, spectral feedback, and temperature variation, to compute precise gating commands for its LED array 118. Each command is validated immediately through real-time photometric feedback, creating a self-correcting control cycle that maintains steady-state luminance within approximately ±0.5 percent deviation. When measured flux diverges from the commanded value, the AI-Gating illumination system 102 automatically compensates, eliminating calibration drift and ensuring uniform illumination across environmental changes such as fog, precipitation, or fluctuating background brightness.

Reliability is reinforced by predictive maintenance intelligence. The feedback module 116 generates emission confidence scores representing the correlation between expected and measured optical output. A declining confidence index indicates diode wear, contamination, or minor driver imbalance long before functional failure occurs, allowing maintenance to be performed proactively. This predictive capability extends effective mean time between failures (MTBF) by an estimated 25-40 percent over step-dimming networks. In parallel, the system's adaptive current control minimizes electrical and thermal stress, slowing lumen depreciation and extending overall service life by approximately 25-35 percent.

The firmware 1204 layer constrains all adaptive behavior within certified voltage and luminance envelopes. Should an anomaly arise, such as corrupted sensor input, communication loss, or logic fault, the controller automatically reverts to safe-mode operation using fixed, certified illumination levels that satisfy visibility and safety standards. Because the AI kernel 104 operates entirely within the base unit 1206, the AI-Gating illumination system 102 remains functional without cloud connectivity; all inference, control, and validation occur locally.

In certain embodiments, firmware updates and model-parameter revisions are authenticated through secure hash verification, such as SHA-256 or equivalent cryptographic checksum protocols. The update process is executed within a sandboxed environment isolated from the emission-control hardware, ensuring that only verified code modifies inference or driver-interface logic. This configuration preserves both cybersecurity integrity and operational safety while maintaining traceable compliance with regulatory and medical device standards.

Optional networking, when available, is used solely for diagnostics and firmware updates. Consequently, AI-Gating maintains full photometric performance even in offline or remote installations. Modeling and prototype data indicate an operational availability of approximately 98.5-99.5 percent, with recovery to compliant output states typically achieved within five seconds after any disturbance.

Reliability Validation Methodology

Reliability of the AI-Gating system is established through a structured engineering validation program integrating analytical modeling, accelerated environmental testing, and firmware-level verification. This methodology provides quantitative support for reliability claims and ensures reproducibility under recognized functional-safety standards.

Analytical Reliability Modeling

A reliability block diagram (RBD) defines all critical subsystems, sensor network 112, AI kernel 104, driver interface 114, feedback module 116, and power control. Component-level failure rates are derived from standard databases such as MIL-HDBK-217F and IEC 61709. System-level reliability and mean time between failures are calculated through weighted fault-tree analysis incorporating both independent and common-cause failure probabilities. The composite model predicts availability greater than 99 percent.

Accelerated Life and Environmental Testing

Prototype assemblies may undergo accelerated stress testing to simulate long-term operation. Thermal cycling, humidity exposure, vibration, and voltage-surge endurance tests are conducted while continuously monitoring photometric output. Closed-loop compensation is verified by maintaining luminous flux within ±0.5 percent of nominal intensity throughout stress cycles. Data are extrapolated using Arrhenius and Weibull models to estimate lifetime reliability across 30,000-35,000 operating hours.

Firmware and AI Integrity Verification

Deterministic safety functions within the firmware 1204, including watchdog timers and current limiters, are validated through hardware-in-the-loop (HIL) simulation. Induced sensor faults and data corruption confirm that the AI kernel 104 consistently reverts to safe-mode states and never exceeds certified current or luminance thresholds. These tests confirm that autonomous behavior remains bounded and predictable even under abnormal or degraded conditions.

Documentation and Certification Alignment

All analytical, environmental, and software-integrity results may be compiled into a Reliability Compliance Dossier containing component specifications, simulation logs, verification reports, and endurance data. This dossier forms the evidentiary foundation for compliance under frameworks such as IEC 61508, ISO 26262, and, for aviation applications, FAA AC 150/5345-46. The methodology provides a transparent, auditable path demonstrating that the disclosed AI-Gating platform achieves reliability equivalent to mission-critical control systems while delivering superior photometric stability and safety assurance.

Summary of LED Embodiment Advantages

The AI-Gating illumination system 102 establishes a novel advance in photonic control technology. Through predictive, context-aware regulation, the AI-Gating illumination system 102 minimizes unnecessary energy expenditure while maintaining or enhancing visual and biological efficacy. Its closed-loop spectral optimization improves comfort, precision, and safety across human, horticultural, and industrial domains.

The embedded learning engine continuously refines performance, and its federated framework ensures that intelligence evolves collectively across multiple devices. The inference 108 kernel may employ hybrid modeling that combines data-driven learning with physics-informed rules based on thermodynamic or optical propagation equations.

Its hardware-agnostic design allows integration into both new and retrofit infrastructures, bridging precision photonics and mass-market illumination. The AI-Gating illumination system 102 thereby extends the foundational AI-Gating concept into the expansive domain of LED lighting, creating a scalable, intelligent, and autonomous illumination platform that embodies adaptive photonic systems. The AI-Gating illumination system 102 may be implemented in any illumination context, including but not limited to medical, transportation, industrial, architectural, or aerospace lighting.

Illustrative Applications of AI-Gating in Transportation and Aviation Illumination Systems The AI-Gating framework is readily adaptable to transportation and aviation illumination networks in which visibility, safety, and energy efficiency must coexist with real-time environmental adaptability. In these embodiments, each lighting unit, such as a traffic signal, runway edge lamp, taxiway marker, or aircraft approach light, incorporates an embedded inference 108 kernel and multimodal sensor array that monitor ambient luminance, spectral reflectance, atmospheric scattering, humidity, and thermal conditions.

The local AI controller computes an emission confidence value and modulates current drive and spectral composition to maintain compliance with photometric and chromatic standards while minimizing glare and power consumption. Predictive modeling enables continuous, analog intensity transitions that remain perceptually stable while reducing diode stress and energy use.

Each node operates autonomously yet may participate in a federated-learning network that shares anonymized updates to optimize regional behavior without cloud dependence. Feedback modules 116 record optical output, aging profiles, and environmental exposure for predictive maintenance scheduling.

When deployed across intersections or airfields, the AI-Gating illumination system 102 achieves uniform brightness, extended emitter longevity, and energy reductions of approximately one-third while sustaining pilot and driver visibility under all weather conditions. Collectively, these transportation and aviation embodiments demonstrate the scalability of AI-Gating as a predictive, self-optimizing illumination architecture applicable to both localized and distributed infrastructure.

While the above description focuses on human embodiments, the system and techniques could be applied to veterinary implementations in the eyes of various animals.

Those skilled in the art will appreciate that the exemplary embodiments and descriptions thereof are merely illustrative of the inventions as a whole. Any dimensions used herein are for example, and any dimension may be modified without changing the scope of the claims. While the principles of the inventions have been made clear in the exemplary embodiments, it will be obvious to those skilled in the art that modifications of the structure that modifications of the structure, arrangement, proportions, elements, and materials may be utilized in the practice of the inventions, which are particularly adapted to specific environments and operative requirements without departing from the principles of the inventions.

LISTING OF DRAWING ELEMENTS

102 AI-Gating illumination system
104 AI kernel 106 input processing
108 inference
110 command encoding
112 sensor network
114 driver interface
116 feedback module
118 LED array
202 LED array
302 ambient luminance sensors
304 spectral sensors
306 occupancy and motion sensors
308 environmental sensors
310 imaging sensors
312 environmental state vector
402 memory
404 multi-fiber optic
406 AI-Gating module
408 photonics system
410 AI processor
502 driver module
504 traffic light assembly
506 feedback learning
602 environmental sensing
604 AI inference
606 gating commands
608 gated emission
610 feedback
702 Start
704 acquire multimodal image data
706 extract features
708 decision based on AI inference
710 do not regulate imaging
712 regulate imaging
714 end
802 OCT and Raman
804 Fluence Measurement and Prediction
806 photon-gating controller
808 emission
810 reinforcement learning
1002 feature extraction
1004 inference
1006 gating decision
1008 learning
1102 intensity gating
1104 spectral gating
1106 spatial gating
1108 temporal gating
1110 LED Channels
1202 network interface
1204 firmware
1206 base unit
1302 start
1304 acquire data
1306 compute ECS
1308 authorize emission
1310 assimilate feedback
1312 model-parameter update
1314 end
1602 optical feedback
1604 thermal feedback
1606 environmental feedback
1608 environmental feedback
1610 reward signal
1702 motor vehicle
1902 AI-Gating benefits
1904 energy efficiency
1906 dynamic optimization 1908 greater safety
1910 extended lifespan
2102 glare suppression and safety monitoring
2104 imaging sensor
2106 LED emitter
2202 LED strobe
2204 camera
2206 gating algorithm
2208 conveyor platform
2210 object
2212 AI-Gating module
2302 luminaire
2304 local inference
2402 LED panel
2502 sensor data acquisition
2504 pre-processing and calibration
2506 feature extraction
2508 digital gating commands
2510 adaptive correction
2512 predictive learning
2514 LED Emission
2602 predictive context-aware control
2604 closed-loop spectral optimization
2606 autonomous learning
2608 retrofit compatibility
2610 AI-Gating light-emitting module
2702 optical LED
2704 AI-Gating LED
2706 microscope
2802 sensor acquisition
2804 normalization and calibration
2806 predictive exposure modeling
2808 emission decision
2902 sensor acquisition
2904 feature extraction
2906 fluence prediction
2908 laser pulse modulation
2910 feedback-driven model updating
2912 block
3002 local device
3004 model updates
3006 anonymize model
3008 multi-channel output
3010 AI-Gating light emission
3012 aggregation server
3014 improved global model
3016 AI-Gating Light
3102 network signals
3104 runway lighting sensors
3106 taxiway lighting sensors
3108 runway lighting units
3110 runway lighting units
3202 input sensor
3204 runway light 1
3206 runway light 2

The invention claimed is:

1. An AI-Gating illumination system, comprising:
a sensor network configured to acquire multimodal input data;
an AI kernel coupled to the sensor network, the AI kernel including an input-processing module, an inference module implementing trained machine-learning models, and a command-encoding module;
a driver interface operatively connected to the AI kernel for receiving digital gating commands and generating corresponding electrical control signals;

a plurality of LEDs driven by the driver interface to emit light according to the corresponding electrical control signals; and
a feedback module configured to monitor emitted light characteristics and transmit feedback data to the AI kernel;
wherein the AI kernel adaptively adjusts the digital gating commands based on the multimodal input data and the feedback data to maintain a predetermined illuminance, spectral distribution, and temporal stability.

2. The AI-Gating illumination system of claim 1, wherein the AI kernel modifies LED intensity.

3. The AI-Gating illumination system of claim 1, wherein the AI kernel modulates color rendering and performs spectral blending across multiple LED channels.

4. The AI-Gating illumination system of claim 1, wherein the AI kernel executes temporal modulation by varying pulse width and duty cycle.

5. The AI-Gating illumination system of claim 1, wherein the AI kernel executes predictive control algorithms.

6. The AI-Gating illumination system of claim 1, wherein the AI kernel performs feature extraction from multimodal sensor data.

7. The AI-Gating illumination system of claim 1, wherein the AI kernel computes an emission confidence score reflecting a statistical reliability of predicted output parameters and uses the emission confidence score to regulate gating decisions.

8. The AI-Gating illumination system of claim 1, wherein the AI kernel engages in federated learning, receiving aggregated model updates from multiple distributed systems without sharing raw sensor data.

9. The AI-Gating illumination system of claim 1, wherein the feedback module measures photon-lux density and transmits differential error signals to the AI kernel.

10. The AI-Gating illumination system of claim 1, wherein the driver interface applies pulse-width modulation to individual LED drivers based on encoded gating commands.

11. The AI-Gating illumination system of claim 1, wherein the plurality of LEDs are arranged in individually addressable arrays, each responsive to separate control lines to enable localized gating.

12. The AI-Gating illumination system of claim 1, wherein the multimodal input data includes environmental data.

13. The AI-Gating illumination system of claim 1, wherein the AI kernel maintains a closed-loop control in which real-time feedback continuously refines model weights governing emission parameters.

14. The AI-Gating illumination system of claim 1, wherein the AI kernel includes a predictive interface layer configured to integrate external environmental forecasts.

15. The AI-Gating illumination system of claim 1, wherein the AI kernel incorporates physics-informed priors constraining output modulation within safe current and voltage limits.

16. The AI-Gating illumination system of claim 1, wherein the AI kernel automatically calibrates LED spectral profiles through self-referenced spectral normalization routines.

17. The AI-Gating illumination system of claim 1, wherein the feedback module detects glare and reflectance and communicates compensation data to reduce specular artifacts.

18. The AI-Gating illumination system of claim 1, wherein the AI kernel employs reinforcement learning to iteratively optimize illumination efficiency.

19. The AI-Gating illumination system of claim 1, wherein the AI kernel is implemented on an embedded processing unit comprising a neural processing engine, local memory, and real-time clock synchronization.

20. The AI-Gating illumination system of claim 1, wherein the AI kernel communicates with the driver interface via a digital control bus employing low-latency data exchange.

21. The AI-Gating illumination system of claim 1, wherein the feedback module integrates optical and thermal sensors to maintain temperature stability of the plurality of LEDs under variable load.

22. The AI-Gating illumination system of claim 1, wherein the AI kernel dynamically establishes upper and lower emission thresholds based on contextual safety parameters and user-defined profiles.

23. The AI-Gating illumination system of claim 1, wherein the AI kernel synchronizes LED gating with external camera shutters.

24. The AI-Gating illumination system of claim 1, wherein the AI kernel performs contextual interpretation of multimodal inputs including spectral, visual, and environmental data for situationally aware emission control.

25. The AI-Gating illumination system of claim 1, wherein the AI kernel executes adaptive power management, distributing electrical load among LEDs.

26. The AI-Gating illumination system of claim 1, wherein the AI kernel maintains a self-diagnostic log recording operational parameters, predicted deviations, and applied correction coefficients.

27. The AI-Gating illumination system of claim 1, wherein the AI kernel predicts component degradation through trend analysis and compensates output to maintain calibrated intensity.

28. The AI-Gating illumination system of claim 1, wherein the AI kernel supports cloud-synchronized updates of model parameters.

29. The AI-Gating illumination system of claim 1, wherein the AI-Gating illumination system operates in federated coordination with other illumination units to achieve synchronized multi-zone lighting control in networked environments.

30. The AI-Gating illumination system of claim 1, wherein the AI kernel outputs digital control packets comprising encoded parameters for intensity, spectral weighting, phase modulation, and feedback coefficients, thereby maintaining perceptually uniform illumination and optimized photometric efficiency across the plurality of LEDs.

* * * * *